(12) United States Patent
Choi et al.

(10) Patent No.: US 12,369,151 B2
(45) Date of Patent: *Jul. 22, 2025

(54) METHOD, DEVICE, AND SYSTEM FOR TRANSMITTING PHYSICAL UPLINK CONTROL CHANNEL IN WIRELESS COMMUNICATION SYSTEM

(71) Applicant: WILUS INSTITUTE OF STANDARDS AND TECHNOLOGY INC., Gyeonggi-do (KR)

(72) Inventors: Kyungjun Choi, Gyeonggi-do (KR); Minseok Noh, Gyeonggi-do (KR); Geunyoung Seok, Gyeonggi-do (KR); Jinsam Kwak, Gyeonggi-do (KR); Juhyung Son, Gyeonggi-do (KR)

(73) Assignee: WILUS INSTITUTE OD STANDARDS AND TECHNOLOGY INC., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/607,567

(22) Filed: Mar. 18, 2024

(65) Prior Publication Data
US 2024/0236980 A1 Jul. 11, 2024

Related U.S. Application Data

(63) Continuation of application No. 18/134,019, filed on Apr. 12, 2023, now Pat. No. 12,075,407, which is a
(Continued)

(30) Foreign Application Priority Data

Oct. 12, 2020 (KR) .................. 10-2020-0131467
Jan. 6, 2021 (KR) .................. 10-2021-0001697
(Continued)

(51) Int. Cl.
*H04W 72/1268* (2023.01)
*H04L 1/1829* (2023.01)
(Continued)

(52) U.S. Cl.
CPC ....... *H04W 72/1268* (2013.01); *H04L 1/1854* (2013.01); *H04W 72/21* (2023.01); *H04W 72/11* (2023.01)

(58) Field of Classification Search
CPC . H04W 72/1268; H04W 72/21; H04W 72/11; H04L 1/1854
(Continued)

(56) References Cited

U.S. PATENT DOCUMENTS 12,075,407 B2 * 8/2024 Choi ..................... H04L 5/0055
2018/0270851 A1 9/2018 Bhattad et al.
(Continued)

FOREIGN PATENT DOCUMENTS

EP 3 249 987 11/2017
EP 4 160 966 4/2023
(Continued)

OTHER PUBLICATIONS

Office Action dated May 13, 2024 for Korean Patent Application No. 10-2023-7012630 and its English translation provided by Applicant's foreign counsel.
(Continued)

*Primary Examiner* — Chi P Cheng
(74) *Attorney, Agent, or Firm* — WOMBLE BOND DICKINSON (US) LLP

(57) ABSTRACT

The present specification relates to a method, a device, and a system for transmitting a physical uplink control channel in a wireless communication system. The present specification discloses a terminal comprising: a communication module for receiving, from a base station, information on a
(Continued)

PUCCH serving cell corresponding to a serving cell on which a PUCCH is to be transmitted, generating the PUCCH, and transmitting the generated PUCCH on the PUCCH serving cell; and a processor for configuring the PUCCH serving cell on the basis of the information on the PUCCH serving cell. The terminal can effectively transmit uplink control information.

12 Claims, 61 Drawing Sheets

Related U.S. Application Data continuation of application No. PCT/KR2021/014060, filed on Oct. 12, 2021.

(30) Foreign Application Priority Data

Mar. 18, 2021 (KR) .................. 10-2021-0035213
May 17, 2021 (KR) .................. 10-2021-0063687

(51) Int. Cl.
*H04W 72/21* (2023.01)
*H04W 72/11* (2023.01)

(58) Field of Classification Search
USPC ......................................................... 370/329
See application file for complete search history.

(56) References Cited

U.S. PATENT DOCUMENTS

| | | | |
|---|---|---|---|
| 2019/0103947 | A1 | 4/2019 | Park |
| 2019/0158327 | A1 | 5/2019 | Suzuki et al. |
| 2020/0187233 | A1 | 6/2020 | Dinan |
| 2022/0095337 | A1 | 3/2022 | Wang et al. |
| 2022/0337356 | A1 | 10/2022 | Dimou et al. |
| 2022/0399978 | A1 | 12/2022 | Gao et al. |
| 2023/0247627 | A1 | 8/2023 | Choi et al. |

FOREIGN PATENT DOCUMENTS

| | | |
|---|---|---|
| JP | 2023-542690 | 10/2023 |
| KR | 10-2018-0024019 | 3/2018 |
| KR | 10-2020-0082035 | 7/2020 |
| WO | 2022/080840 | 4/2022 |
| WO | 2022/202741 | 9/2022 |
| WO | 2022/215998 | 10/2022 |

OTHER PUBLICATIONS

CMCC: "Discussion on DL SPS enhancements", 3GPP TSG RAN WG1 #99, R1-1912541, Reno, USA, Nov. 9, 2019, pp. 1-4.
Moderator (Nokia): "Feature lead summary #4 on HARQ-ACK feedback enhancements for NR Rel-17 URLLC/IIoT (AI 8.3.1.1)", 3GPP TSG-RAN WG1 Meeting #102-e, R1-2007354, e-Meeting, Aug. 31, 2020, pp. 1-141.
Office Action dated May 20, 2024 for Japanese Patent Application No. 2023-522521 and its English translation provided by Applicant's foreign counsel.
Motorola Mobility, Lenovo: "HARQ-ACK feedback for enhanced DL SPS", 3GPP TSG RAN WG1 Meeting #99, R1-1912854, Reno, USA, Nov. 9, 2019, pp. 1-4.
Vivo: "Other issues for URLLC", 3GPP TSG RAN WG1 #98, R1-1908164, Prague, CZ, Aug. 17, 2019, pp. 1-9.
Huawei, HiSilicon: "UE feedback enhancements for HARQ-ACK", 3GPP TSG RAN WG1 Meeting #102-e, R1-2005243, E-meeting, Aug. 8, 2020, pp. 1-8.
International Search Report for PCT/KR2021/014060 mailed on Feb. 9, 2022 and its English translation from WIPO (now published as WO 2022/080840).
Written Opinion of the International Searching Authority for PCT/KR2021/014060 mailed on Feb. 9, 2022 and its English translation from WIPO (now published as WO 2022/080840).
Notice of Allowance dated Nov. 20, 2023 for U.S. Appl. No. 18/134,019 (now published as U.S. 2023/0247627).
Office Action dated Aug. 9, 2023 for U.S. Appl. No. 18/134,019 (now published as U.S. 2023/0247627).
Extended European Search Report dated Feb. 27, 2024 for European Patent Application No. 21880487.0.
Wilus Inc: "On SPS PDSCH for NR URLLC", 3GPP TSG RAN WG1 #98, R1-1909371, Prague, CZ, Aug. 17, 2019, pp. 1-4.
CATT: "Clarification for processing order of UL multiplexing and cancellation", 3GPP TSG RAN WG1 #100bis, R1-2002060, e-Meeting, Apr. 11, 2020, pp. 1-6.
Office Action dated Sep. 9, 2024 for Japanese Patent Application No. 2023-522521 and its English translation provided by Applicant's foreign counsel.
Office Action dated Oct. 24, 2024 for U.S. Appl. No. 18/607,558.
Office Action dated Nov. 5, 2024 for Korean Patent Application No. 10-2023-7012630 and its English translation provided by Applicant's foreign counsel.
Office Action dated Nov. 11, 2024 for European Patent Application No. 21 880 487.0.
Office Action dated Dec. 30, 2024 for Indian Patent Application No. 202327031590.
Notice of Allowance dated Mar. 11, 2025 for Japanese Patent Application No. 2023-522521 and its English translation provided by Applicant's foreign counsel.

\* cited by examiner (a) PUSCH scheduling in frequency (type 0)

(b) PUSCH scheduling in frequency (type 1)

METHOD, DEVICE, AND SYSTEM FOR TRANSMITTING PHYSICAL UPLINK CONTROL CHANNEL IN WIRELESS COMMUNICATION SYSTEM

CROSS-REFERENCE TO RELATED APPLICATIONS

This application is a continuation of U.S. patent application Ser. No. 18/134,019 filed on Apr. 12, 2023, which is a continuation of International Patent Application No. PCT/KR2021/014060 filed on Oct. 12, 2021, which claims the priority to Korean Patent Application No. 10-2020-0131467 filed in the Korean Intellectual Property Office on Oct. 12, 2020, Korean Patent Application No. 10-2021-0001697 filed in the Korean Intellectual Property Office on Jan. 6, 2021, Korean Patent Application No. 10-2021-0035213 filed in the Korean Intellectual Property Office on Mar. 18, 2021, and Korean Patent Application No. 10-2021-0063687 filed in the Korean Intellectual Property Office on May 17, 2021, the entire contents of which are incorporated herein by reference.

TECHNICAL FIELD

The present disclosure relates to a wireless communication system, and more particularly, to a method, device, and system for transmitting a physical uplink control channel in a wireless communication system, and a PDSCH receiving method and a HARQ-ACK transmitting method based on semi-persistent scheduling.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

In a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Various attempts have been made to apply 5G communication systems to IoT networks. For example, technologies, such as sensor networks, machine-to-machine (M2M) communication, and machine-type communication (MTC), are implemented by techniques, such as beamforming, MIMO, and array antennas, which are 5G communication technologies. Application of a cloud radio access network (cloud RAN) as the big data processing technology described above may also be considered as an example of convergence of 5G technology and IoT technology. In general, mobile communication systems have been developed to provide voice services while ensuring user activity.

However, mobile communication systems are gradually expanding their scope to data services as well as voice services, and have now developed to the extent that they are capable of providing high-speed data services. However, in the mobile communication system currently providing services, a more advanced mobile communication system is required due to lack of resources and users' demand for high-speed service.

DISCLOSURE OF THE INVENTION

Technical Problem

An object of the present disclosure is to provide a method for transmitting uplink control information in a wireless communication system, particularly a cellular wireless communication system, and a device therefor.

Another object of the present disclosure is to provide a method for receiving an SPS PDSCH in a 3GPP NR system, a method for transmitting a HARQ-ACK of the SPS PDSCH, and a device therefor.

Technical Solution

According one exemplary embodiment of the present disclosure, there is provided a user equipment (UE) that transmits a physical uplink control channel (PUCCH) based on carrier aggregation. The UE includes a communication module that receives, from a base station, information on a PUCCH serving cell that is a serving cell to which the PUCCH is to be transmitted, generates the PUCCH, and transmits the generated PUCCH on the PUCCH serving cell, and a processor that configures the PUCCH serving cell based on the information on the PUCCH serving cell, and the information on the PUCCH serving cell includes first information indicating whether to set a specific serving cell among the plurality of serving cells as the PUCCH serving cell and second information on a period to which the setting on the PUCCH serving cell is applied.

In one aspect, the first information may indicate whether to set the specific serving cell as the PUCCH serving cell with sequential indices.

In another aspect, the number of the sequential indices may be determined based on a subcarrier spacing (SCS) of any one cell, the any one cell may be one of the plurality of serving cells, and each index included in the sequential indices may correspond to one slot of the any one cell.

In still another aspect, the any one cell may be a primary serving cell among the plurality of serving cells.

In still another aspect, the number of the sequential indices may be determined based on a subcarrier spacing (SCS), and each index included in the sequential indices may correspond to one slot according to the subcarrier spacing.

In still another aspect, the subcarrier spacing may be smallest among subcarrier spacings of the plurality of serving cells.

In still another aspect, the subcarrier spacing may be greatest among subcarrier spacings of the plurality of serving cells.

In still another aspect, the UE may be configured with a time division duplex (TDD) configuration from a higher layer, and the subcarrier spacing may be a reference subcarrier spacing of the TDD configuration.

In still another aspect, the sequential indices may correspond to at least some of the slots in the period.

In still another aspect, an uplink slot of a primary serving cell may not be included in the at least some of the slots, and the uplink slot may be a slot including only an uplink symbol.

In still another aspect, when all of the plurality of serving cells are downlink slots, the slot may not be included in the at least some of the slots, and the downlink slot may be a slot including only a downlink symbol.

In still another aspect, the first information may indicate whether to set the specific serving cell as the PUCCH serving cell in units of slots.

In still another aspect, the plurality of serving cells may include a primary serving cell and at least one secondary serving cell, and the specific serving cell may be a secondary serving cell having a lowest index among the at least one secondary serving cell.

In still another aspect, the information on the PUCCH serving cell may further include third information on an offset at which the period starts.

In still another aspect, the communication module may transmit the generated PUCCH based on a time division duplex (TDD) configuration, the information on the PUCCH serving cell may be information on the TDD configuration, and a period to which setting for the PUCCH serving cell is applied may be determined based on a period set in the TDD configuration.

In still another aspect, the TDD configuration may be one of a TDD configuration for a primary serving cell, a TDD configuration for a serving cell having a lowest subcarrier spacing among the plurality of serving cells, or a TDD configuration for a serving cell having a highest subcarrier spacing among the plurality of serving cells.

In still another aspect, when the generated PUCCH is configured with PUCCH repetition, the communication module may perform the PUCCH repetition from a first slot in which the PUCCH repetition is indicated, and determines the PUCCH serving cell transmitting the PUCCH repetition in the first slot according to the first information, and the PUCCH repetition after the first slot may be transmitted in the PUCCH serving cell when the PUCCH serving cell is indicated according to the first information.

In still another aspect, when the generated PUCCH is configured with the PUCCH repetition, the communication module may determine the PUCCH serving cell in each slot in which the PUCCH repetition is transmitted according to the first information, and the PUCCH repetition in each slot may be transmitted on the PUCCH serving cell.

In still another aspect, the communication module may be configured to receive a physical downlink shared channel (PDSCH) from the base station in a slot preceding a slot in which the generated PUCCH is transmitted by k1 reference slots, the generated PUCCH may include a hybrid automatic repeat request (HARQ) ACK for the PDSCH, and a length of time of the reference slot may be determined based on any one of a subcarrier spacing of a primary serving cell, a largest subcarrier spacing among the plurality of serving cells, or a smallest subcarrier spacing among the plurality of serving cells.

In still another aspect, the communication module may be configured to receive a PUCCH resource indicator indicating a PUCCH resource from the base station, and when there are a plurality of specific serving cells that are to be set as the PUCCH serving cell, the processor may determine, as the PUCCH serving cell, a serving cell capable of using the PUCCH resource among the plurality of specific serving cells.

According to another exemplary embodiment of the present disclosure, there is provided a UE that performs communication based on semi-persistent scheduling. The UE includes a communication module configured to receive a first physical downlink shared channel (PDSCH) according to first semi-persistent scheduling from a base station, generate a hybrid automatic repeat request (HARQ) ACK for reception of the first PDSCH, and transmit the HARQ ACK at a transmission timing of a PUCCH determined by a processor, and the processor configured to perform transmission and reception operations according to a plurality of components of semi-persistent scheduling including the first semi-persistent scheduling, and determine a transmission timing of the PUCCH based on a resource of a second PUCCH in a second slot usable for the PUCCH when a resource of the first PUCCH in a first slot allocated in association with a first PDSCH is not usable for the PUCCH.

In one aspect, when the resource of the first PUCCH is not usable for the PUCCH, a case may be included in which the resource of the first PUCCH overlaps with at least one of at least one downlink symbol, at least one symbol of a synchronization signal block, at least one symbol of a basic control channel resource (CORESET #0), and an invalid uplink symbol.

In another aspect, the communication module may be configured to receive a second PUSCH according to the first semi-persistent scheduling later than the first PDSCH, resources of the second slot and the second PUCCH may be allocated in association with the second PDSCH, and the transmission timing of the PUCCH may include an uplink slot.

In still another aspect, the resources of the second slot and the second PUCCH may be associated with a PDSCH according to a predetermined specific semi-persistent scheduling among the plurality of components of semi-persistent scheduling.

In still another aspect, the predetermined specific semi-persistent scheduling may be any one of a semi-persistent scheduling configuration having the lowest ID, a semi-persistent scheduling configuration having the shortest period, and a semi-persistent scheduling configuration having a priority equal to or lower than that of the first semi-persistent scheduling, among the plurality of components of semi-persistent scheduling.

In still another aspect, the PUCCH may be configured with PUCCH repetition, and when a difference between the second slot and the first slot is equal to or smaller than a predetermined constant value, the processor may determine the transmission timing of the PUCCH as valid.

In still another aspect, the first slot may be a most preceding slot to which the PUCCH repetition is allocated, and the second slot may be a most second slot among slots in which the PUCCH repetition is transmittable.

In still another aspect, the first slot may be the most preceding slot to which the PUCCH repetition is allocated, and the second slot may be the most preceding slot among slots in which the PUCCH repetition is transmittable.

In still another aspect, the first slot may be the most preceding slot to which the PUCCH repetition is allocated, and the second slot may be each slot among slots in which each PUCCH repetition is transmittable.

In still another aspect, the first slot may be the most preceding slot to which the PUCCH repetition is allocated, and the second slot may be the last slot among slots in which each PUCCH repetition is transmittable.

In still another aspect, the first slot may be an n-th slot among slots to which the PUCCH repetition is allocated, and the second slot is an n-th slot among slots in which each PUCCH repetition is transmittable, where n is one number from 1 to the number of repetitions of the PUCCH repetition.

The effects obtainable in the present disclosure are not limited to the above-mentioned effects, and other effects that are not mentioned may be clearly understood by those skilled in the art to which the present disclosure belongs, from descriptions below.

Advantageous Effects

With the UE according to an embodiment of the present disclosure, it is possible to correctly transmit uplink control information to a base station through an uplink control channel. Furthermore, it is possible to be effectively transmit uplink control information through correct transmission of the physical uplink control channel. In addition, with the UE according to the present disclosure, it is possible effectively determine a PUCCH resource for HARQ-ACK transmission by reception of an SPS PDSCH and transmit a HARQ-ACK of the SPS PDSCH.

The effects obtainable in the present disclosure are not limited to the above-mentioned effects, and other effects that are not mentioned may be clearly understood by those skilled in the art to which the present disclosure belongs, from descriptions below.

MODE FOR CARRYING OUT THE INVENTION

Figure 1:
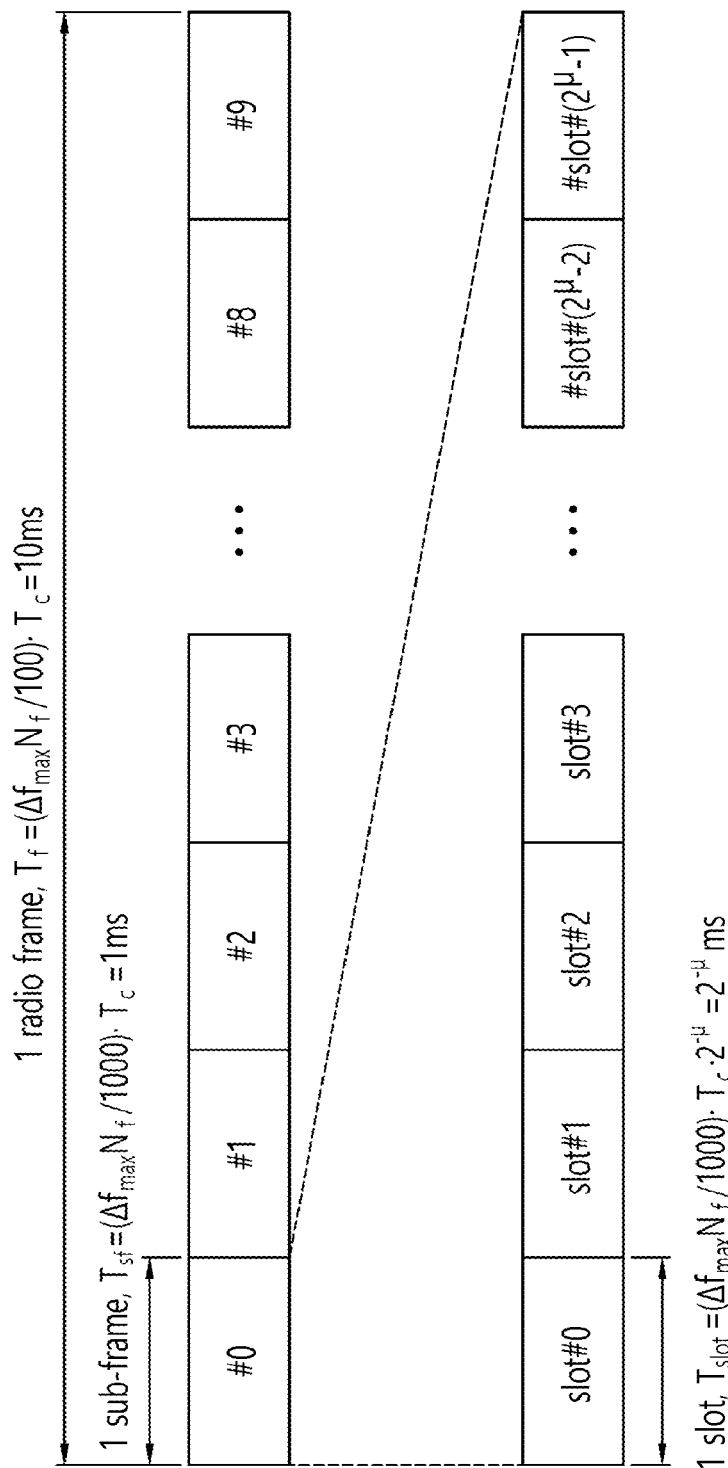
FIG. 1 illustrates an example of a wireless frame structure used in a wireless communication system.

Terms used in the specification adopt general terms which are currently widely used as possible by considering functions in the present disclosure, but the terms may be changed depending on an intention of those skilled in the art, customs, and emergence of new technology. Further, in a specific case, there is a term arbitrarily selected by an applicant and in this case, a meaning thereof will be described in a corresponding description part of the disclosure. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present disclosure is not limited thereto.

Unless otherwise specified herein, the base station may include a next generation node B (gNB) defined in 3GPP NR. Furthermore, unless otherwise specified, a terminal may include a user equipment (UE). Hereinafter, in order to help the understanding of the description, each content is described separately by the embodiments, but each embodiment may be used in combination with each other. In the present specification, the configuration of the UE may indicate a configuration by the base station. In more detail, the base station may configure a value of a parameter used in an operation of the UE or a wireless communication system by transmitting a channel or a signal to the UE.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f / 100$)*$T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and u can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include 24 slots. In this case, the length of each slot is $2^{-\mu}$ ms. Numbers from 0 to $2^\mu-1$ may be respectively allocated to $2^\mu$ slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe index), and a slot number (or a slot index).

Figure 2:
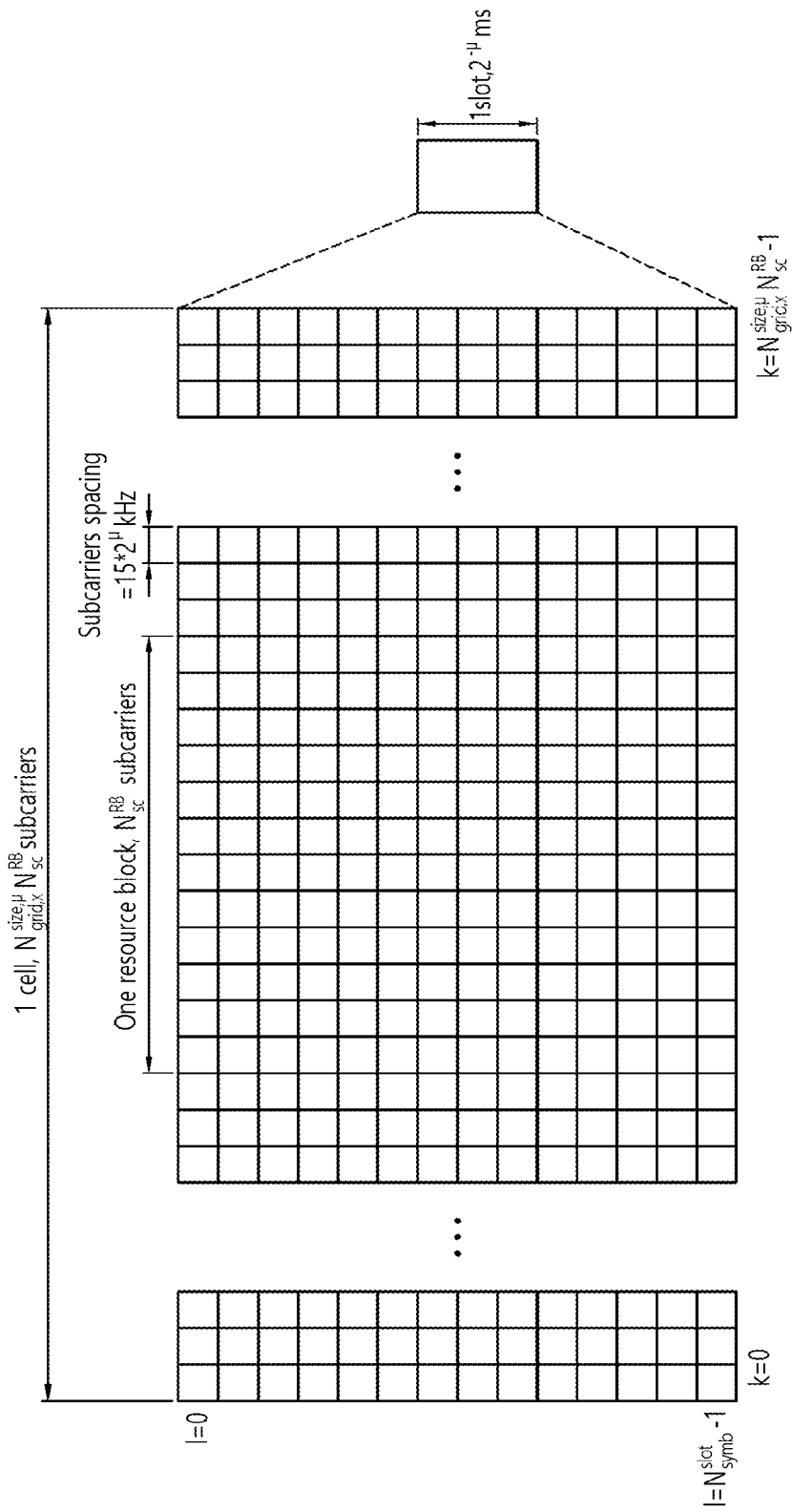
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x} * N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent µ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x} * N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb} * N^{RB}_{sc}$ resource elements. Each resource element in the resource grid can be uniquely defined by a pair of indexes (k, 1) in one slot. k may be an index assigned from 0 to $N^{size,\mu}_{grid,x} * N^{RB}_{sc}-1$ in the frequency domain, and 1 may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| | | | | | Symbol number in a slot | | | | | | | | | |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | X | X | X | U | U |
| 33 | D | D | D | D | D | D | D | D | X | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | X | X | X | X | X | X | U | U | U |
| 45 | D | D | D | D | D | X | X | U | U | U | U | U | U | U |
| 46 | D | D | D | D | X | U | D | D | D | D | D | X | X | U |
| 47 | D | D | X | U | U | U | U | D | D | X | U | U | U | U |
| 48 | D | X | U | U | U | U | D | X | U | U | U | U | U | U |
| 49 | D | D | D | X | X | U | D | D | D | D | X | X | X | U |
| 50 | D | D | X | X | U | U | D | D | X | X | U | U | U | U |
| 51 | D | X | X | U | U | U | D | X | X | U | U | U | U | U |
| 52 | D | X | X | X | X | U | D | X | X | X | X | X | X | U |
| 53 | D | X | X | X | X | U | D | D | X | X | X | X | X | U |
| 54 | X | X | X | X | X | X | D | D | D | D | D | D | D | D |
| 55 | D | D | X | X | X | U | U | U | D | D | D | D | D | D |
| 56~255 | | | | | | Reserved | | | | | | | | |

In Table 1, D denotes a DL symbol, U denotes a UL symbol, and X denotes a flexible symbol. As shown in Table 1, up to two DL/UL switching in one slot may be allowed.

Figure 3:
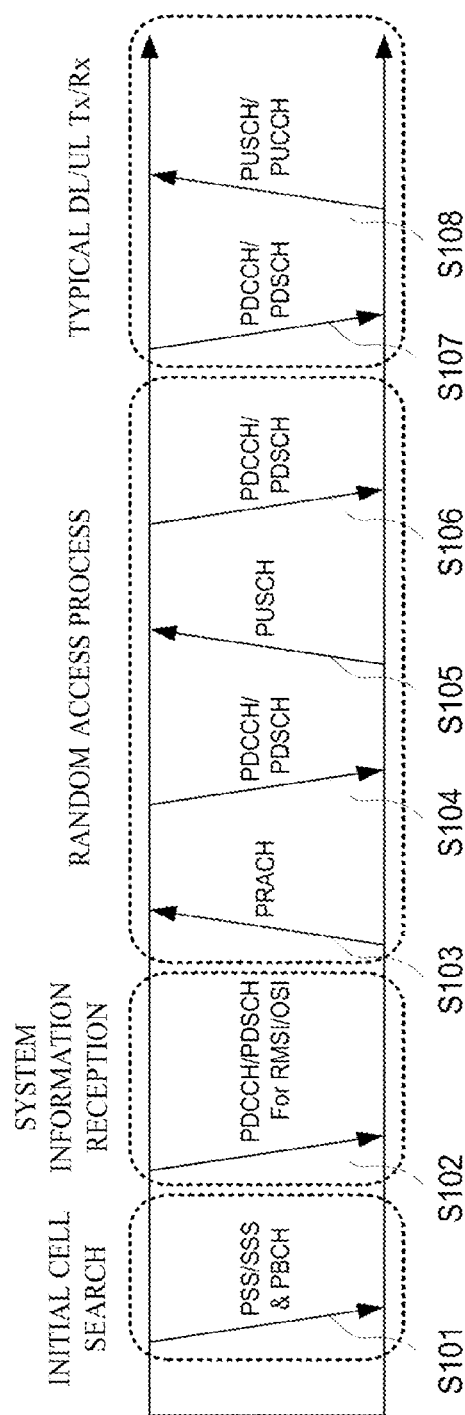
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Herein, the system information received by the UE is cell-common system information for normal operating of the UE in a physical layer in radio resource control (RRC) and is referred to remaining system information, or system information block (SIB) 1 is called.

When the UE initially accesses the base station or does not have radio resources for signal transmission (i.e. the UE at RRC_IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. The UE may obtain UE-specific system information for normal operating of the UE in the physical layer in RRC layer during a random access process. When the UE obtain the UE-specific system information, the UE enter RRC connecting mode (RRC_CONNECTED mode).

The RRC layer is used for generating or managing message for controlling connection between the UE and radio access network (RAN). In more detail, the base station and the UE, in the RRC layer, may perform broadcasting cell system information required by every UE in the cell, managing mobility and handover, measurement report of the UE, storage management including UE capability management and device management. In general, the RRC signal is not changed and maintained quite long interval since a period of an update of a signal delivered in the RRC layer is longer than a transmission time interval (TTI) in physical layer.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4A:
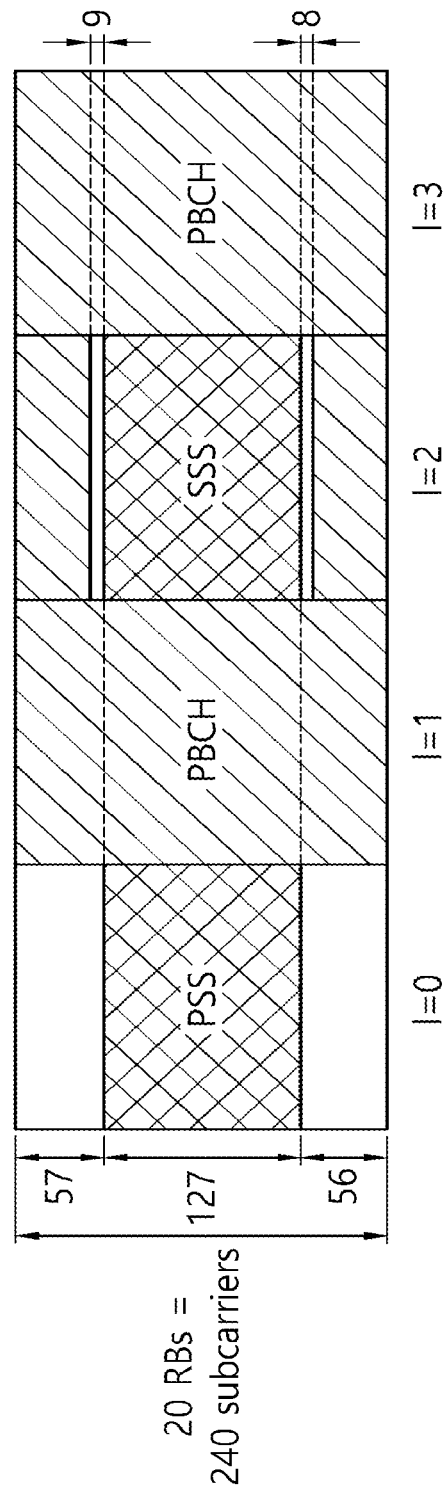
FIGS. 4A and 4B illustrate an SS/PBCH block for initial cell access in a 3GPP NR system.
Figure 4B:
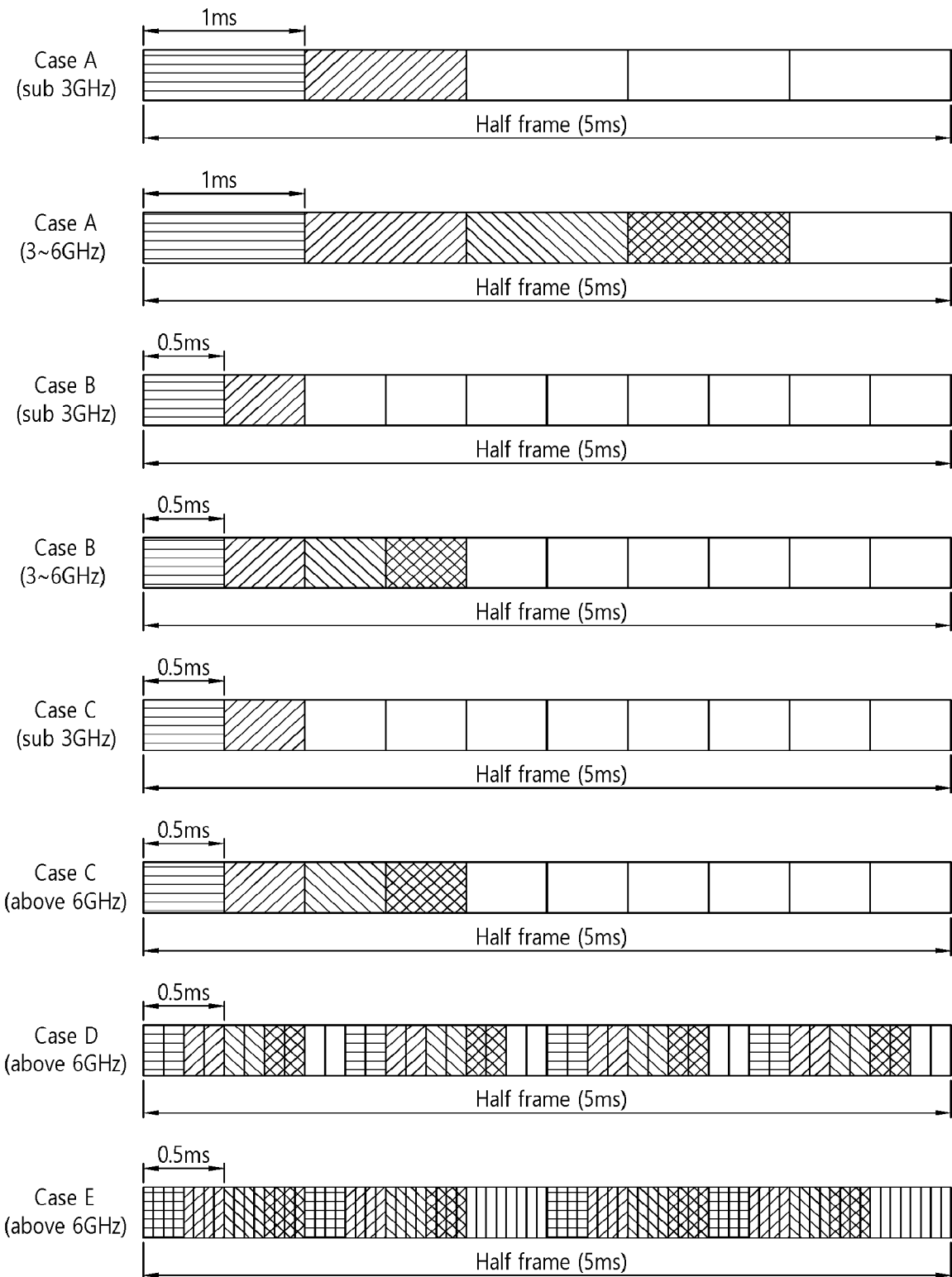

FIGS. 4A and 4B illustrate an SS/PBCH block for initial cell access in a 3GPP NR system. When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4A, a synchronization signal (SS) will be described in more detail. The synchronization signal can be classified into PSS and SSS. The PSS may be used to obtain time region synchronization and/or frequency region synchronization, such as OFDM symbol synchronization and slot synchronization. The SSS can be used to obtain frame synchronization and cell group ID. Referring to FIG. 4A and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number l relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n) = 1 - 2x(m)$$

$$m = (n + 43N^{(2)}_{ID}) \bmod 127$$

$$0 \le n < 127$$

Here, $x(i+7)=(x(i+4)+x(i)) \bmod 2$ and is given as $$[x(6)\ x(5)\ x(4)\ x(3)\ x(2)\ x(1)\ x(0)] = [1\ 1\ 1\ 0\ 1\ 1\ 0]$$

Further, the sequence $d_{SSS}(n)$ of the SSS is as follows.

$$d_{SSS}(n) = [1 - 2x_0((n + m_0) \bmod 127][1 - 2x_1((n + m_1) \bmod 127]$$

$$m_0 = 15\ \text{floor}(N^{(1)}_{ID}/112) + 5N^{(2)}_{ID}$$

$$m1 = N^{(1)}_{ID} \bmod 112$$

$$0 \le n < 127$$

Here, $x_0(i+7)=(x_0(i+4)+x_0(i)) \bmod 2$
$x_1(i+7)=(x_1(i+1)+x_1(i)) \bmod 2$ and is given as $$[x_0(6)\ x_0(5)\ x_0(4)\ x_0(3)\ x_0(2)\ x_0(1)\ x_0(0)] = [0\ 0\ 0\ 0\ 0\ 0\ 1]$$

$$[x_1(6)\ x_1(5)\ x_1(4)\ x_1(3)\ x_1(2)\ x_1(1)\ x_1(0)] = [0\ 0\ 0\ 0\ 0\ 0\ 1]$$

A radio frame with a 10 ms length may be divided into two half frames with a 5 ms length. Referring to FIG. 4B, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ($\{2, 8\}+14*n$)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is $\{4, 8, 16, 20\}+28*n$. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ($\{2, 8\}+14*n$)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ($\{4, 8, 16, 20\}+28*n$)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ($\{8, 12, 16, 20, 32, 36, 40, 44\}+56*n$)-th symbol. In this case, at a carrier frequency of 6 GHz or more, n=0, 1, 2, 3, 5, 6, 7, 8.

Figure 5A:
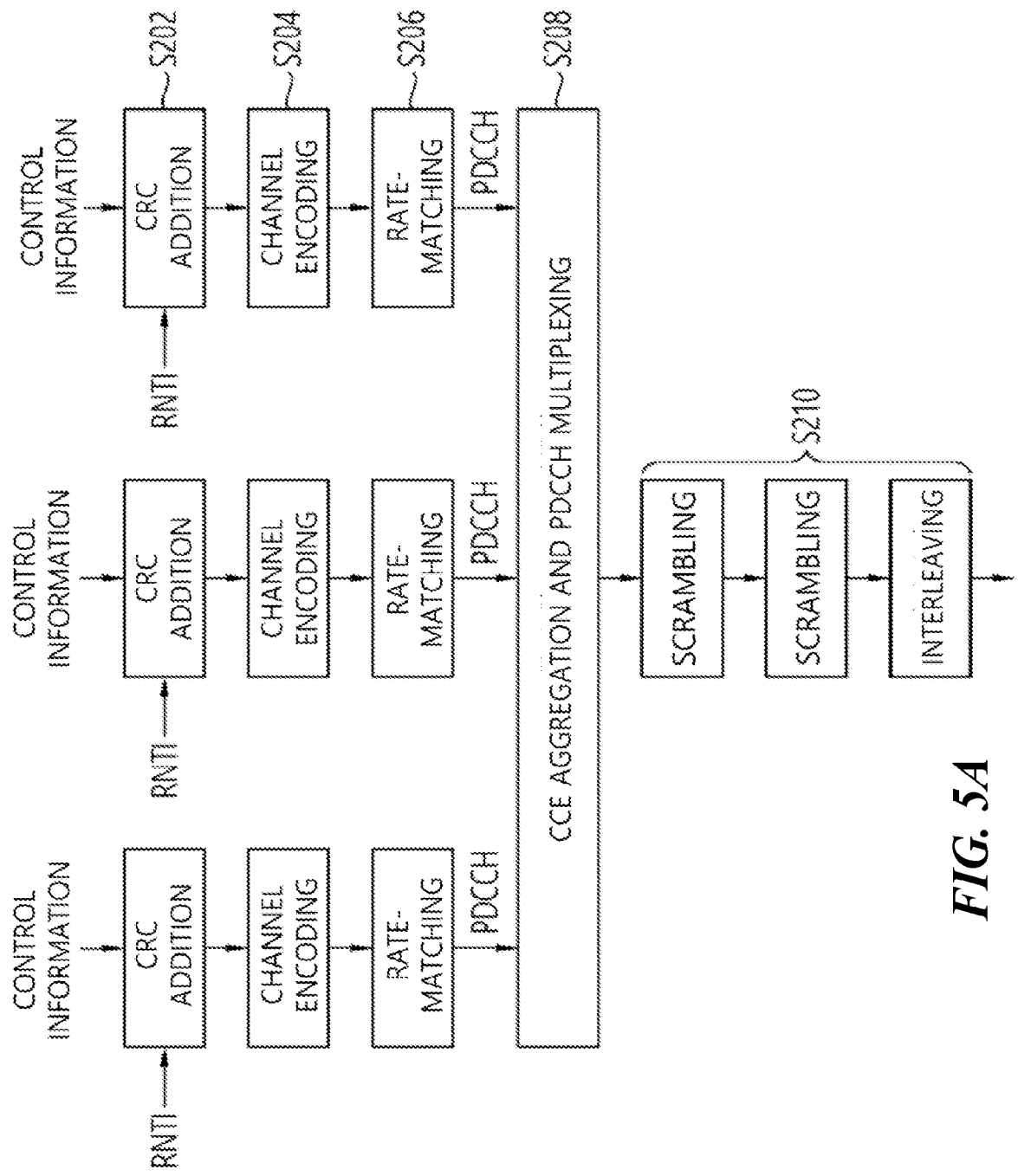
FIGS. 5A and 5B illustrate a procedure for transmitting control information and a control channel in a 3GPP NR system.
Figure 5B:
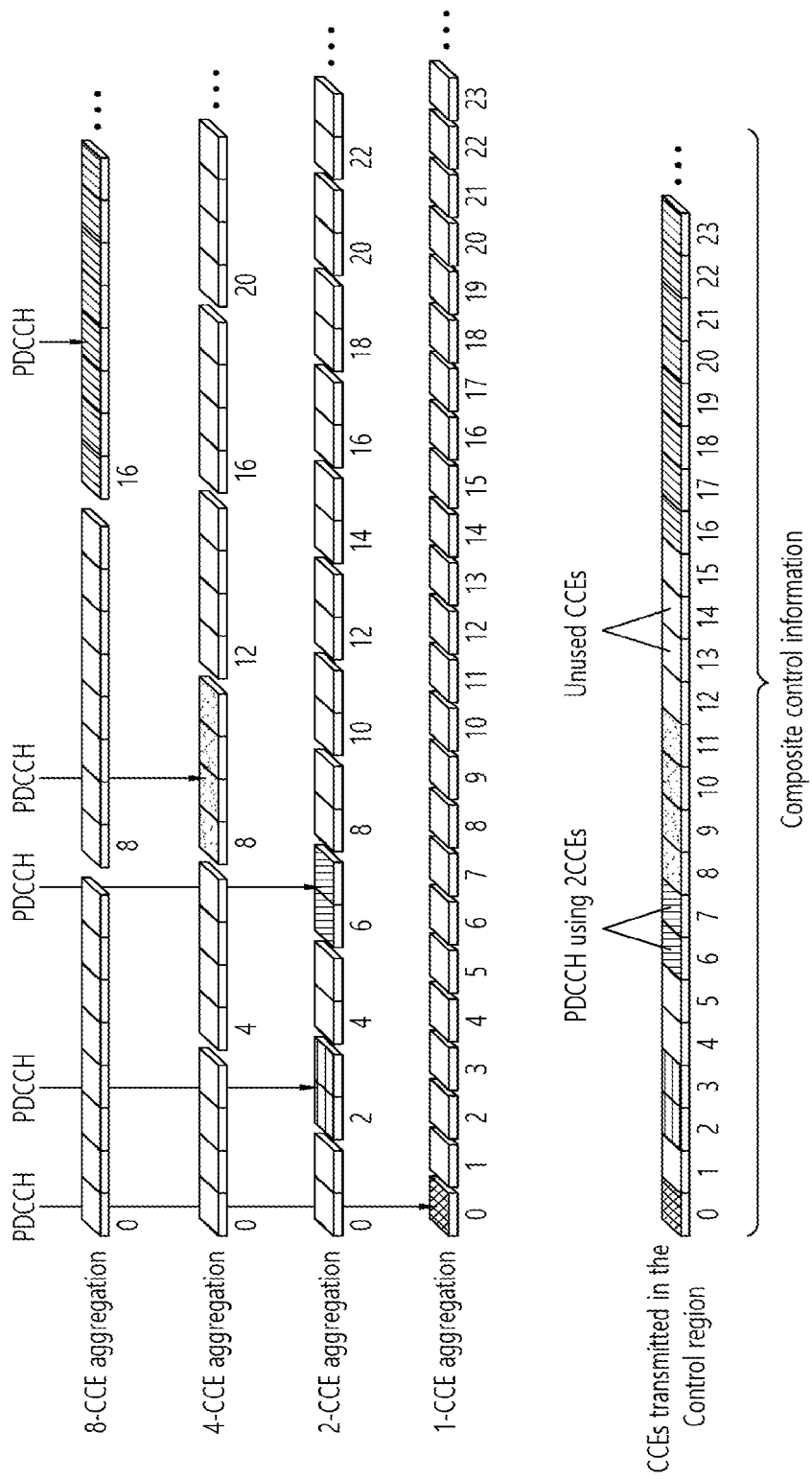

FIGS. 5A and 5B illustrate a procedure for transmitting control information and a control channel in a 3GPP NR system. Referring to FIG. 5A, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208).

In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

Figure 6:
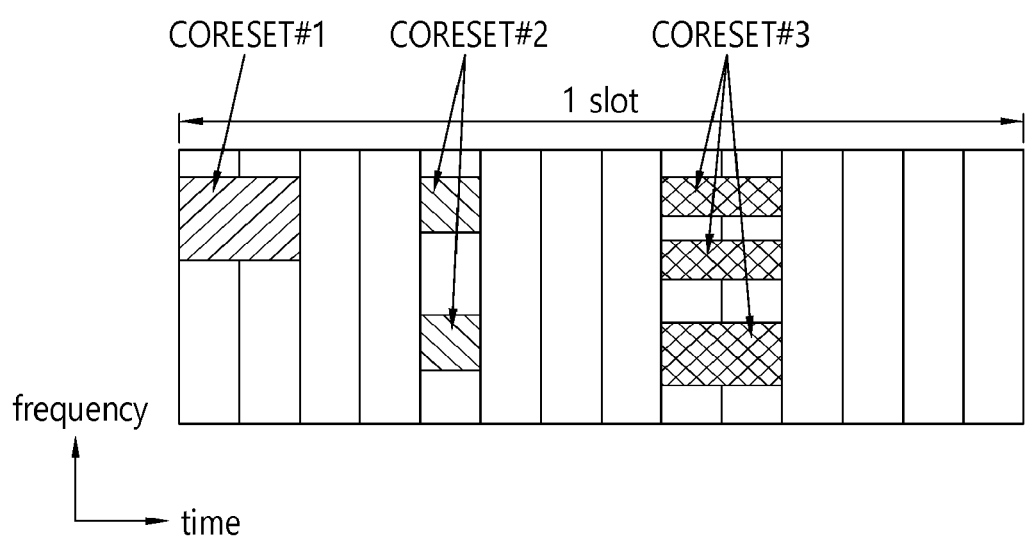
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency region designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
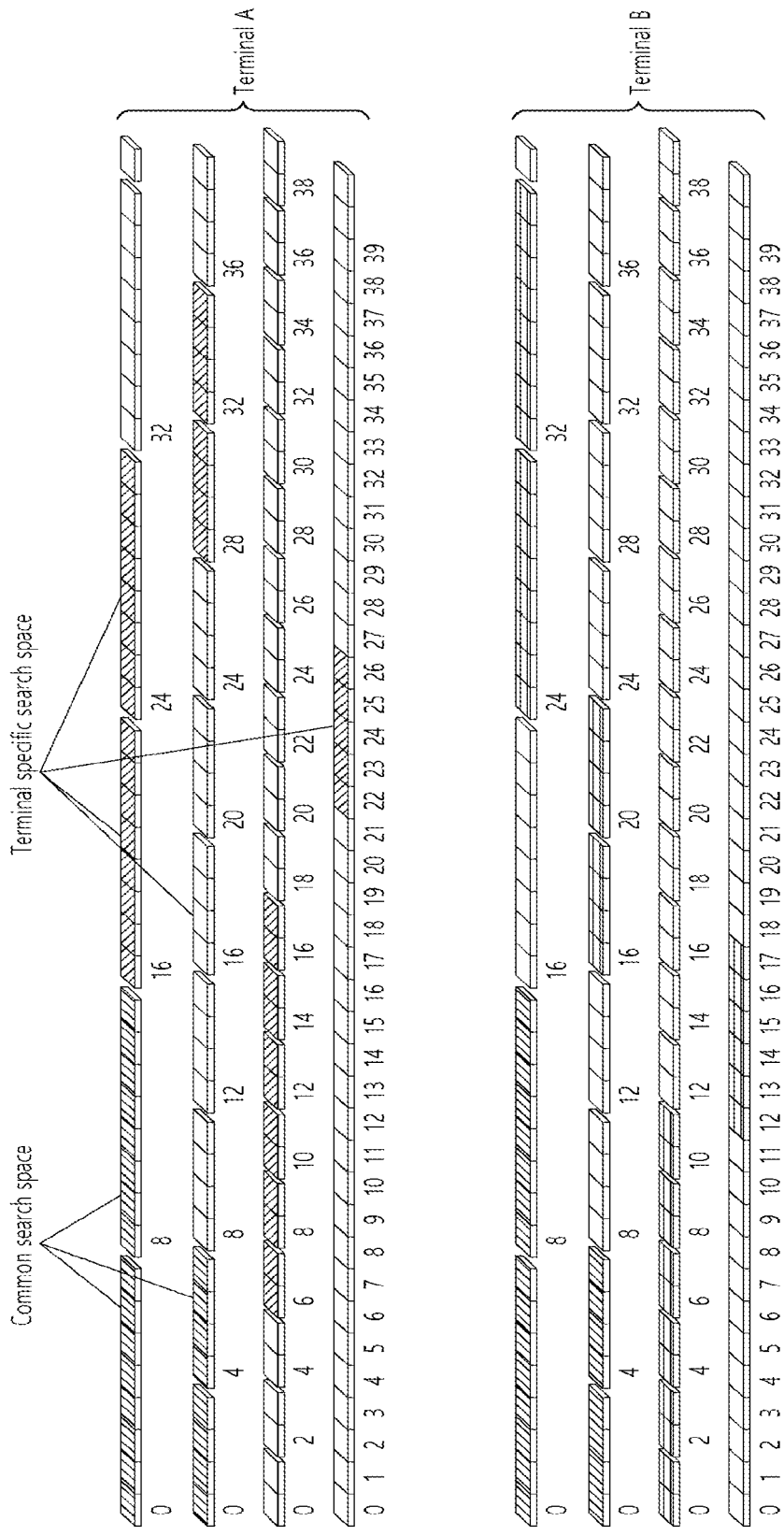
FIG. 7 illustrates a method for configuring a PDCCH search space in a 3GPP NR system.

FIG. 7 illustrates a method for setting a PDCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a UE-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. Through this, the UE may obtain a frequency diversity gain. In more detail, the UE may determine a cyclic shift (CS) value $m_{cs}$ according to $M_{bit}$ bit UCI ($M_{bit}$=1 or 2). In addition, the base sequence having the length of 12 may be transmitted by mapping a cyclic shifted sequence based on a predetermined CS value $m_{cs}$ to one OFDM symbol and 12 REs of one PRB. When the number of cyclic shifts available to the UE is 12 and $M_{bit}$=1, 1 bit UCI 0 and 1 may be represented by two cyclic shifted sequences having a difference of 6 in the cyclic shift value, respectively. In addition, when $M_{bit}$=2, 2 bit UCI 00, 01, 11, and 10 may be represented by four cyclic shifted sequences having a difference of 3 in cyclic shift values, respectively.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI ($M_{bit}$>2) with π/2-Binary Phase Shift Keying (BPSK) or QPSK to generate a complex valued symbol d(0) to d($M_{symb}$−1). Here, when using π/2-BPSK, $M_{symb}$=$M_{bit}$, and when using QPSK, $M_{symb}$=$M_{bit}$/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

Figure 8:
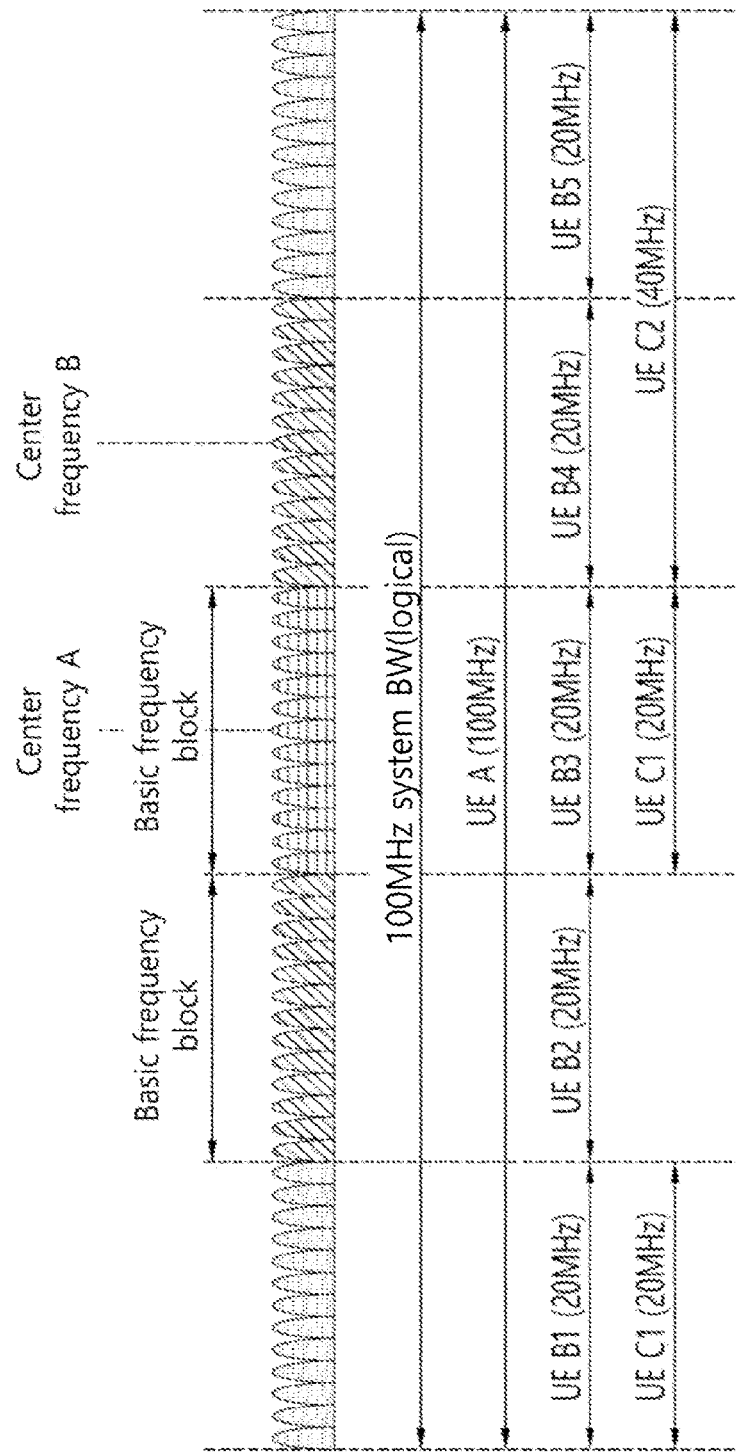
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/ or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1$~$B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
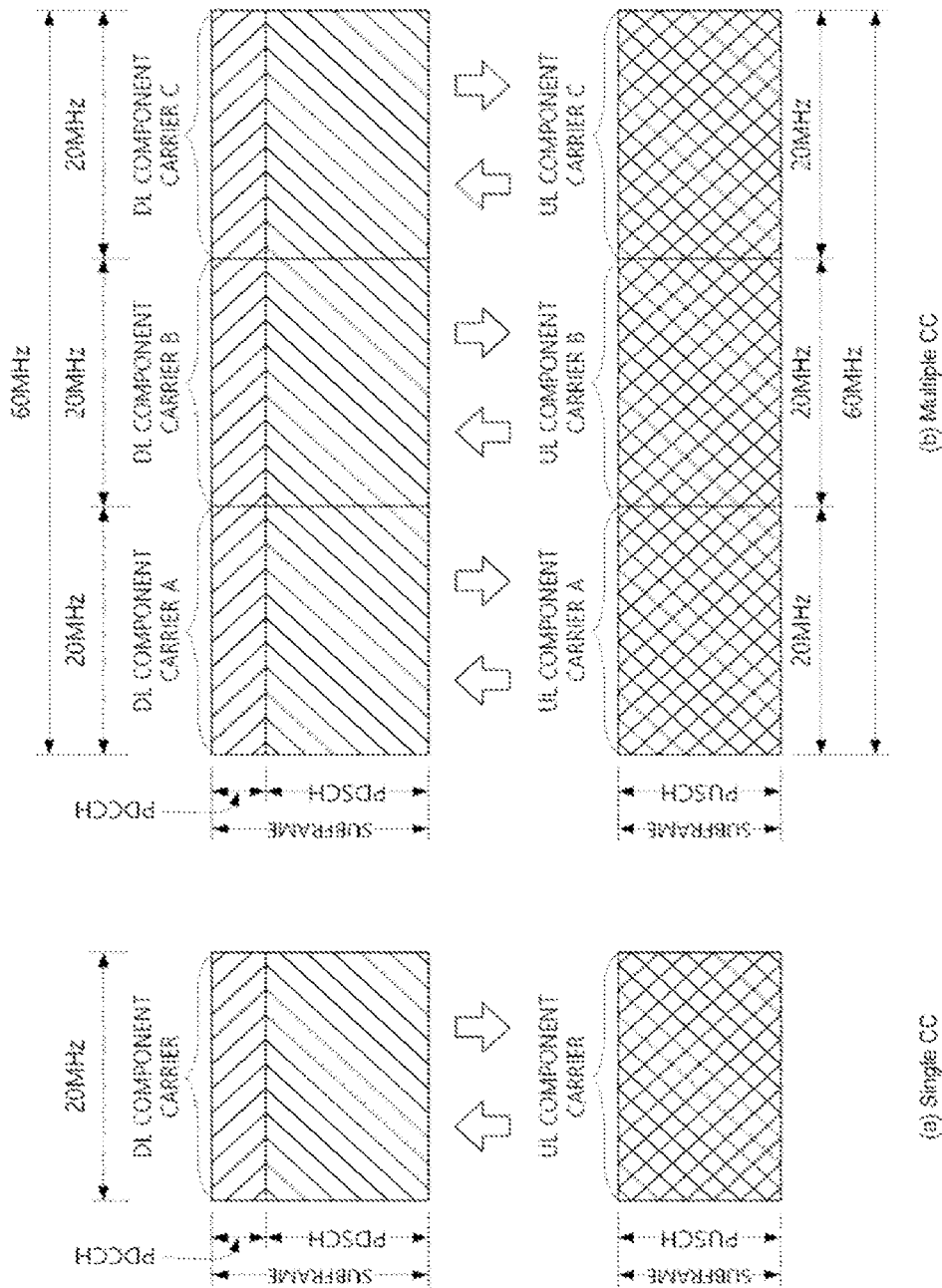
FIG. 9 is a diagram for explaining single carrier communication and multiple carrier communication.

FIG. 9 is a drawing for explaining single carrier communication and multiple carrier communication. Particularly, FIG. 9(a) shows a single carrier subframe structure and FIG. 9(b) shows a multi-carrier subframe structure.

Referring to FIG. 9(a), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time region, and perform data transmission or reception through a UL/DL time unit. Referring to FIG. 9(b), three 20 MHz component carriers (CCs) can be aggregated into each of UL and DL, so that a bandwidth of 60 MHz can be supported. Each CC may be adjacent or non-adjacent to one another in the frequency region. FIG. 9(b) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
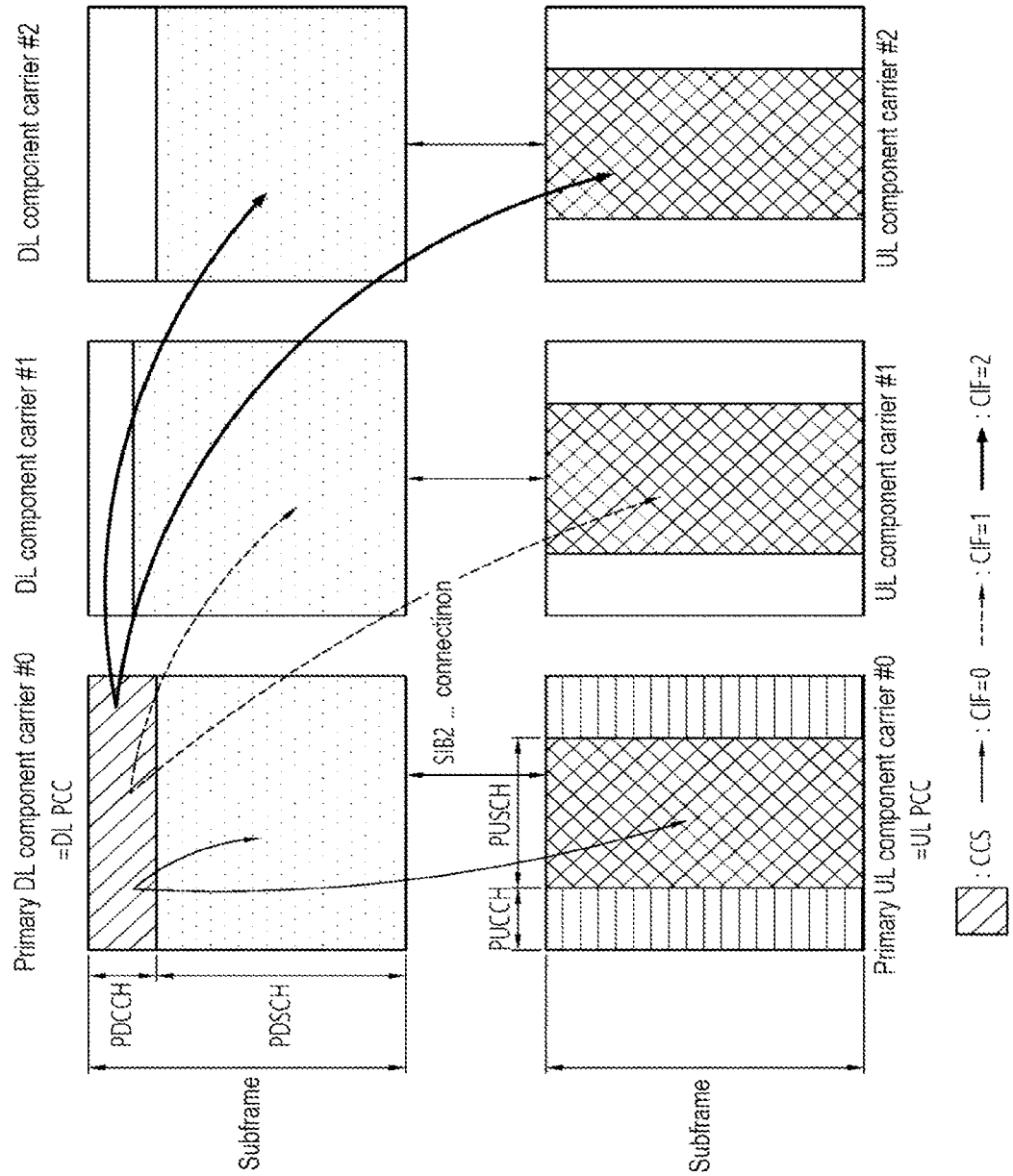
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
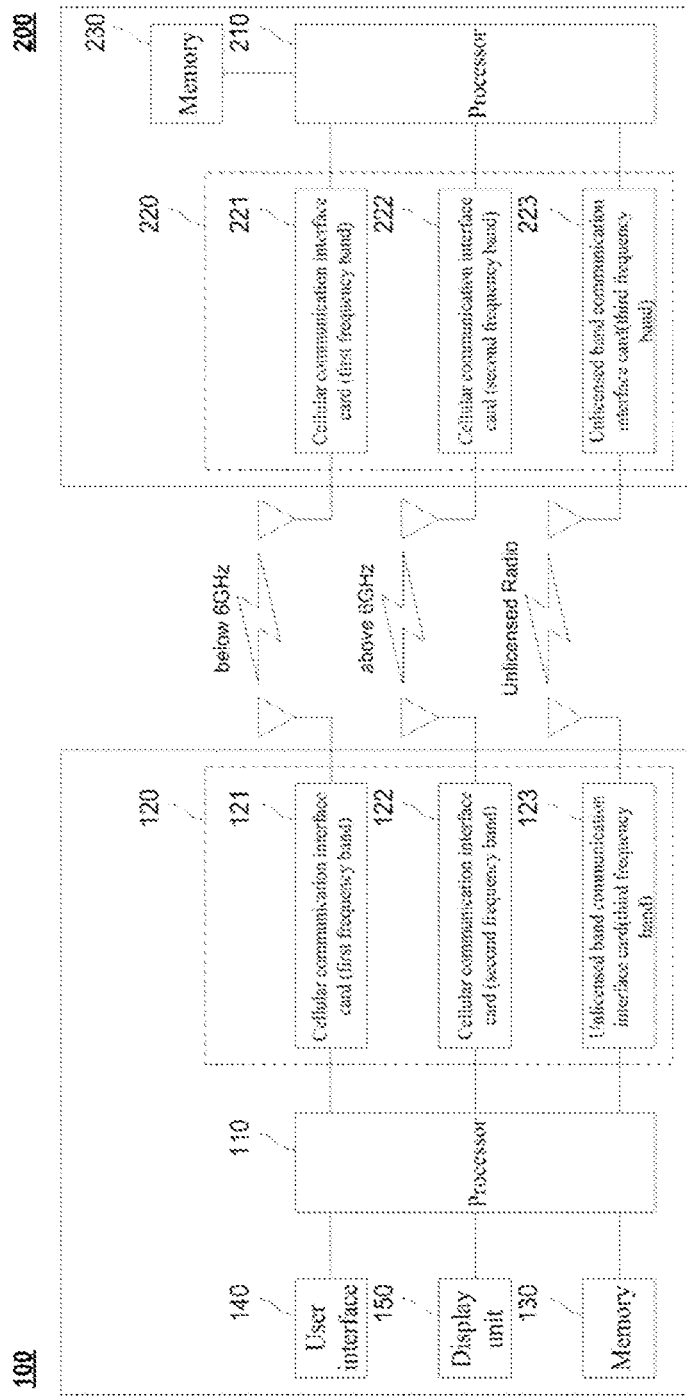
FIG. 11 is a block diagram showing the configurations of a UE and a base station according to an embodiment of the present disclosure.

FIG. 11 is a block diagram showing the configurations of a UE and a base station according to an embodiment of the present disclosure. In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz or 5 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 120 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz or 5 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

Figure 12A:
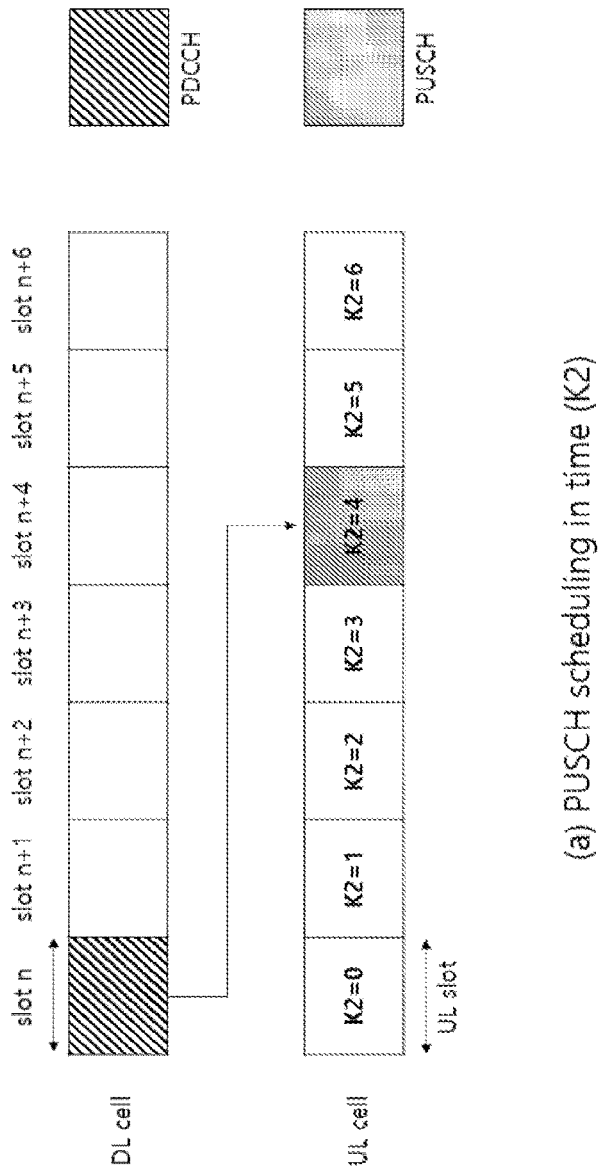
FIGS. 12A and 12B are diagrams illustrating scheduling of a physical uplink shared channel in a time domain.
Figure 12B:
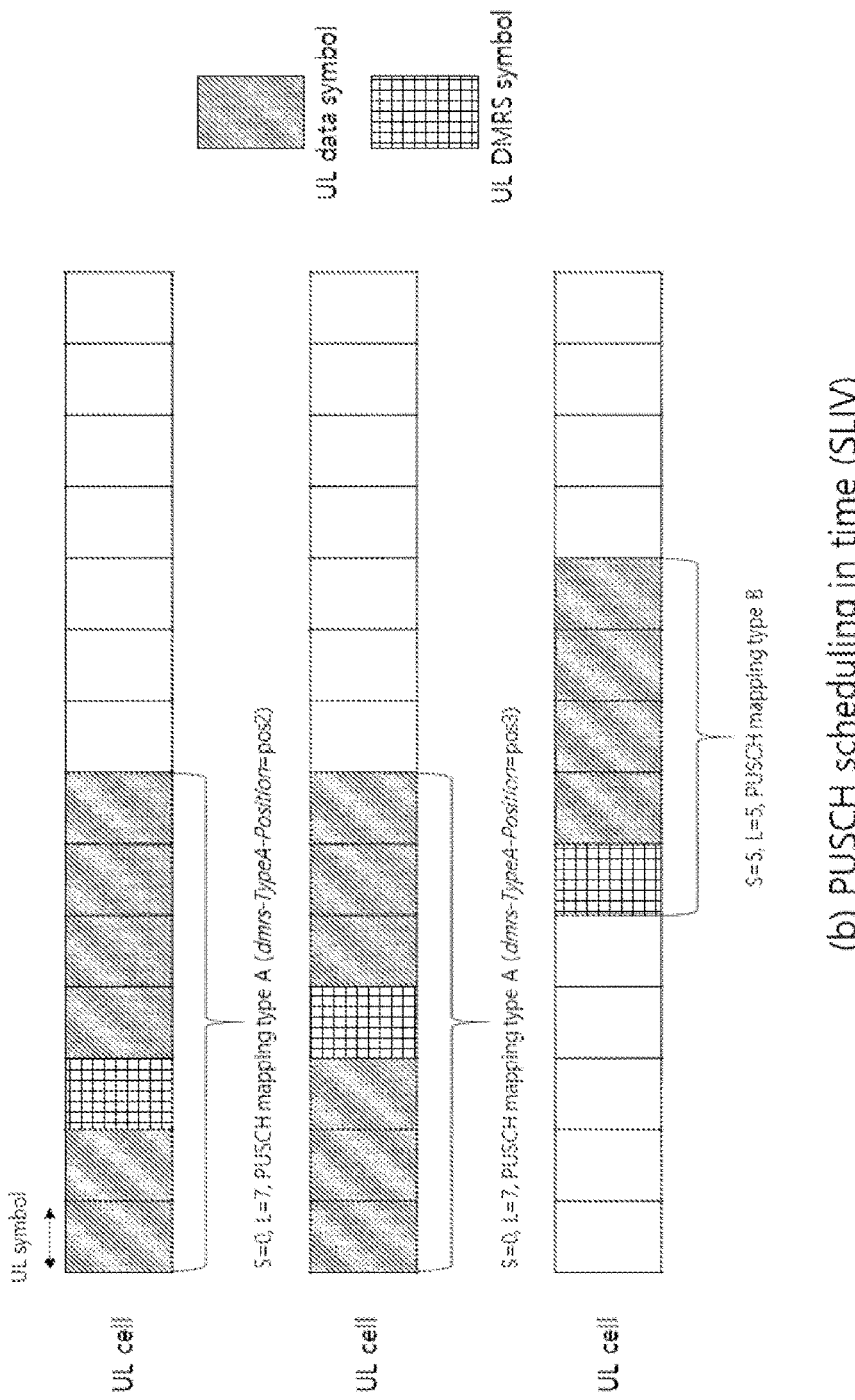
Figure 13:
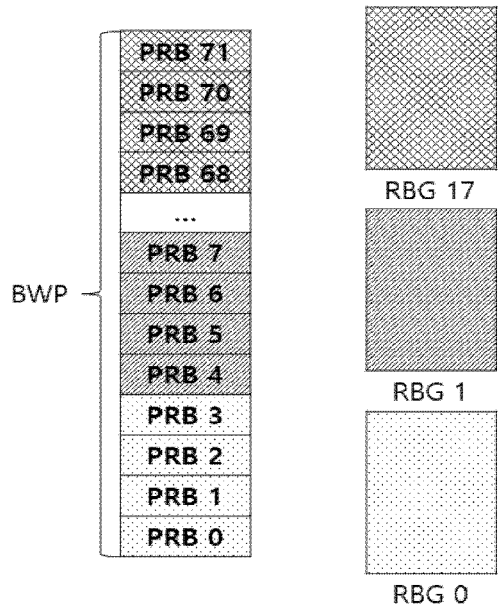
FIG. 13 is a diagram illustrating scheduling of a physical uplink shared channel in a frequency domain.
Figure 13:
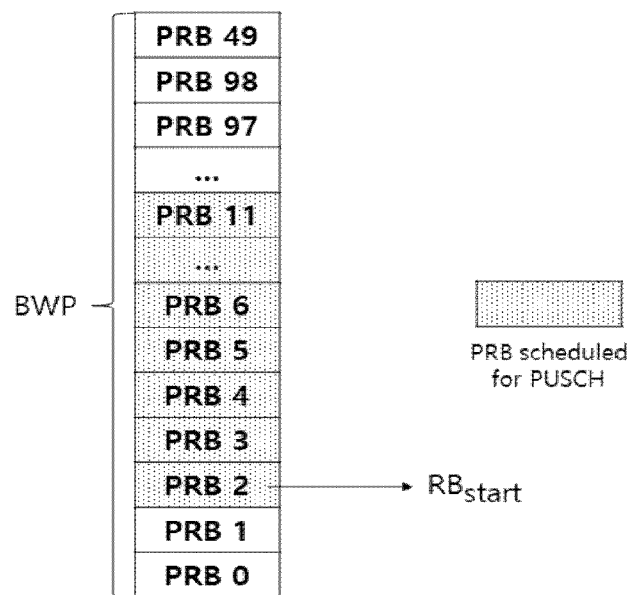

FIGS. 12a and 12b are diagrams illustrating scheduling of a physical uplink shared channel in a time domain, and FIG. 13 is a diagram illustrating scheduling of a physical uplink shared channel in a frequency domain.

A method for transmitting a physical uplink shared channel (PUSCH) by a UE will be described with reference to FIGS. 12a, 12b, and 13.

A UE may transmit uplink data through a physical uplink shared channel. The UE may transmit uplink data by a method for scheduling transmission of a physical uplink shared channel in downlink control information (DCI) transmitted through reception of a physical downlink control channel (PDCCH) (dynamic grant (DG)), or a method for transmitting a physical uplink shared channel according to resources and transmission methods preconfigured from a base station (configured grant (CG)).

The downlink control information (DCI) transmitted by the reception of the UE through the PDCCH may include scheduling information about the PUSCH. The scheduling information may include time domain information (hereinafter time-domain resource assignment (TDRA)) and frequency domain information (frequency-domain resource assignment (FDRA)). The UE may interpret the DCI delivered through reception of the PDCCH based on information about a control resource set and search space, and perform an operation indicated by the DCI. The DCI may include one of DCI Format 0_0, 0_1, or 0_2 for scheduling a physical uplink shared channel (PUSCH).

Time domain information about the PUSCH indicated by the TDRA field in DCI Format 0_0, 0_1, or 0_2 includes the following. K2 is an offset value between a slot in which the PDCCH is received from the base station and a slot in which the UE transmits the PUSCH. A start and length indication value (SLIV) is a joint-coded value of the starting symbol index (S) of the PUSCH and the symbol length (L) of the PUSCH in the slot indicated by K2.

When the UE receives DCI Format 0_0, 0_1, or 0_2 scheduling the PUSCH in a slot n, the UE determines that the slot is a floor $(n*2^{\mu PUSCH}/n*2^{\mu PDCCH})+K2$ slot. Here, μPUSCH and μPDCCH are subcarrier spacings (SCS) of a cell in which the PUSCH is scheduled and a cell receiving the PDCCH, respectively.

For example, referring to FIG. 12a, the subcarrier spacings of the cell in which the PDCCH is received and the cell in which the PUSCH is scheduled are the same, and thus when the UE receives the PDCCH in the slot n and receives an indication that the K2 is a value of 4, for example, the UE determines that the slot in which the PUSCH is scheduled is slot n+K2=n+4.

The physical uplink shared channel transmitted by the UE may apply two mapping types A and B. The SLIV, in which the starting symbol index and symbol length of the PUSCH are jointly encoded, has different value ranges depending on the PUSCH mapping type. In a PUSCH mapping type A, only resource allocation including a DMRS symbol is possible, and the DMRS symbol is located in the third or fourth OFDM symbols of a slot according to a value indicated by a higher layer. That is, for the PUSCH mapping type A, a starting symbol index S of the PUSCH is 0, and a length L of the PUSCH may have one of values from 4 to 14 (up to 12 for an extended CP) depending on the DMRS symbol position. For PUSCH mapping type B, the DMRS symbol is always the first symbol of the PUSCH, so S may have one of values from 0 to 13 (11 for the extended CP) and L may have one of values from 1 to 14 (12 for the extended CP). In addition, since it is not possible for one PUSCH to cross a slot boundary, the values of S and L have to satisfy S+L £14 (12 for the extended CP).

FIG. 12B shows examples of PUSCHs according to PUSCH mapping types. In order from the top, the UE determines that a mapping type A PUSCH in which the third symbol is DMRS symbol, the index S of the starting symbol is 0, and the length L is 7, a mapping type A PUSCH in which the fourth symbol is a DMRS symbol, the index S of the starting symbol is 0, and the length L is 7, and a mapping type B PUSCH in which the first symbol is a DMRS symbol, the index S of the starting symbol is 5, and the length L is 5 are scheduled. The frequency domain information about the PUSCH indicated in the FDRA field in DCI Format 0_0, 0_1, or 0_2 may be divided into two types according to the frequency resource allocation type.

The first type is frequency resource allocation type 0, where a resource block group (RBG) is created by binding a fixed number of PRBs according to the number of RBs included in the BWP configured in the UE, and the UE determines whether to use the RBG by receiving an indication of a bitmap in RBG units. The number of PRBs included in one RBG is configured from a higher layer, and the larger the number of RBs included in the BWP configured in the UE, the more PRBs are configured. For example, referring to FIG. 13A, when the BWP size configured in the UE is 72 PRBs and one RBG is composed of four PRBs, the UE determines 4 PRBs in ascending order from PRB 0 as one RBG. That is, when RBG 0 from PRB 0 to PRB 3, RBG 1 from PRB 4 to PRB 7, and so on are mapped in that order up to RBG 17, 1 bit (0 to 1) for each RBG, a total of 18 bits, is received and a determination is made as to the use of the PRB in the corresponding RBG. At this time, when the bit value is 0, it is determined that the PUSCH is not scheduled in any of the PRBs in the corresponding RBG, and when the bit value is 1, it is determined that the PUSCH is scheduled in all PRBs in the corresponding RBG. Alternatively, the bit values may be reversed.

The second type may be frequency resource allocation type 1, where information on consecutive PRBs allocated according to the size of the initial BWP or active BWP of the UE may be indicated. This information is a resource indication value (RIV) value in which the start index S and length L of consecutive PRBs are jointly encoded. For example, referring to FIG. 13(b), when the BWP size of the UE is 50 PRB and the PUSCH is scheduled from PRB 2 to PRB 11, the start index of consecutive PRBs is 2 and the length is 10. By receiving $RIV=N^{size}_{BWP}*(L-1)+S=50*(10-1)+2=452$, the UE may determine the start index and length of consecutive PRBs on which the PUSCH is scheduled as 2 and 10, respectively.

Only for DCI Format 0_1 or 0_2 for scheduling the PUSCH, the UE may be configured to use only one of two frequency resource allocation types of the PUSCH or dynamically use both types, from a higher layer. When configured to dynamically use two types, the UE may determine which type it is through 1 bit of the most significant bit (MSB) in the FDRA field in DCI Format 0_1 or 0_2 scheduling the PUSCH.

A grant-based uplink shared channel transmission scheme configured to support uplink URLLC transmission or the like (configured grant) is supported, and the scheme is also called grant-free transmission. The configured grant-based uplink transmission scheme is a scheme in which, when the base station configures a resource to be used for uplink transmission to the UE through a higher layer, that is, RRC signaling, the UE transmits the uplink shared channel through the corresponding resource. This scheme may be divided into two types according to possibility of activation or released through DCI.

Type 1: the configured grant-based transmission scheme is a scheme for configuring resources and transmission schemes for pre-configured grant-based transmission in a higher layer.

Type 2: the configured grant-based transmission scheme is a scheme in which grant-based transmission configured in a higher layer is set, and resources and schemes for transmission are indicated by DCI transmitted through a physical downlink control channel.

Since the configured grant-based uplink transmission scheme may support URLLC transmission, it supports repeated transmission in a plurality of slots to ensure high reliability. In this case, a redundancy version (RV) sequence is set to one of $\{0, 0, 0, 0\}$, $\{0, 2, 3, 1\}$, and $\{0, 3, 0, 3\}$, and in the nth repeated transmission, the RV corresponding to mod(n−1, 4)+1th value is used. In addition, a UE configured for repeated transmission may start repeated transmission only in a slot having an RV value of 0. However, when the RV sequence is $\{0, 0, 0, 0\}$ and is repeatedly transmitted in eight slots, repeated transmission may not be started in the 8th slot. The UE ends repeated transmission when the number of repeated transmissions set in the higher layer is reached or when the period is exceeded, or when a UL grant having the same HARQ process ID is received. Here, the UL grant refers to DCI for scheduling a PUSCH.

In order to increase reliability of reception and transmission of the physical uplink shared channel between the base station and the UE in a wireless communication system, the UE may be configured to repeatedly transmit the uplink shared channel from the base station. This will be described with reference to FIGS. 14a and 14b.

Figure 14A:
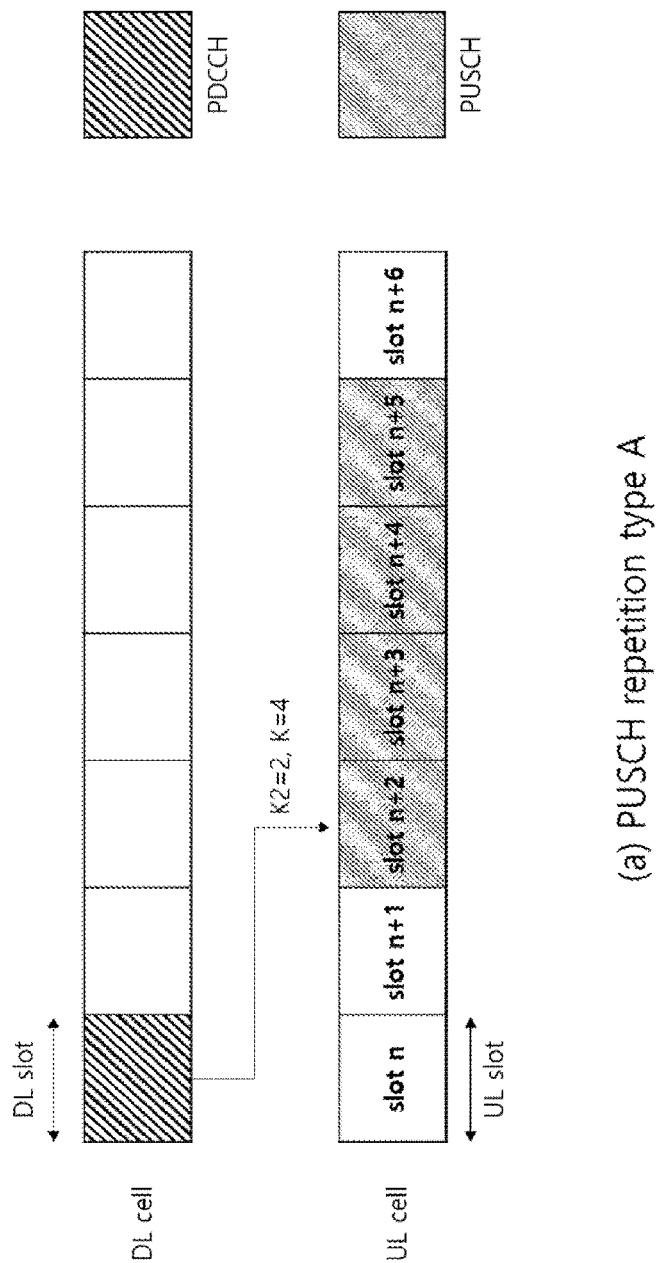
FIGS. 14A and 14B are diagrams illustrating repetition transmission of a physical uplink shared channel according to an example.
Figure 14B:
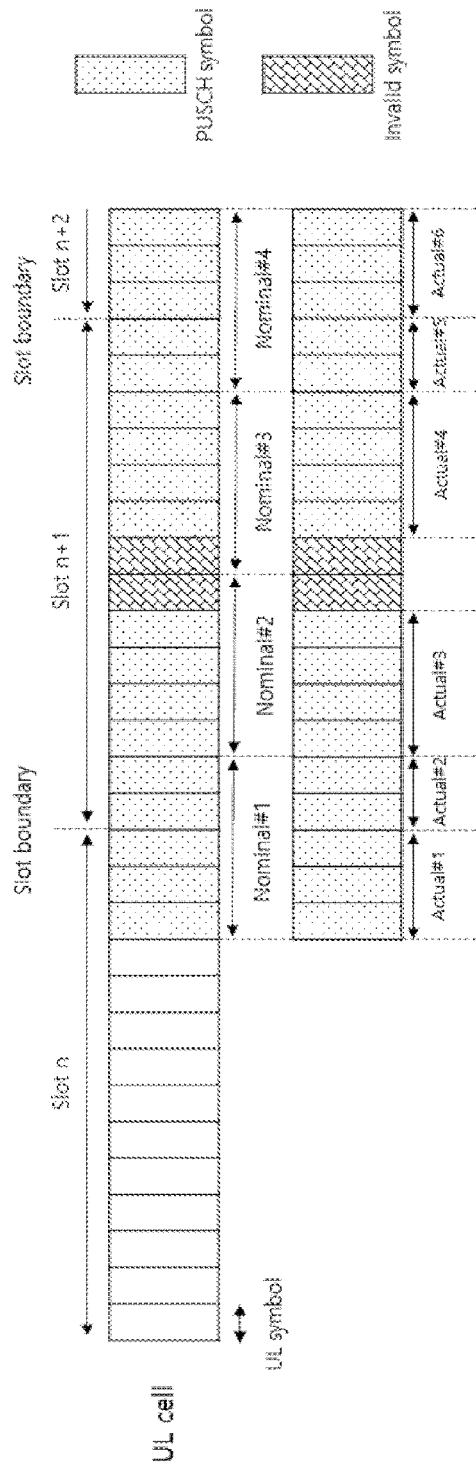

FIGS. 14a and 14b are diagrams illustrating repetition transmission of a physical uplink shared channel according to an example.

Referring to FIGS. 14a and 14b, repeated PUSCH transmission to be transmitted by the UE may be divided into two types.

First, a transmission process of PUSCH repetition transmission type A of the UE is as follows. When the UE receives DCI Format 0_1 or 0_2 from the base station through the PDCCH scheduling the PUSCH, PUSCH repetition transmission is possible in K consecutive slots. Here, the UE may be configured with a K value from a higher layer or receive the K value that has been added to the TDRA field of the DCI. For example, referring to FIG. 14a, assuming that the UE receives a PDCCH scheduling a PUSCH in the slot n and receives, from DCI Format received through the PDCCH, 2 as a K2 value and 4 as a K value, the UE starts transmitting the PUSCH in a slot n+K2, that is, n+2, and the UE repeatedly transmits the PUSCH from a slot n+2 to a slot n+2+K−1, that is, up to n+5. In this case, the time and frequency resources for transmitting the PUSCH in each slot are the same as those indicated by the DCI. That is, the PUSCH may be transmitted in the same symbol and PRB(s) within a slot.

Next, a transmission process of PUSCH repetition transmission type B for supporting repeated transmission of the low-latency PUSCH for the UE to satisfy the requirements of URLLC is as follows. From the base station, the UE may receive an indication of the starting symbol S of the PUSCH and the length L of the PUSCH through the TDRA field. Here, the PUSCH obtained with the indicated starting symbol and length is not a PUSCH that is actually transmitted (actual PUSCH) but a temporarily obtained PUSCH, and is called a nominal PUSCH. In addition, the UE may receive an indication of the nominal number of repetitions N of the indicated nominal PUSCH through the TDRA field. The UE may determine nominal PUSCHs of the nominal number of repetitions N, including the nominal PUSCH indicated through the TDRA field. Here, the length of the nominal PUSCHs of the nominal number of repetitions N is equal to L, and the nominal PUSCHs are continuous on the time axis without separate symbols.

The UE may determine an actual PUSCH from among the nominal PUSCHs. One nominal PUSCH may be determined as one or a plurality of actual PUSCHs. The UE may receive an indication of or be configured with symbols that may not be used in the PUSCH repetition transmission type B, from the base station. This is called an invalid symbol. The UE may exclude the invalid symbol from nominal PUSCHs. As described above, nominal PUSCHs are determined continuously for symbols, but may be discontinuously determined except for invalid symbols. An actual PUSCH may be determined as consecutive symbols in one nominal PUSCH excluding invalid symbols. Here, when consecutive symbols cross the boundary of the slot, the actual PUSCH may be divided and determined based on the boundary.

For reference, the invalid symbol may include at least a DL symbol configured by the base station to the UE.

For example, referring to FIG. 14B, it is assumed that the UE is scheduled for PUSCH transmission with a length of 5 symbols from the 12th OFDM symbol of the first slot (slot n) and receives an instruction to perform the repetition transmission type B four times. The nominal PUSCHs are as follows. A first nominal PUSCH nominal #1 includes symbol (n, 11), symbol (n, 12), symbol (n, 13), symbol (n+1, 0), and symbol (n+1, 1). A second nominal PUSCH nominal #2 includes symbol (n+1, 1), symbol (n+1, 3), symbol (n+1, 4), symbol (n+1, 5), and symbol (n+1, 6). A third nominal PUSCH nominal #3 includes symbol (n+1, 7), symbol (n+1, 8), symbol (n+1, 9), symbol (n+1, 10), and symbol (n+1, 11). A fourth nominal PUSCH nominal #4 includes symbol (n+1, 12), symbol (n+1, 13), symbol (n+2, 0), symbol (n+2, 1), and symbol (n+2, 2). Here, symbol (n,k) represents a symbol k of the slot n. A symbol k index is from 0 to 13 for the normal CP and from 0 to 11 for the extended CP.

It is assumed that the invalid symbol is configured or indicated in symbol 6 and symbol 7 of a slot n+1. According to invalid symbols configured or indicated by the base station, the last symbol of the second nominal PUSCH nominal #2 is excluded, and the first symbol of the third nominal PUSCH nominal #3 is excluded.

The first nominal PUSCH nominal #1 is divided into two actual PUSCHs actual #1 and actual #2 by a slot boundary. The second nominal PUSCH nominal #2 and the third nominal PUSCH nominal #3 form actual PUSCHs actual #3 and actual #4 formed by combining consecutive symbols excluding an invalid symbol, respectively. Finally, the fourth nominal PUSCH nominal #4 is divided into two actual PUSCHs actual #5 and actual #6 by a slot boundary. The UE finally transmits actual PUSCHs.

One actual PUSCH has to include at least one DMRS symbol, and when PUSCH repetition transmission type B is configured, the actual PUSCH having a total length of one symbol may be omitted without being transmitted. This is because information other than DMRS may not be transmitted in the case of the actual PUSCH with one symbol.

In order to obtain a diversity gain in the frequency domain, frequency hopping may be configured for the UE.

In the case of the PUSCH repetition transmission type A, any one of intra-slot frequency hopping, which performs frequency hopping within a slot, or inter-slot frequency hopping, which performs frequency hopping for each slot may be configured in the UE as frequency hopping. When intra-slot frequency hopping is configured in the UE, the UE divides the PUSCH in half in the time domain in the slot for transmitting the PUSCH, transmits half of the PUSCH in a scheduled PRB, and transmits the other half in a PRB obtained by adding an offset value to the scheduled PRB. In this case, two or four offset values are set according to an active BWP size through a higher layer, and one of the values may be indicated to the UE through the DCI. When the inter-slot frequency hopping is configured in the UE, the PUSCH is transmitted in a PRB scheduled in a slot having an even slot index, and the PUSCH is transmitted in a PRB obtained by adding an offset value to a PRB scheduled in an odd slot.

In the case of the PUSCH repetition transmission type B, as frequency hopping, any one of inter-repetition frequency hopping, which performs frequency hopping at a nominal PUSCH boundary, and inter-slot frequency hopping, which performs frequency hopping every slot, may be configured. When the inter-repetition frequency hopping is configured in the UE, the UE transmits the actual PUSCH(s) corresponding to the odd-numbered nominal PUSCH(s) in the scheduled PRB, and transmits the actual PUSCH(s) corresponding to the even-numbered nominal PUSCH(s) in the PRB obtained by adding the offset value to the scheduled PRB. In this case, two or four offset values are set according to an active BWP size through a higher layer, and one of the values may be indicated to the UE through the DCI. When the inter-slot frequency hopping is configured in the UE, the actual PUSCH of the slot having an even slot index transmits the PUSCH in the scheduled PRB, and the actual PUSCH of an odd-numbered slot transmits the PUSCH in the PRB obtained by adding the offset value to the scheduled PRB.

When the UE performs PUSCH repetition transmission, if a symbol scheduled for PUSCH transmission in a specific slot overlaps with a semi-persistently configured DL symbol or a symbol position set for reception of an SS/PBCH block, the UE does not transmit the overlapping PUSCH in the corresponding slot, and does not postpone transmission to the next slot.

Hereinafter, a method for transmitting a physical uplink control channel (PUCCH) by a UE will be described with reference to FIG. 15.

Figure 15:
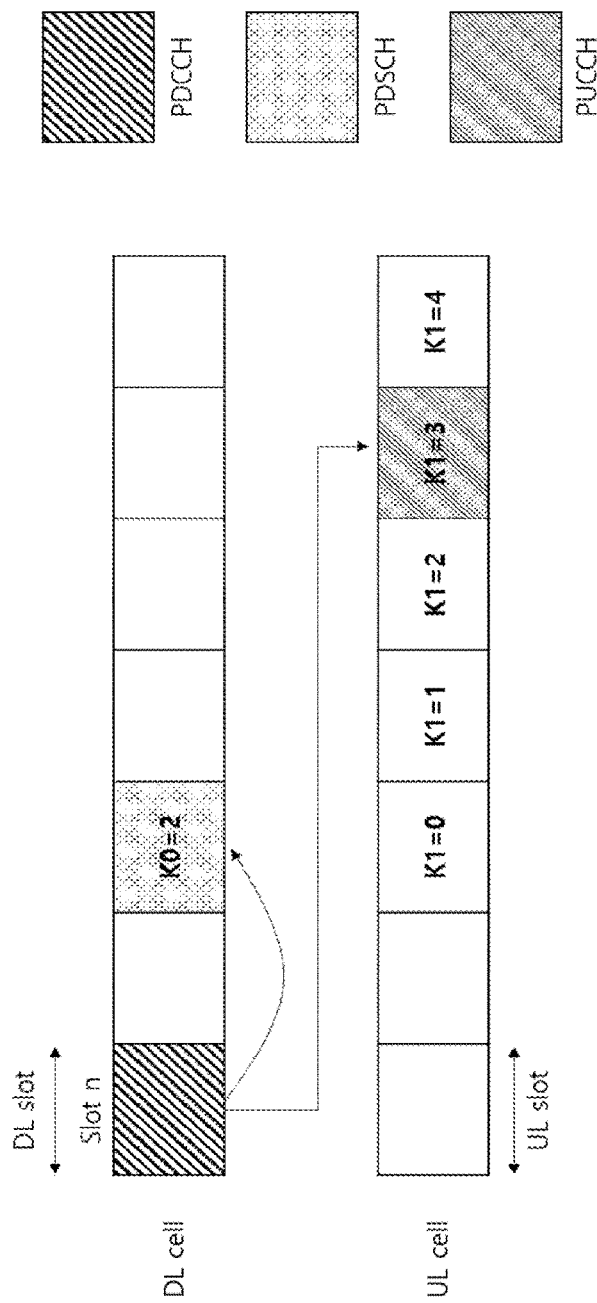
FIG. 15 is a diagram illustrating scheduling of a physical uplink control channel.

FIG. 15 is a diagram illustrating scheduling of a physical uplink control channel.

Referring to FIG. 15, when the UE receives DCI Format 1_0, 1_1, or 1_2 for scheduling the physical uplink control channel, the UE has to transmit the scheduled uplink control channel. The physical uplink control channel may include uplink control information (UCI), and the UCI may include HARQ-ACK, SR, and CSI information. The HARQ-ACK information may be HARQ-ACK information on whether reception of two types of channels is successful. As a first type, when the physical downlink shared channel (PDSCH) is scheduled through DCI Format 1_0, 1_1, or 1_2, the information may be a HARQ-ACK regarding whether reception of the physical downlink shared channel (PDSCH) is successful. As a second type, when DCI Format 1_0, 1_1, or 1_2 is DCI indicating release of the semi-persistent physical downlink shared channel (SPS PDSCH), the information may be a HARQ-ACK regarding whether reception of DCI Format 1_0, 1_1, or 1_2 is successful.

In order to transmit the PUCCH carrying the HARQ-ACK, a PDSCH-to-HARQ_feedback timing indicator field included in the DCI Format 1_0, 1_1, or 1_2 may indicate a K1 value, which is a value for information on a slot in which the scheduled uplink control channel is to be transmitted. Here, the K1 value may be a non-negative integer value. The K1 value of DCI Format 1_0 may indicate one of {0, 1, 2, 3, 4, 5, 6, 7}. The K1 value that may be indicated in DCI Format 1_1 or 1_2 may be configured or set from the higher layer.

The UE may determine a slot for transmitting the uplink control channel including the first type of HARQ-ACK information as follows. The UE may determine an uplink slot overlapping with the last symbol of a physical downlink shared channel (PDSCH) corresponding to the HARQ-ACK information. When the index of the uplink slot is m, an uplink slot in which the UE transmits the physical uplink control channel including the HARQ-ACK information may be m+K1. Here, the index of the uplink slot is a value according to a subcarrier spacing of the uplink BWP through which the uplink control channel is transmitted.

For reference, when the UE is configured for downlink slot aggregation, the ending symbol represents the last symbol of the PDSCH scheduled in the last slot among slots in which the physical downlink shared channel (PDSCH) is received.

Referring to FIG. 15, it is assumed that the subcarrier spacing of the DL BWP in which the PDCCH is received, the subcarrier spacing of the DL BWP in which the PDSCH is scheduled, and the subcarrier spacing of the UL BWP in which the PUCCH is transmitted are the same. It is assumed that the UE receives the PDCCH scheduling the PDSCH and the PUCCH from the base station in the slot n, and that K0=2 and K1=3 which are indicated by DCI transmitted by the PDCCH. When reception of the last symbol of the PDSCH is completed in slot n+K0, that is, n+2, the UE has to transmit a HARQ-ACK of the corresponding PDSCH through the PUCCH in the slot n+2+K1, that is, n+5.

In order to secure wide coverage in the NR system, the UE may be configured to repeatedly transmit a long PUCCH (PUCCH format 1, 3, or 4) in two, four, or eight slots. When the UE is configured to repeatedly transmit the PUCCH, the same UCI is repeatedly transmitted every slot. This will be described with reference to FIG. 16.

Figure 16:
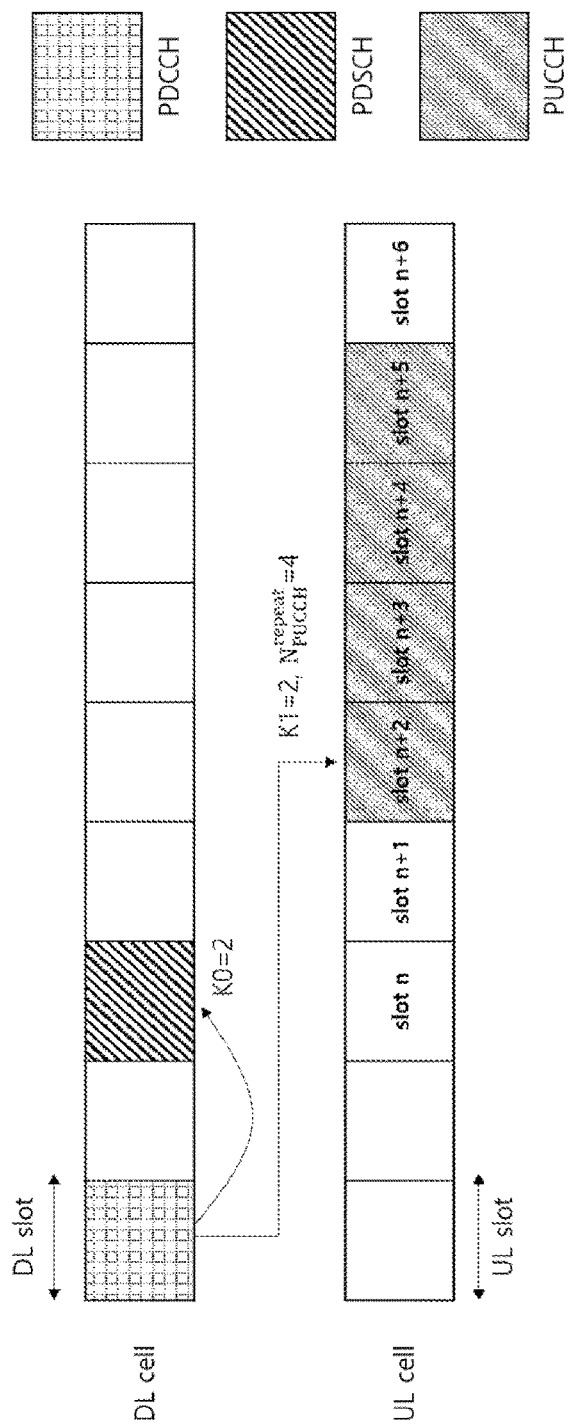
FIG. 16 is a diagram illustrating repetition transmission of a physical uplink control channel.

FIG. 16 is a diagram illustrating repetition transmission of a physical uplink control channel.

Referring to FIG. 16, when PDSCH reception ends in the slot n and K1=2, the UE transmits the PUCCH in a slot n+K1, that is, n+2. At this time, when the number of PUSCH repetition transmissions is configured and set as $N^{repeat}_{PUCCH}=4$ for the UE, the PUCCH is repeatedly transmitted from the slot n+2 to the slot n+5. The symbol configuration of repeatedly transmitted PUCCHs is the same. That is, repeatedly transmitted PUCCHs start from the same symbol in each slot and consist of the same number of symbols.

In order to obtain a diversity gain in the frequency domain, frequency hopping may be configured for the UE. As the frequency hopping, intra-slot frequency hopping that performs frequency hopping within a slot and inter-slot frequency hopping that performs frequency hopping for each slot may be configured. When intra-slot frequency hopping is configured in the UE, the UE divides the PUSCH in half in the time domain in the slot for transmitting the PUCCH, transmits half of the PUSCH in a first PRB, and transmits the other half in a scheduled second PRB. In this case, the first PRB and the second PRB may be configured in the UE through a higher layer for configuring PUCCH resources. When inter-slot frequency hopping is configured in the UE, the PUCCH is transmitted in the first PRB in a slot having an even slot index, and the PUCCH is transmitted in the second PRB in a slot having an odd slot index.

When the UE performs PUCCH repetition transmission, the UE does not transmit the PUCCH in a specific slot and postpones transmission to the next slot when a symbol for PUCCH transmission overlaps with a semi-persistently configured DL symbol or a symbol position set for reception of an SS/PBCH block in the corresponding slot, and transmits the PUCCH when the symbol for PUCCH does not overlap with the semi-persistently configured DL symbol or the symbol position set for reception of the SS/PBCH block in the corresponding slot.

I. Dynamic PUCCH Carrier Switching and PUCCH Repetition

The present embodiment relates to a method for dynamically configuring PUCCH carrier switching for a UE and PUCCH repetition transmission.

The UE may be configured with a plurality of uplink cells from a base station. If a plurality of uplink cells are configured in the UE, it is called "carrier aggregation (UL CA)." In UL CA, the UE may be assigned one cell among a plurality of uplink cells for PUCCH transmission. A cell transmitting the PUCCH is referred to as a PUCCH cell or Pcell. The UE is able to transmit the PUCCH in the Pcell and is not able to transmit the PUCCH in other cells. For reference, the PUCCH may be transmitted in one cell of a PUCCH group, that is, Pcell, PScell or PUCCH_Scell. Therefore, in the following description, Pcell may be replaced with PScell or PUCCH_Scell, and a plurality of uplink cells refer to uplink cells in a PUCCH group including Pcell/PScell/PUCCH_Scell.

The Pcell of the UE may not be able to transmit the PUCCH for various reasons. For example, when a downlink symbol is configured in the Pcell, a PUCCH overlapping with the downlink symbol may not be transmitted. When the base station uses the resource of the Pcell for other uplink transmission (e.g., PUSCH, PUCCH, or the like, of another UE), the Pcell may not transmit the PUCCH in the Pcell due to lack of resources.

In order to solve the problem that PUCCH is difficult to transmit in the Pcell, the base station may configure dynamic PUCCH carrier switching for the UE. Dynamic PUCCH carrier switching refers to a method for changing a cell to which a PUCCH is to be transmitted among a plurality of uplink cells in a UL CA situation. Specifically, dynamic PUCCH carrier switching may be configured as follows. Hereinafter, among a plurality of cells, a serving cell on which a PUCCH is to be transmitted is referred to as a PUCCH serving cell.

The base station may configure the index of a cell to be used as a PUCCH serving cell among a plurality of cells for the UE through an RRC signal. Parameters configured through the RRC signal may include an index sequence of a PUCCH serving cell, in which indices of a cell used as the PUCCH serving cell among a plurality of cells are collected, and a period and an offset to which the index sequence is applied. The index sequence of the cell is a set of indices and may be provided in a bitmap format. The index sequence, period and offset may be interpreted as follows.

For reference, offset is not configured unless otherwise specified throughout the present specification. When the offset is not configured, the index sequence of the PUCCH serving cell is applied from the first slot of the frame.

(First method) The period and offset of the index sequence of the PUCCH serving cell may be given in units of ms. For example, when the period of the index sequence of the PUCCH serving cell is given as 4 and the offset is given as 1, the UE may have a period of 4 ms of the index sequence of the PUCCH serving cell and apply the period after 1 ms from the frame boundary. Here, the length of the index sequence of the PUCCH serving cell (that is, the number of indices included) may be equal to the number of slots in the period. When the period is referred to as P, the number of slots in the period is given by $P*2^{mu}$. Here, mu is a subcarrier spacing configuration. Here, the number of slots in the period may vary depending on the subcarrier spacing. Therefore, considering a case where a plurality of cells have different subcarrier spacings, the length of the index sequence of the PUCCH serving cell according to a given period P (that is, the number of indices included) may be determined as follows.

(Embodiment 1 of Length of Index Sequence) The length of the index sequence may be equal to the number of slots of the cell having the lowest subcarrier spacing in the period. Here, the reason why the lowest subcarrier spacing is used is that the change of PUCCH serving cell may be prevented in the middle of the slot because the slot length of the cell having the lowest subcarrier spacing is longest. For example, it is assumed that the first cell is 15 kHz and the second cell is 30 kHz. The UE may select 15 kHz (mu=0), which is the lowest subcarrier spacing, according to the present embodiment. Therefore, the length of the index sequence of the PUCCH serving cell is $P*2^{mu}=P$. Here, each index of the index sequence of the PUCCH serving cell corresponds to the length of one slot of the selected cell having the lowest subcarrier spacing. That is, each index of the index sequence of the PUCCH serving cell corresponds to the length (1 ms) of one slot, which is a subcarrier spacing of 15 kHz.

(Embodiment 2 of Length of Index Sequence) The length of the index sequence may be equal to the number of slots of the cell having the highest subcarrier spacing in the period. Here, the reason why the highest subcarrier spacing is used is that the PUCCH serving cell may be changed in the shortest unit because the slot length of the cell having the highest subcarrier spacing is shortest. For example, it is assumed that the first cell is 15 kHz and the second cell is 30 kHz. The UE may select 30 kHz (mu=1), which is the highest subcarrier spacing, according to the present embodiment. Therefore, the length of the index sequence is $P*2^{mu}=P*2$. Here, each value of the index sequence corresponds to one slot of a cell having the selected highest subcarrier spacing. That is, each index of the index sequence of the PUCCH serving cell corresponds to the length (0.5 ms) of one slot, which is a subcarrier spacing of 30 kHz.

(Embodiment 3 of Length of Index Sequence) for a frequency range 1 (FR1), the length of the index sequence may be equal to the number of slots of the cell having the subcarrier spacing of 15 kHz in the period. For a frequency range 2 (FR2), the length may be equal to the number of slots of cells having the subcarrier spacing of 60 kHz in the period. That is, among subcarrier spacings capable of uplink transmission in each frequency range (FR), the lowest subcarrier spacing may be used. Using the subcarrier spacing of 15 kHz in the FR1 is equivalent to changing the PUCCH serving cell every 1 ms since the length of the slot is 1 ms. That is, the PUCCH serving cell may be changed every 1 ms according to the index sequence of the PUCCH serving cell. This is independent of the subcarrier spacing set for the cell.

The length of the index sequence may be equal to the number of slots of a specific cell in the period. Here, the specific cell may be a Pcell when dynamic PUCCH carrier switching is not configured. Here, the specific cell may be a cell having the lowest cell index among a plurality of cells. In this way, the length may be interpreted by the operation based on one specific cell. The length of the index sequence may be determined using a subcarrier spacing of one specific cell.

(Method for Configuring Period) In the first method described above, the UE is configured with the period and offset in ms units through an RRC signal from the base station. However, even if the UE is not configured with a separate period and offset through the RRC signal from the base station, the UE may infer the period and offset from other parameters configured for the UE itself. Specific methods therefor are disclosed.

As an example, the UE may determine the period and offset based on the TDD configuration of each TDD cell.

The UE may receive the TDD configuration of each TDD cell from the base station. More specifically, the UE may receive tdd-UL-DL-ConfigurationCommon for setting a cell common TDD configuration through a system information block 1 (SIB1) or RRC parameter ServingCellConfigCommon. The UE may know a period and a reference subcarrier spacing to which the TDD configuration may be applied in each TDD cell, through the tdd-UL-DL-ConfigurationCommon. Here, the reference subcarrier spacing may be obtained from referenceSubcarrierSpacing, which is an RRC parameter. TDD configuration provided by tdd-UL-DL-ConfigurationCommon may include up to two TDD patterns and each pattern may include its period. Accordingly, when a maximum of two TDD patterns are configured in one TDD cell for the UE, the period of the TDD configuration is the sum of the period of the first pattern and the period of the second pattern. For reference, the period set in the TDD configuration (configured by tdd-UL-DL-Configuration-Common) (hereafter, P is the period set in the TDDD configuration (configured by tdd-UL-DL-Configuration-Common), which is the period in ms units) is set in units of ms. In addition, 20/P may set only P values that satisfy integers. The P value may be at least one of 0.5 ms, 0.625 ms, 1 ms, 1.25 ms, 2 ms, 2.5 ms, 5 ms, and 10 ms. The number of slots according to the reference subcarrier spacing is $S=P*2^{mu\_ref}$. Here, mu_ref is the reference subcarrier spacing configuration. (for reference, the reference subcarrier spacing is $15 kHz*2^{mu\_ref}$).

The UE may be independently and individually configured with the TDD configuration for each TDD cell. That is, the period according to the TDD configuration may be different for each cell. In this case, a period of an RRC signal related to an index of a cell to be used as the PUCCH serving cell among a plurality of cells may be determined as follows.

As an example, the UE may use the period P value of the TDD configuration of a specific cell as the period of the RRC signal for the cell to be used as the PUCCH serving cell. That is, the UE may repeatedly apply the index sequence of the PUCCH serving cell among a plurality of cells for each TDD configuration period of the specific cell. For reference, the length of the index sequence of the PUCCH serving cell among a plurality of cells may be equal to $P*2^{mu\_ref}$. Here, mu_ref is a reference subcarrier spacing of the TDD configuration of the specific cell.

In one aspect, the specific cell may be a Pcell. That is, the UE may use a period P_pcell value of the TDD configuration of the Pcell as the period of the RRC signal for the cell to be used as the PUCCH serving cell among a plurality of cells. That is, the UE may repeatedly apply the index sequence of the PUCCH serving cell among a plurality of cells for each TDD configuration period of the Pcell. For reference, the length of the index sequence of the PUCCH serving cell among a plurality of cells may be equal to $P\_pcell*2^{mu\_ref\_pcell}$. Here, mu_ref_pcell is a reference subcarrier spacing of the TDD configuration of the Pcell.

In another aspect, the specific cell may be determined according to the subcarrier spacing.

In still another aspect, the specific cell may be a cell having the lowest subcarrier spacing. That is, the UE may use a period P_low value of the TDD configuration of the cell having the lowest subcarrier spacing as the period of the RRC signal for the cell to be used as the PUCCH serving cell among a plurality of cells. That is, the UE may repeatedly apply the index sequence of the PUCCH serving cell among a plurality of cells for each TDD configuration period of the cell having the lowest subcarrier spacing. For reference, the length of the index sequence of the PUCCH serving cell among a plurality of cells may be equal to $P\_low*2^{mu\_ref\_low}$. Here, mu_ref_low is a reference subcarrier spacing of the TDD configuration of the cell having the lowest subcarrier spacing. For reference, when there are a plurality of cells having the lowest subcarrier spacing and a plurality of periods of the TDD configuration of the cells, one period may be selected from among the periods.

In another aspect, the specific cell may be a cell having the highest subcarrier spacing. That is, the UE may use a period P_high value of the TDD configuration of the cell having the highest subcarrier spacing as the period of the RRC signal for the cell to be used as the PUCCH serving cell among a plurality of cells. That is, the UE may repeatedly apply the index sequence of the PUCCH serving cell among a plurality of cells for each TDD configuration period of the cell having the highest subcarrier spacing. For reference, the length of the index sequence of the PUCCH serving cell among a plurality of cells may be equal to $P\_high*2^{mu\_ref\_high}$. Here, mu_ref_high is a reference subcarrier spacing of the TDD configuration of the cell having the highest subcarrier spacing. For reference, when there are a plurality of cells having the highest subcarrier spacing and a plurality of periods of the TDD configuration of the cells, one period may be selected from among the periods.

In still another aspect, the specific cell may be determined according to the period of the TDD configuration.

In still another aspect, the specific cell may be a cell having the longest period. That is, the UE may use a period P_long value of the cell having the longest period in the TDD configurations of cells, as the period of the RRC signal for the cell to be used as the PUCCH serving cell among a plurality of cells. That is, the UE may repeatedly apply the index sequence of the PUCCH serving cell among a plurality of cells for each TDD configuration period of the cell having the longest period. For reference, the length of the index sequence of the PUCCH serving cell among a plurality of cells may be equal to $P\_long*2^{mu\_ref\_long}$. Here, mu_ref_long is a reference subcarrier spacing of the TDD configuration of the cell having the longest period.

In still another aspect, the specific cell may be a cell having the shortest period. That is, the UE may use a period P_short value of the cell having the shortest period in the TDD configurations of cells, as the period of the RRC signal for the cell to be used as the PUCCH serving cell among a plurality of cells. That is, the UE may repeatedly apply the index sequence of the PUCCH serving cell among a plurality of cells for each TDD configuration period of the cell having the shortest period. For reference, the length of the index sequence of the PUCCH serving cell among a plurality of cells may be equal to $P\_short*2^{mu\_ref\_short}$. Here, mu_ref_short is a reference subcarrier spacing of the TDD configuration of the cell having the shortest period.

As another example, the period of the RRC signal for a cell to be used as the PUCCH serving cell may be determined based on a combination of period P values of TDD configurations of cells. That is, the UE may use a combination of the period P values of the TDD configurations of cells as the period of the RRC signal for the cell to be used as the PUCCH serving cell. The UE may have periods P_1, P_2, ..., and P_N according to the TDD configuration for each TDD cell. The UE may determine the period of the RRC signal for the cell to be used as the PUCCH serving cell based on a least common multiple value of the periods. That is, the period of the RRC signal for the cell to be used as the PUCCH serving cell may be the least common multiple of P_1, P_2, ..., and P_N. Let the value of this least common multiple be P_1cm. The UE may repeatedly apply the index sequence of the PUCCH serving cell among the plurality of cells every P_1cm ms. For reference, the length of the index sequence of the PUCCH serving cell among a plurality of cells may be equal to P_1cm*2^mu_ref_1cm. Here, mu_ref_1cm may be determined according to the smallest value or largest value among reference subcarrier spacings of the TDD configuration of each TDD cell, or the value of the reference subcarrier spacing of the TDD configuration of the Pcell.

For example, it is assumed that the period is 1 ms and the reference subcarrier spacing is 60 kHz for the first cell, the period is 2 ms and the reference subcarrier spacing is 30 kHz for the second cell, and the period is 5 ms and the reference subcarrier spacing is 15 kHz for the third cell. The UE may determine the least common multiple of 1 ms, 2 ms, and 5 ms, P_1cm=10 ms, as the period of the RRC signal for the cell to be used as the PUCCH serving cell. Further, mu_ref_1cm=1 may be determined according to 15 kHz, which is the lowest subcarrier spacing among reference subcarrier spacings of the cells. Accordingly, the length of the index sequence of the PUCCH serving cell may be P_1cm*2^mu_ref_1cm=10*2^0=10. That is, each index indicates the index of a cell to be used as the PUCCH serving cell within the length of one slot of 15 kHz (that is, 1 ms).

As another example, the UE may determine the period of the RRC signal for the cell to be used as the PUCCH serving cell by fixing the period to 20 ms. For reference, a period P according to the TDD configuration of each TDD cell satisfies a condition that 20/P is an integer. Therefore, 20 ms is an integer multiple of the period according to the TDD configuration of each TDD cell. The UE may repeatedly apply the index sequence of the PUCCH serving cell among the plurality of cells every 20 ms. For reference, the length of the index sequence of the PUCCH serving cell among the plurality of cells may be equal to 20*2^mu_ref_1cm. Here, mu_ref_1cm may be determined according to the smallest value or largest value among reference subcarrier spacings of the TDD configuration of each TDD cell, or the value of the reference subcarrier spacing of the TDD configuration of the Pcell.

For example, it is assumed that the period is 1 ms and the reference subcarrier spacing is 60 kHz for the first cell, the period is 2 ms and the reference subcarrier spacing is 30 kHz for the second cell, and the period is 5 ms and the reference subcarrier spacing is 15 kHz for the third cell. In this case, the UE may determine 20 ms as the period of the RRC signal for the cell to be used as the PUCCH serving cell. Further, mu_ref_1cm=1 may be determined according to 15 kHz, which is the lowest subcarrier spacing among reference subcarrier spacings of the cells. Accordingly, the length of the index sequence of the PUCCH serving cell may be 20*2^mu_ref_1cm=20*2^0=20. That is, each index indicates the index of a cell to be used as the PUCCH serving cell within the length of one slot of 15 kHz (that is, 1 ms).

The present embodiment will be described in more detail with reference to FIGS. 17 to 19 hereinafter.

Figure 17:
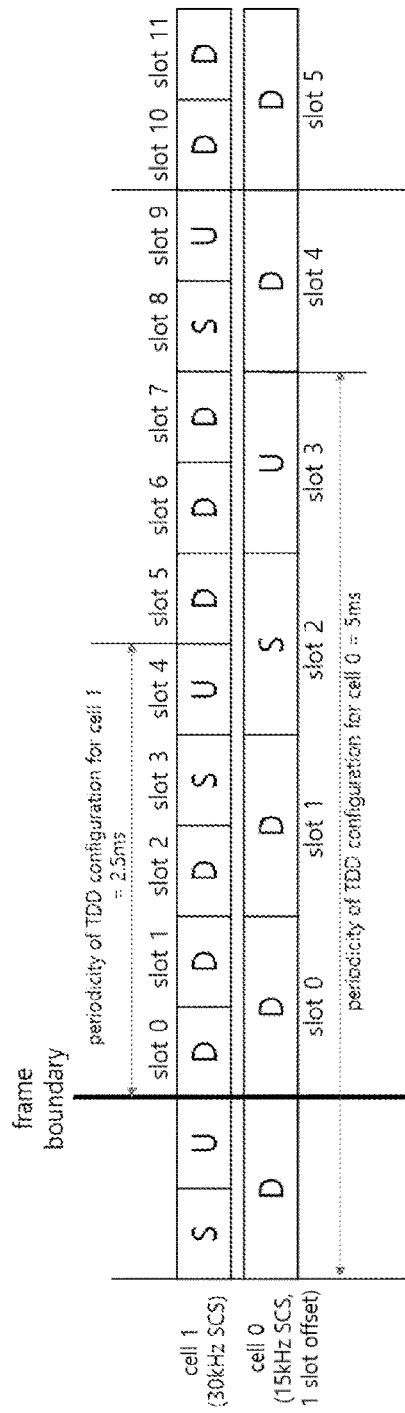
FIG. 17 is a diagram illustrating a situation in which two cells capable of uplink transmission are configured for a UE according to an example.

FIG. 17 is a diagram illustrating a situation in which two cells capable of uplink transmission are configured for a UE according to an example.

Referring to FIG. 17, two cells capable of uplink transmission, cell 0 and cell 1, are configured for the UE.

Cell 0 has a subcarrier spacing of 15 kHz and a period of 5 ms according to the TDD configuration. More specifically, there are five slots in which the subcarrier spacing of 5 ms is 15 kHz, and the first three of the five slots are DL slots, the next slot is an S slot, and the last slot is a UL slot. Here, the DL slot is a slot including only DL symbols, the UL slot is a slot including only UL symbols, and the S slot is a slot including at least one flexible symbol. $N_{symbol}$ symbols of the S slot may be composed of A DL symbols in the front, B UL symbols in the back, and $N_{symbol}$-(A+B) flexible symbols between the DL symbols and the UL symbols. Here, A and B are integers greater than 0, and $N_{symbol}$ may be 14 to 12 depending on the type of a cyclic prefix (CP). Offset is applied to cell 0 by one slot for the subcarrier spacing of 15 kHz. Therefore, slot 0 of cell 0 starts from the second slot among five slots in one period of the TDD configuration.

Cell 1 has a subcarrier spacing of 30 kHz and a period of 2.5 ms according to the TDD configuration. More specifically, there are five slots in which the subcarrier spacing of 2.5 ms is 30 kHz, and the first three of the five slots are DL slots, the next slot is an S slot, and the last slot is a UL slot. No offset is applied to cell 1. Therefore, slot 0 of cell 1 starts from the first slot among five slots in one period of the TDD configuration.

Figure 18:
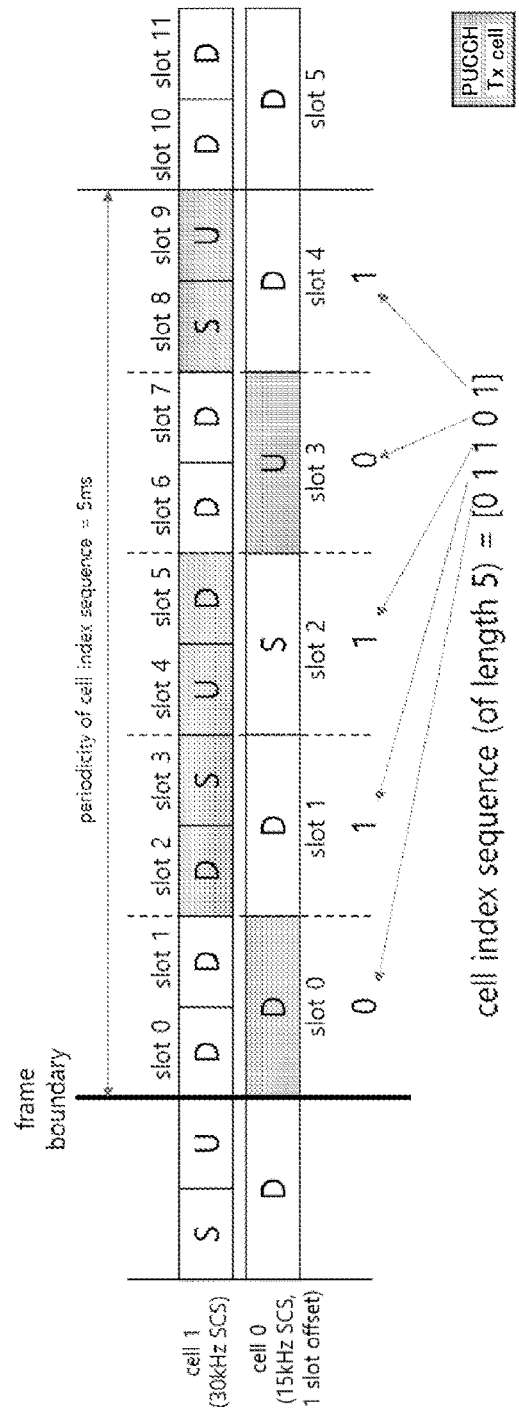
FIG. 18 is a diagram for describing a method for determining a PUCCH serving cell based on a low subcarrier spacing according to an example.
Figure 19:
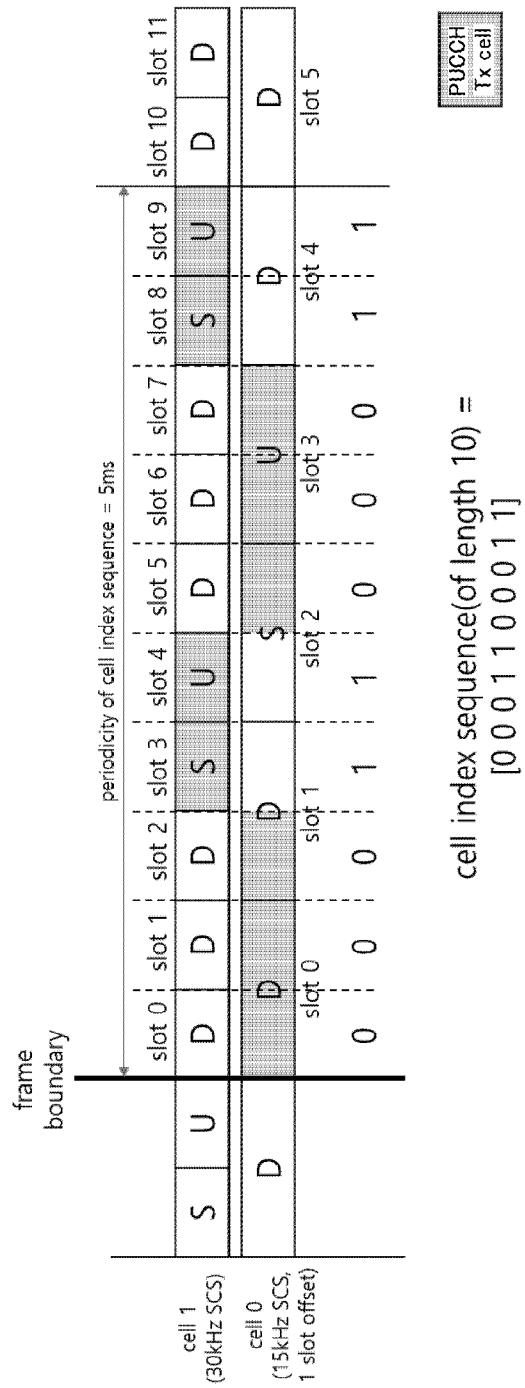
FIG. 19 is a diagram for describing a method for determining a PUCCH serving cell based on a high subcarrier spacing.

FIG. 18 is a diagram for describing a method for determining a PUCCH serving cell based on a low subcarrier spacing according to an example, and FIG. 19 is a diagram for describing a method for determining a PUCCH serving cell based on a high subcarrier spacing. 5 ms, which is the least common multiple of the period of cell 0 and the period of cell 1, may be determined as the period of the index sequence of the PUCCH serving cell.

Referring to FIG. 18, an index sequence of the PUCCH serving cell is generated based on 15 kHz, which is the lowest subcarrier spacing between a subcarrier spacing of cell 0 and a subcarrier spacing of cell 1. Here, the index sequence of the PUCCH serving cell may consist of five indices because the number of 15 kHz slots is 5 in a 5 ms period. Each index among the five indices represents an index of the PUCCH serving cell within a length (1 ms) of a 15 kHz slot within 5 ms. For example, the index sequence of the PUCCH serving cell may be given as [0 1 1 0 1]. Accordingly, from a frame boundary, cell 0 is the PUCCH serving cell based on '0', the first index of the index sequence, for 0 to 1 ms, cell 1 is the PUCCH serving cell based on '1', the second index of the index sequence, for 1 to 2 ms, cell 1 is the PUCCH serving cell based on '1', the third index of the index sequence, for 2 to 3 ms, cell 0 is the PUCCH serving cell based on '0', the second index of the index sequence, for 3 to 4 ms, and cell 1 is the PUCCH serving cell based on '1', which is the second index of the index sequence, for 4 to 5 ms. Thereafter, the indices are repeated at intervals of 5 ms as above. For reference, two slots of the 30 kHz subcarrier spacing of cell 1 may be included within 1 ms. Therefore, the index of the PUCCH serving cell is applied by grouping two slots, each with the 30 kHz subcarrier spacing of cell 1.

Referring to FIG. 19, the index sequence of the PUCCH serving cell is generated based on 30 kHz, which is the highest subcarrier spacing between a subcarrier spacing of cell 0 and a subcarrier spacing of cell 1. Here, the index sequence of the PUCCH serving cell may consist of ten indices because the number of 30 kHz slots is 10 in a 5 ms period. Each index among the ten indices represents an index of the PUCCH serving cell within a length (0.5 ms) of a 30 kHz slot within 5 ms. For example, the index sequence of the PUCCH serving cell may be given as [0 0 0 1 1 0 0 0 1 1]. Accordingly, from the frame boundary, cell 0 is the PUCCH serving cell based on '0', the first index of the index sequence, for 0 to 0.5 ms, cell 0 is the PUCCH serving cell based on '0', the second index of the index sequence, for 0.5 to 1 ms, cell 0 is the PUCCH serving cell based on '0', the third index of the index sequence, for 1 to 1.5 ms, cell 1 is the PUCCH serving cell based on '1', the fourth index of the index sequence for 1.5 to 2 ms, cell 1 is the PUCCH serving cell based on '1', the fifth index of the index sequence, for 2 to 2.5 ms, cell 0 is the PUCCH serving cell based on '0', the sixth index of the index sequence, for 2.5 to 3 ms, cell 0 is the PUCCH serving cell based on '0', the seventh index of the index sequence, for 3 to 3.5 ms, cell 0 is the PUCCH serving cell based on '0', the eighth index of the index sequence, for 3.5 to 4 ms, cell 1 is the PUCCH serving cell based on '1', the ninth index of the index sequence, for 4 to 4.5 ms, and cell 1 is the PUCCH serving cell based on '1', the tenth index of the index sequence, for 4.5 to 5 ms. Thereafter, the indices are repeated at intervals of 5 ms as above. For reference, only half of the slot of the 15 kHz subcarrier spacing of cell 0 may be included within 0.5 ms. Therefore, the index of the PUCCH serving cell is applied to each half of the slot of the 15 kHz subcarrier spacing of cell 0.

When a sub-slot is set in one cell in the description of the first method above, the slot may be interpreted with a replaced sub-slot in the first method. For example, when Q sub-slots are generated by grouping symbols of one slot by N, the length of the index sequence may be increased by Q times. In addition, when one index of the index sequence indicates a PUCCH serving cell within D ms, the index may be interpreted as indicating a PUCCH serving cell within D/Q ms.

(Second method) As another example, the length of the index sequence of the PUCCH serving cell may be determined according to the period and the length of time to apply the index sequence. More specifically, the length of the index sequence of the PUCCH serving cell may be determined as (the period)/(length of time to apply the index sequence). Here, (the period)/(length of time to apply the index sequence) is a natural number. That is, the length of time to apply the index sequence of the PUCCH serving cell is a divisor of the period, and the period is a multiple of the length of time to apply the index sequence. The length of time to apply the index sequence may have a unit of ms, and may be set for the UE by the base station or inferred as follows.

(Embodiment 4 of Length of Index Sequence) The length of the index sequence may be equal to the length of a slot of a specific cell in the period. Here, the specific cell may be a Pcell when dynamic PUCCH carrier switching is not configured. Here, the specific cell may be a cell having the lowest cell index among a plurality of cells. In this way, the length may be interpreted by the operation based on one specific cell.

Additionally, the index sequence of the PUCCH serving cell may be limited to cells having the same subcarrier spacing. That is, even if the UE is configured with cells having different subcarrier spacings, Pcells by dynamic PUCCH carrier switching may be limited to cells having the same subcarrier spacing. By the aforementioned limitation, the problem of the previous index sequence length may be solved.

Figure 20:
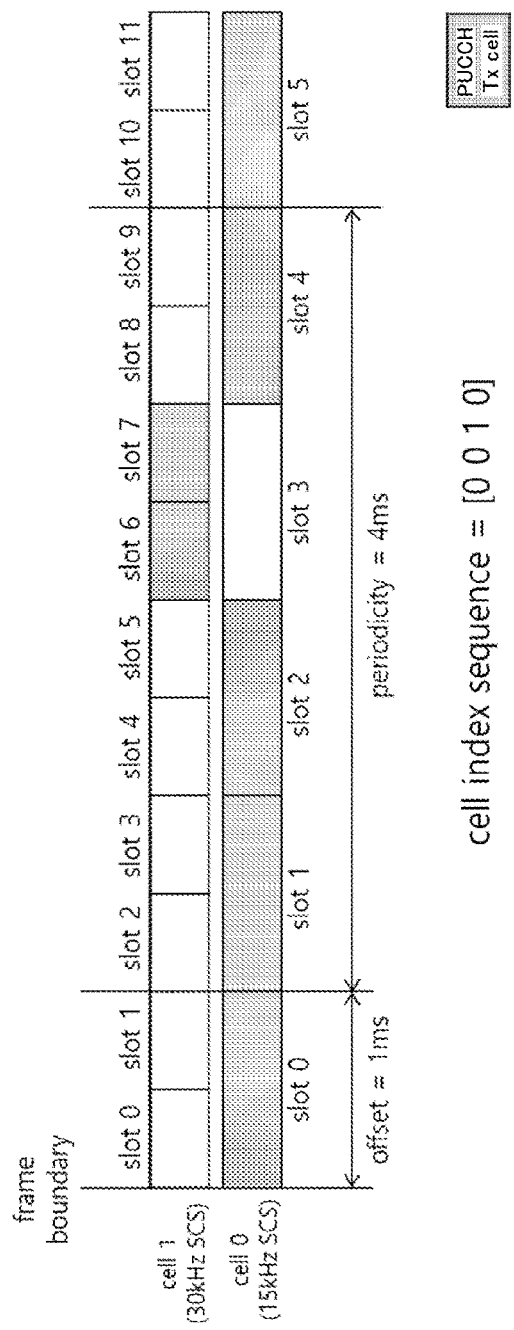
FIG. 20 is a diagram illustrating dynamic PUCCH carrier switching according to one embodiment.

FIG. 20 is a diagram illustrating dynamic PUCCH carrier switching according to one embodiment.

Referring to FIG. 20, the UE may perform dynamic PUCCH carrier switching as follows. Here, it is assumed that the length of the index sequence of the PUCCH serving cell is determined according to (Example 1 of the index sequence length). The UE may be configured with a cell having a subcarrier spacing of 15 kHz and a cell having a subcarrier spacing of 30 kHz. Here, the index of the cell having the subcarrier spacing of 15 kHz is 0 and the index of the cell having the subcarrier spacing of 30 kHz is 1. The UE is configured with a period of 4 ms and an offset of 1 ms. In this case, the length of the index sequence of the PUCCH serving cell is 4. This is because four slots of the cell having the subcarrier spacing of 15 kHz may be included within 4 ms. The UE may be configured with [0 0 1 0] having a length of 4 as the index sequence of the PUCCH serving cell. In this case, based on the index of the 15 kHz subcarrier cell, in slots 1, 2, and 4, cell 0 is a Pcell, and in slot 3, cell 0 is not a Pcell. Here, slot 3 of cell 0 is not a Pcell, and thus PUCCH is not transmitted in slot 3 of cell 0. Based on the index of the 30 kHz subcarrier cell, slots 6 and 7 are Pcells, and slots 2, 3, 4, 5, 8, and 9 are not Pcells. Here, slots 2, 3, 4, 5, 8, and 9 of cell 1 are not Pcells, and thus PUCCH is not transmitted in slots 2, 3, 4, 5, 8, and 9 of cell 1.

In First method and Second method described above, indices of the PUCCH serving cell are included in the index sequence for all slots. However, in the case of some slots, it is not necessary to include the indices in the index sequence.

For example, referring to FIG. 17, it is assumed that cell 0 is a Pcell. In the case of slot 3 of cell 0 having a subcarrier spacing of 15 kHz, the slot 3 is a UL slot (a slot including only UL symbols), and thus PUCCH transmission is possible in the UL slot. Therefore, the slot 3 may not be included in the index sequence for the UL slot of the Pcell. In this case, the UL slot of the Pcell is always determined as the PUCCH serving cell. Through the method, the length of the index sequence may be reduced.

Alternatively, referring to FIG. 17, the UE assumes cell 0 to be a Pcell. Slot 0 of cell 0 having the subcarrier spacing of 15 kHz is a DL slot (slot including only DL symbols), and slot 0 and slot 1 of cell 1 having the subcarrier spacing of 30 kHz are also DL slots. Therefore, even though any cell is indicated as the PUCCH serving cell, the indication is meaningless because transmission is not possible in both cells. Accordingly, when slots of cells that may be indicated by one index of the index sequence are all DL slots, the index may be excluded from the index sequence. Through the method, the length of the index sequence may be reduced.

Meanwhile, the base station may indicate only index sequences of some PUCCH serving cells. For example, it is assumed that an index sequence of a PUCCH serving cell having a length of L to be indicated to the UE is [$i_0$, $i_1$, ..., $i_{L-1}$]. The base station may indicate, to the UE, a part of the index sequence as follows. The base station may indicate (1, $i_1$)-pairs to the UE. Here, 1 may be a position in the index sequence of the PUCCH serving cell and may have a value from 0 to L−1. $i_1$ represents an index value of position 1 in the index sequence of the PUCCH serving cell. For example, referring to FIG. 18, when the base station wants to indicate, to the UE, [0 1 1 0 1] as the index sequence of the PUCCH serving cell, the base station may indicate, to the UE, (1,1), (2,1), and (4,1). It may be assumed that the index of the position not indicated by the pair is the index of the Pcell.

Furthermore, when there are two cells capable of uplink transmission and one cell is a Pcell, in may be omitted when the UE receives a $(1,i_1)$-pair indicated from the base station. For example, referring to FIG. 18, when the base station wants to indicate, to the UE, [0 1 1 0 1] as the index sequence of the PUCCH serving cell, the base station may indicate, to the UE, (1), (2), and (4). That is, a position indicating a cell other than the Pcell may be indicated in the index sequence. It may be assumed that the index of Pell indicates a position other than the indicated position. If the number of cells capable of uplink transmission exceeds two, the base station may select and configure two uplink cells for the UE. Here, one uplink cell includes a Pcell.

Unless otherwise stated in the present specification, index 0 represents a Pcell. Further, cells other than the Pcell may be configured with a separate index. This may be a value of SCellIndex of SCellConfig of CellGroupConfig IE.

In the present disclosure, index 0 always represents the Pcell. Further, cells other than the Pcell may be configured with a separate index. The base station may select some of the cells of the PUCCH group as PUCCH serving cell candidates. For example, a cell having the same subcarrier spacing as the Pcell may be included in the PUCCH serving cell candidates. A cell excluded from the selection is a cell in which PUCCH transmission is not possible. The base station may newly assign an index to the PUCCH serving cell candidates. Here, the index may be numbered with a natural number excluding 0. This allows the base station to set the index for the UE through a separate RRC signal. As another example, the new index of the selected PUCCH serving cell candidates may be numbered with natural numbers starting from 1 in ascending order of a unique SCellIndex value of each candidate cell.

For reference, for the UE, a supplementary UL (SUL) cell may be included among the cells of the PUCCH group. In this case, the SUL cell may be additionally assigned a separate index.

Another technical object of the present disclosure is to provide a method for repeatedly transmitting the PUCCH when the UE is configured for dynamic PUCCH carrier switching.

Referring to FIG. 20, it is assumed that the UE is indicated to transmit the PUCCH in slot 1. In this case, the base station may be configured to repeatedly transmit the PUCCH 4 times for high reliability and coverage for the UE. In this case, the UE has to determine four slots for repeatedly transmitting the PUCCH. Before looking at an embodiment of the present disclosure, referring to 3GPP official document TS38.213, the UE determines the slots through which the PUCCH is to be transmitted as follows.

In the case of unpaired spectrum (cell using TDD), the UE determines N slots (N=4 in the example above) from the slot indicated for PUCCH transmission (slot 1 in the example above). When a symbol indicated for PUCCH transmission in one slot is an uplink symbol or a flexible symbol not configured as an SS/PBCH block, the slot is determined as a slot capable of PUCCH transmission. In this way, N number of slots may be determined.

In the case of paired spectrum (cell using frequency division duplex), the UE determines consecutive N slots (N=4 in the example above) from the slot indicated for the PUCCH transmission (slot 1 in the example above).

As described above, in the operation defined in TS38.213, a slot for transmitting PUCCH may not be determined considering dynamic PUCCH carrier switching. The present disclosure discloses the following method in order to solve the above.

(First embodiment of PUCCH repetition transmission) The UE performs PUCCH repetition transmission in one cell and does not repeatedly perform the transmission in another cell. In other words, when the Pcell is changed according to dynamic PUCCH carrier switching, a slot of the changed Pcell is not included in the slot for transmitting the PUCCH. Here, one cell performing PUCCH repetition transmission is a Pcell corresponding to the first slot indicated for PUCCH repetition transmission. This will be described in detail with reference to FIG. 21.

Figure 21:
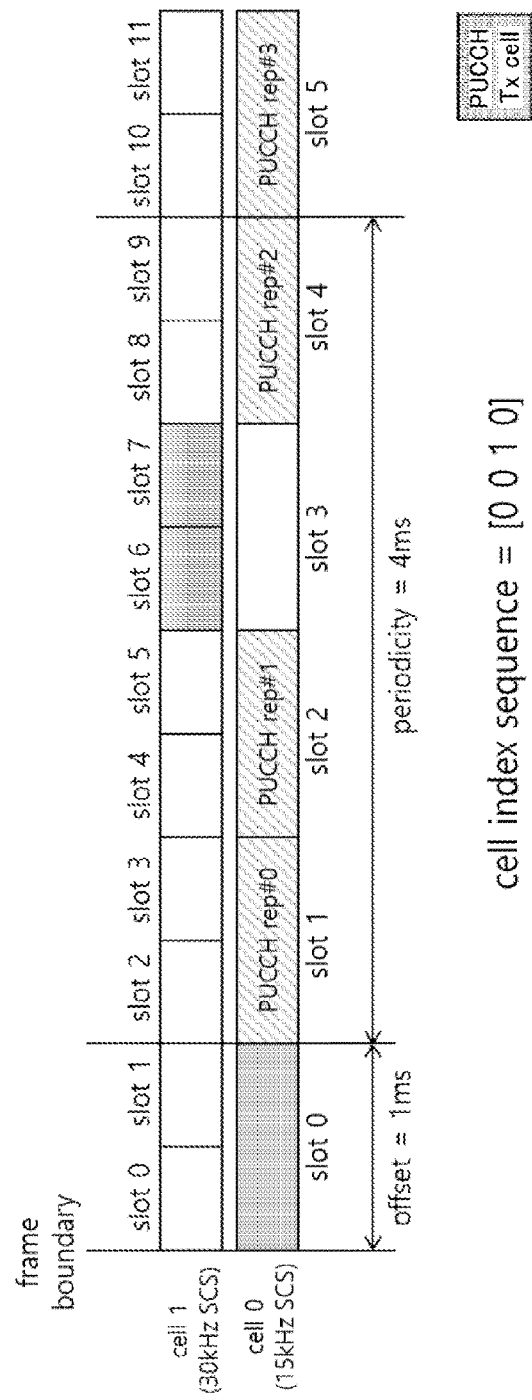
FIG. 21 is a diagram illustrating PUCCH transmission according to dynamic PUCCH carrier switching according to one embodiment of the present disclosure.

FIG. 21 is a diagram illustrating PUCCH transmission according to dynamic PUCCH carrier switching according to one embodiment of the present disclosure.

Referring to FIG. 21, the UE may be instructed to transmit PUCCH in slot 1 of cell 0. Here, slot 1 of cell 0 is a Pcell capable of PUCCH transmission. The UE has to determine four slots for PUCCH repetition transmission from above-mentioned slot 1. In this case, the UE may make the determination by liming the slots to only the Pcell slots of cell 0. Here, the Pcell slot of cell 0 refers to a slot when cell 0 is the Pcell. That is, the PUCCH may be repeatedly transmitted in slot 1, slot 2, slot 4, and slot 5. In the case of slot 3, the Pcell is changed to cell 1, and thus, the slot may be excluded.

For reference, when a slot for transmitting PUCCH in cell 0 is determined, flexible symbols that do not overlap with UL symbols and SS/PBCH blocks may be considered as defined in TS38.213 above. For convenience of description, the above process is omitted.

When the PUCCH is repeatedly transmitted only in one cell as in the first embodiment, an additional delay may occur in completing PUCCH repetition transmission. If the Pell changes frequently, the additional delay may be increased. In particular, such a delay is not suitable for services requiring low delay.

(Second embodiment of PUCCH repetition transmission) The UE performs PUCCH repetition transmission in one cell and does not repeatedly perform the transmission in another cell. Here, the PUCCH repetition transmission ignores the change of Pcell according to dynamic PUCCH carrier switching. Here, one cell performing the PUCCH repetition transmission is a Pcell corresponding to the first slot indicated for PUCCH repetition transmission. This will be described in detail with reference to FIG. 22.

Figure 22:
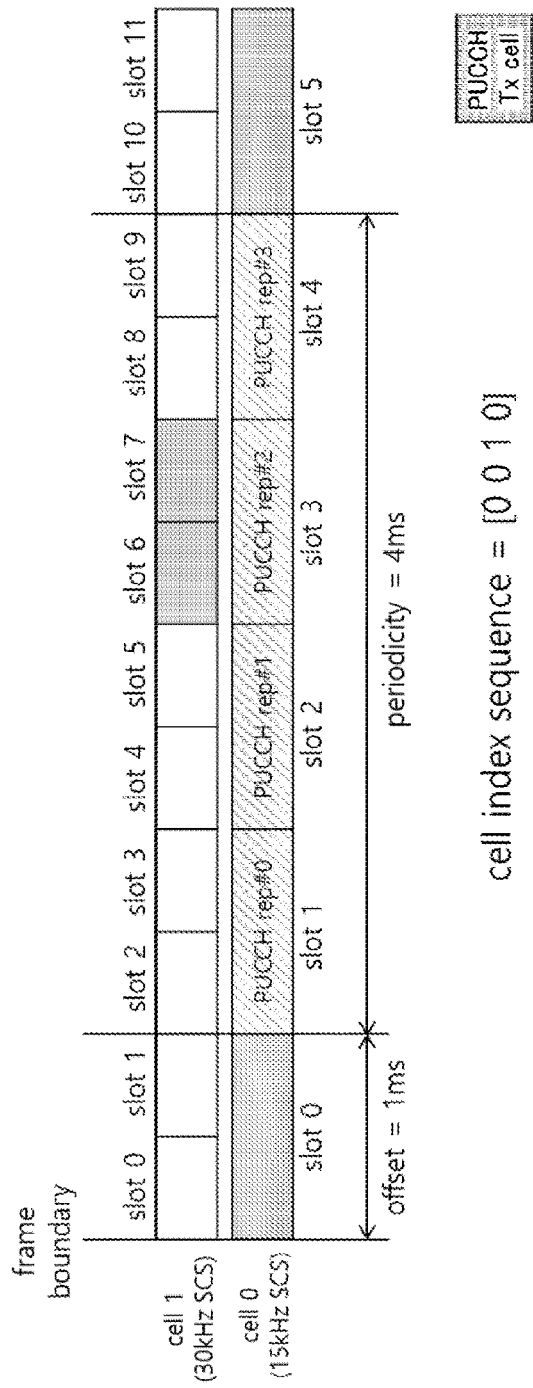
FIG. 22 is a diagram illustrating PUCCH transmission according to dynamic PUCCH carrier switching according to another embodiment of the present disclosure.

FIG. 22 is a diagram illustrating PUCCH transmission according to dynamic PUCCH carrier switching according to another embodiment of the present disclosure.

Referring to FIG. 22, the UE may be instructed to transmit PUCCH in slot 1 of cell 0. Here, slot 1 of cell 0 is a Pcell capable of PUCCH transmission. The UE has to determine four slots for PUCCH repetition transmission from above-mentioned slot 1. In this case, the UE may make the determination by limiting slots to only slots of cell 0. Unlike the first embodiment, the slots are not limited to the Pcell slots of cell 0. Here, four slots are determined regardless of whether or not the slots are the Pcell slots. That is, the PUCCH may be repeatedly transmitted in slot 1, slot 2, slot 3, and slot 4. In the case of slot 3, the Pcell is changed to cell 1, but it is not applied to PUCCH repetition transmission.

In the second embodiment, the PUCCH may be repeatedly transmitted even in slots other than the Pcell slot. There may be transmission of another PUCCH in the slot. Another PUCCH may be transmitted as follows. As a first method, another PUCCH may be transmitted in a Pcell determined according to dynamic PUCCH carrier switching. For example, different PUCCHs may be transmitted in slot 6 and slot 7 of cell 1 in FIG. 22. That is, from another PUCCH's point of view, slot 6 and slot 7 of cell 1 are Pcell slots capable of PUCCH transmission. As a second method, another PUCCH may also be transmitted in a slot in which the PUCCH is repetitively transmitted. In FIG. 22, another PUCCH may not be transmitted in slot 6 and slot 7 of cell 1, and another PUCCH may be transmitted in slot 3 of cell 0. That is, from another PUCCH's the point of view, slot 3 of cell 0 is a Pcell slot. As described above, a slot in which PUCCH transmission is determined according to PUCCH repetition transmission may be the Pcell slot.

(Third embodiment of PUCCH repetition transmission) In the first and second embodiments described above, the PUCCH has been repeatedly transmitted in one cell. In a third embodiment of the present disclosure, the UE may repeatedly transmit the PUCCH on the Pcell determined according to dynamic PUCCH carrier switching.

More specifically, if the Pcell is changed to a cell having the same subcarrier spacing, PUCCH repetition transmission is possible in the changed Pcell.

Figure 23:
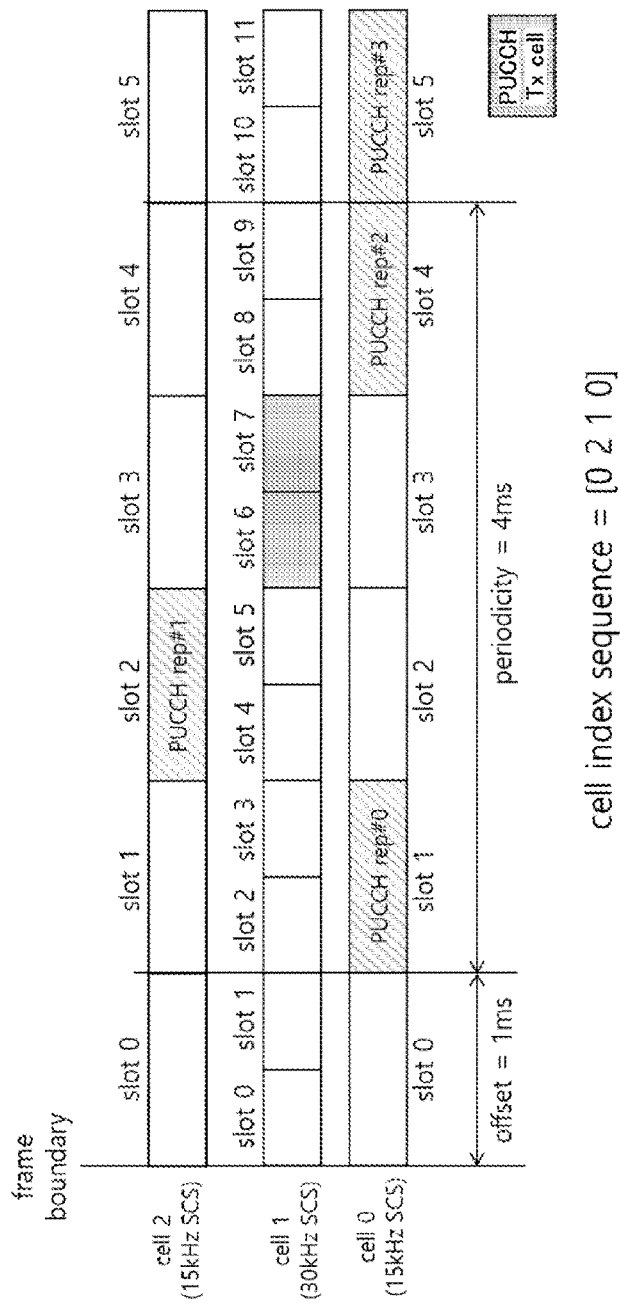
FIG. 23 is a diagram illustrating PUCCH transmission according to dynamic PUCCH carrier switching according to still another embodiment of the present disclosure.

FIG. 23 is a diagram illustrating PUCCH transmission according to dynamic PUCCH carrier switching according to still another embodiment of the present disclosure.

Referring to FIG. 23, the UE may be configured with three uplink cells. As compared with FIGS. 20, 21, and 22, a new cell 2 is additionally configured. Here, the new cell 2 has a subcarrier spacing of 15 kHz. Here, it is assumed that the index sequence of the PUCCH serving cell is [0 2 1 0]. According to the index sequence of the cell, slot 1, slot 4, slot 5, slot 8, . . . of cell 0 are Pcell slots, slot 6, slot 7, . . . of cell 1 are Pcell slots, and slot 2 of cell 2 is a Pcell slot.

The UE may be instructed to transmit the PUCCH in slot 1 of cell 0. Here, slot 1 of cell 0 is a Pcell capable of PUCCH transmission. The UE has to determine four slots for PUCCH repetition transmission from above-mentioned slot 1. In this case, the UE may limit slots to the Pcell slots of the cell having the same subcarrier spacing as the subcarrier spacing of cell 0. That is, since the subcarrier spacings of cell 0 and cell 2 are the same here, the Pcell slots of cell 0 and cell 2 are slots capable of PUCCH repetition transmission. That is, the PUCCH may be repeatedly transmitted in slot 1, slot 4, and slot 5 of cell 0 and slot 2 of cell 2. Here, slot 6 and slot 7 of cell 1 are Pcell slots, but since their subcarrier spacing is different from that of cell 0, slot 6 and slot 7 of cell 1 are excluded from slots for PUCCH repetition transmission.

(Fourth embodiment of PUCCH repetition transmission) In the above third embodiment, the PUCCH is repeatedly transmitted only in a cell having the same subcarrier spacing. However, in the case of dynamic PUCCH carrier switching between cells having different subcarrier spacings, delay may still occur. A fourth embodiment of the present disclosure for solving the above is as follows.

Figure 24:
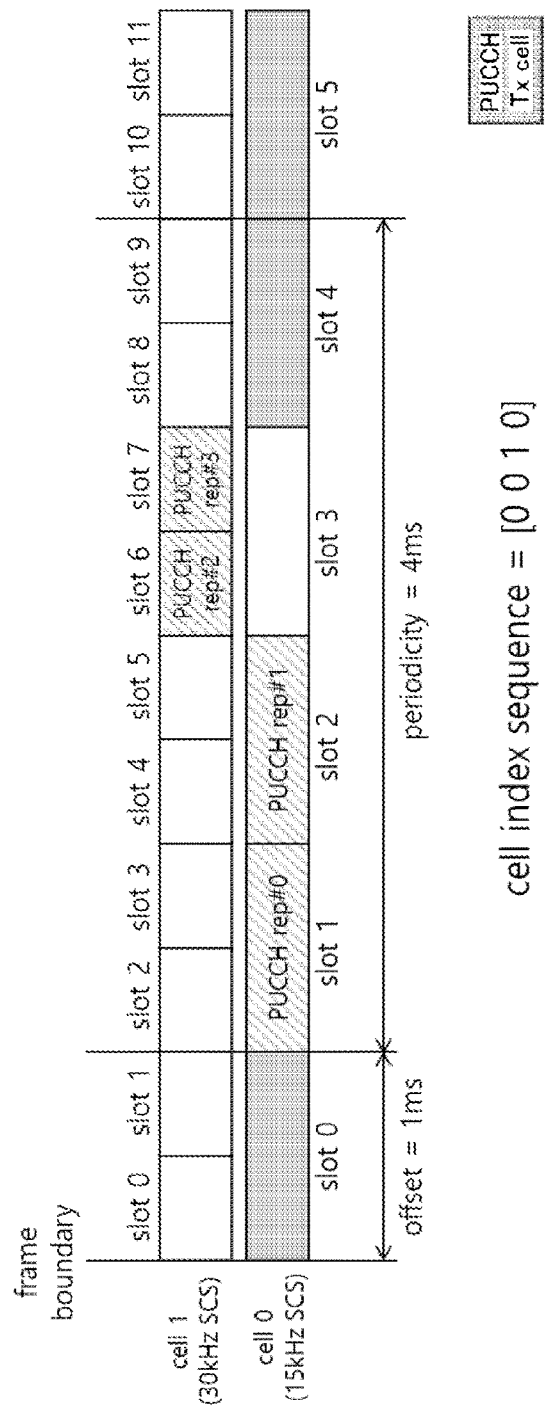
FIG. 24 is a diagram illustrating PUCCH transmission according to dynamic PUCCH carrier switching according to still another embodiment of the present disclosure.

FIG. 24 is a diagram illustrating PUCCH transmission according to dynamic PUCCH carrier switching according to still another embodiment of the present disclosure.

Referring to FIG. 24, the UE may include a Pcell slot according to dynamic PUCCH carrier switching as a slot for PUCCH repetition transmission. The UE may be instructed to transmit a PUCCH in slot 1 of cell 0. Here, slot 1 of cell 0 is a Pcell capable of PUCCH transmission. The UE has to determine four slots for PUCCH repetition transmission from above-mentioned slot 1. Here, slots capable of PUCCH repetition transmission are slots 1 and 2 of cell 0, and slots 6 and 7 of cell 1. Here, slots 1 and 2 of cell 0 and slots 6 and 7 of cell 1 are Pcell slots.

In this case, PUCCHs repeatedly transmitted in cell 0 and cell 1 have the same symbol allocation. That is, when the length is L starting from a symbol S in the slot in cell 0, the length is L starting from a symbol S in the slot in cell 1 as well. In addition, PUCCHs repeatedly transmitted in cell 0 and cell 1 have the same PRB allocation. That is, when the length is L starting from a PRB S in cell 0, the length is L starting from a PRB S in cell 1 as well. If inter-cell frequency hopping is configured, the starting PRB of the PUCCH may be determined according to the frequency hopping.

Another technical object of the present disclosure is to provide a method for interpreting the K1 value. The UE may configure or receive the indication of a K1 value for determining a slot through which the HARQ-ACK of the PDSCH is transmitted through the RRC signal or DCI format. The K1 value is in units of slots according to the subcarrier spacing of the cell in which the PUCCH is to be transmitted (if a sub-slot is configured, the K1 value is in units of sub-slots).

Referring to FIGS. 16 to 18, one cell among cells having different subcarrier spacings may be indicated as the PUCCH serving cell. Therefore, when the UE interprets the K1 value, the subcarrier spacing of the PUCCH serving cell may be different, and thus a method for interpreting the K1 value is required. Hereinafter, detailed solutions therefor are disclosed.

According to a first method, the subcarrier spacing for interpreting the K1 value follows the subcarrier spacing of the Pcell. That is, the UE may determine a slot for transmitting a PUCCH including the HARQ-ACK based on the subcarrier spacing of the Pcell.

According to a second method, the subcarrier spacing for interpreting the K1 value follows a subcarrier spacing of one of the PUCCH serving cell candidates. For example, the subcarrier spacing for analyzing the K1 value may follow the lowest subcarrier spacing or the highest subcarrier spacing.

According to a third method, the base station may configure the subcarrier spacing for interpreting the K1 value for the UE. The configured subcarrier spacing may be the same as or different from the subcarrier spacing of the Pcell.

If the UE is instructed to transmit the PUCCH to a cell other than the Pcell in the slot, the UE may transmit the PUCCH in a slot of a PUCCH serving cell overlapping the slot. Here, when the PUCCH serving cell has one slot, the PUCCH is transmitted in the slot. When the PUCCH serving cell has two or more slots, the PUCCH is transmitted in one of the slots. A method for determining one slot is as follows.

As an example, the UE may select the most preceding slot among the slots in terms of time. By selecting the most preceding slot in terms of time, the UE may reduce delay by transmitting the PUCCH at the earliest time. The PUCCH resource in the slot may be determined according to a PUCCH resource indicator indicated in RRC configuration or DCI format. If the PUCCH resource determined as the PUCCH resource indicator in the slot overlaps with a symbol for which uplink transmission is not possible, the PUCCH may be dropped without being transmitted.

As another example, the UE may select the most preceding slot in terms of time among the slots capable of transmitting the PUCCH among the slots. In the previous example, the UE has determined the slot and has determined whether the PUCCH resource is transmittable. When transmission is impossible during the process, the PUCCH is dropped without being transmitted. To prevent the drop, the UE first determines the PUCCH resource using the PUCCH resource indicator indicated in the RRC configuration or DCI format. When the PUCCH resource is transmittable in the most preceding slot in terms of time among the slots, the UE transmits the PUCCH in the most preceding slot in terms of time. If transmission is not possible in the most preceding slot in terms of time, the UE may determine whether transmission of the PUCCH resource is possible in the next slot. In this way, unnecessary PUCCH drop may be prevented by transmitting the PUCCH in a preceding slot in terms of time.

II. Method for Receiving SPS PDSCH and Transmitting HARQ-ACK

Figure 25:
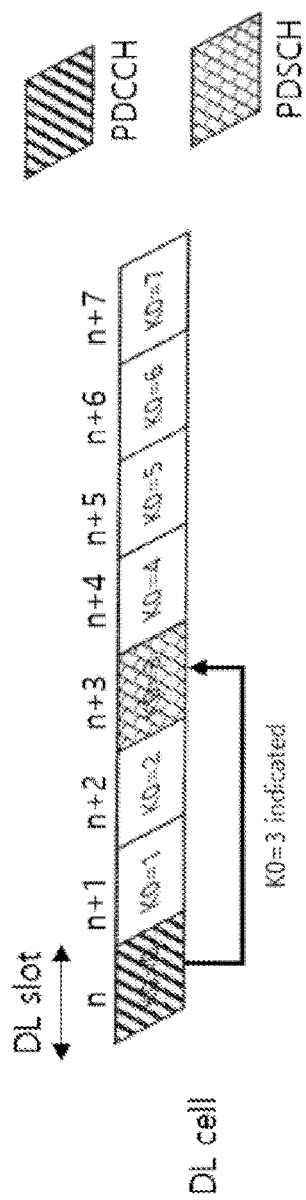
FIG. 25 is a diagram illustrating scheduling of a physical downlink shared channel.
Figure 26:
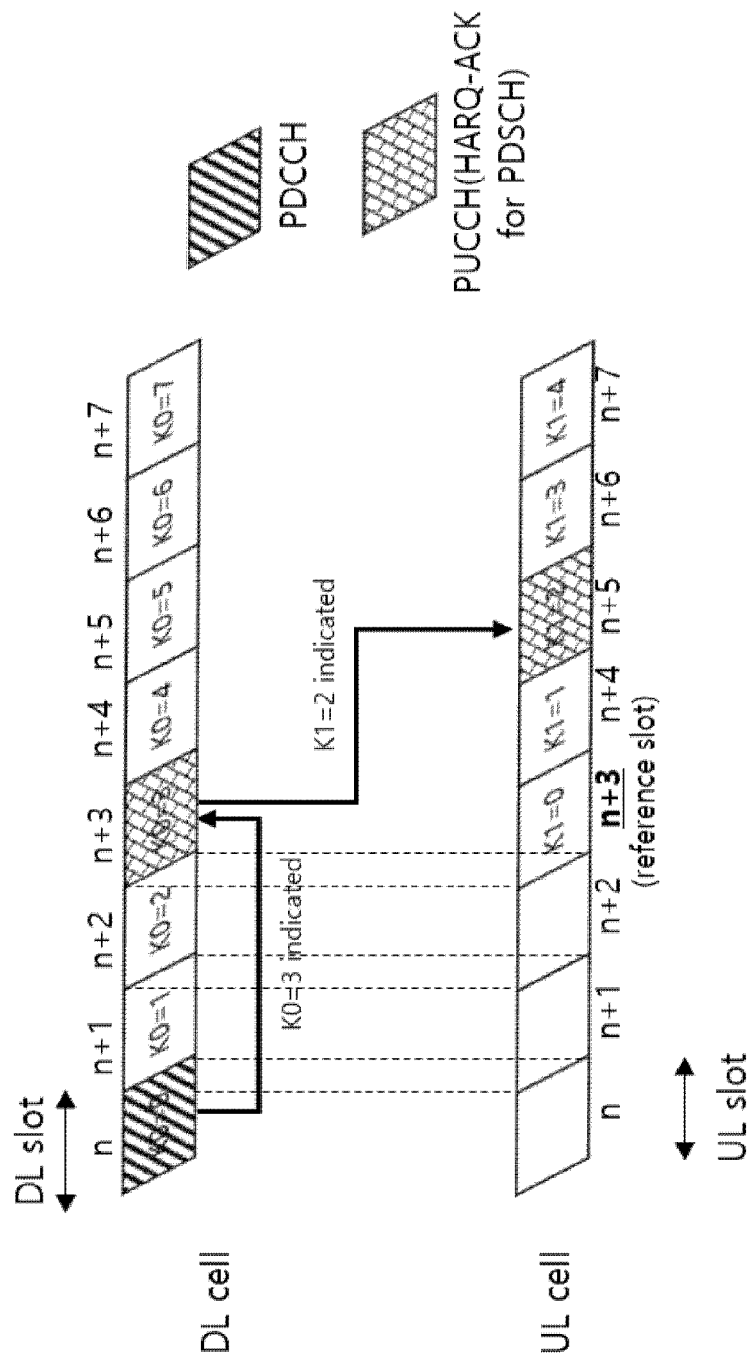
FIG. 26 is a diagram illustrating scheduling of a physical uplink control channel.

With reference to FIGS. 25 and 26, a method for receiving a physical downlink control channel and a physical downlink shared channel and a method for transmitting a physical uplink control channel and a physical uplink shared channel, by a UE, will be described.

FIG. 25 is a diagram illustrating scheduling of a physical downlink shared channel according to an example.

Referring to FIG. 25, the UE may receive a physical downlink control channel transmitted from the base station. In order to receive the downlink control channel, the UE may be configured with information such as a control resource set (CORESET) or a search space.

The control resource set includes information about a frequency domain in which the physical downlink control channel is to be received. More specifically, the information on the control resource set may include the number of consecutive symbols and the index of a PRB or PRB sets through which the UE has to receive the physical downlink control channel. Here, the number of consecutive symbols is one of 1, 2, and 3.

The search space includes time information for receiving a set of PRBs indicated by the control resource set. More specifically, information about the search space may include at least one of periodicity and offset information. Here, periodicity or offset may be indicated in units of slots, sub-slots, symbols, symbol sets, or slot sets. Additionally, the information about the search space may include a CCE aggregation level received by the UE, the number of PDCCHs monitored for each CCE aggregation level, a search space type, or DCI format or RNTI information to be monitored.

The CCE aggregation level has at least one value among 1, 2, 4, 8, and 16. The UE may monitor the PDCCH in the same number of CCEs as the value of the CCE aggregation level.

The search space types include a common search space (CSS) and a UE-specific search space. The common search space is a search space in which all UEs in a cell or some UEs in a cell commonly monitor a PDCCH. In this search space, the UE may monitor and receive PDCCH (for example, a PDCCH carrying a DCI having a CRC scrambled with at least one RNTI among SI-RNTI, RA-RNTI, MsgB-RNTI, P-RNTI, TC-RNTI, INT-RNTI, SFI-RNTI, TPC-PUSCH-RNTI, TPC-PUCCH-RNTI, TPC-SRS-RNTI, CI-RNTI, C-RNTI, MCS-C-RNTI, CS-RNTI(s), or PS-RNTI) candidates broadcast to all UEs in the cell or some UEs in the cell in the search space. In the UE-specific search space, the UE may monitor and receive PDCCH (for example, a PDCCH carrying DCI having CRC scrambled with at least one RNRTI among C-RNTI, MCS-C-RNTI, SP-CSI-RNTI, CS-RNTI(s), SL-RNTI, SL-CS-RNTI, or SL-L-CS-RNTI) candidates transmitted to individual UEs. In addition, the UE may receive a PDCCH carrying DCI indicating reception of a physical downlink shared channel, transmission of a physical uplink control channel, or transmission of a physical uplink shared channel in the common search space and the UE-specific search space.

The DCI format monitored by the UE scheduled to transmit the physical uplink shared channel and receive the physical downlink shared channel from the base station may be DCI formats 0_0, 0_1, 0_2, 1_0, 1_1, to 1_2. RNTI information may include at least one RNTI among CS-RNTI, MCS-C-RNTI, or C-RNTI in the case of DCI formats 0_0, 0_1, 0_2, 1_0, 1_1, to 1_2. Here, the CS-RNTI may be used by the base station to schedule activation/deactivation or retransmission of a semi-persistent (SPS) PDSCH or configured grant (CG) PUSCH, and the UE may also be used to receive the CS-RNTI. Here, the MCS-C-RNTI may be used by the base station to schedule a PDSCH or PUSCH using a modulation and coding scheme (MCS) having high reliability, and the UE may be used to receive the MCS-C-RNTI. The C-RNTI may be used by the base station to schedule the PDSCH or PUSCH and the UE may be used to receive the C-RNTI.

In addition, the DCI format that may be included in the PDCCH monitored by the UE may additionally include at least the following.

DCI format 2_0 includes dynamic slot format indicator (SFI) information indicating the direction of a symbol of a slot in an uplink, downlink, or flexible symbol. The RNTI used for DCI format 2_0 is SFI-RNTI.

DCI format 2_1 includes a DL preemption indication (or interrupted transmission indication) indicating that there is no downlink transmission transmitted to the UE in PRB(s) and symbol(s) from the base station. The RNTI used for DCI format 2_1 is INT-RNTI.

DCI format 2_4 includes a UL cancellation indication instructing the UE to cancel uplink transmission in PRB(s) and symbol(s). The RNTI used for DCI format 2_4 is CI-RNTI.

The UE may determine PDCCH candidates for the PDCCH to be received through the configured control resource set and search space information. After monitoring the PDCCH candidates and checking the CRC by the RNTI value, the UE may determine whether the correct PDCCH has been received. The RNTI value may include at least C-RNTI, MCS-C-RNTI, and CS-RNTI as well as SFI-RNTI, INT-RNTI, and CI-RNTI values.

When the UE receives the correct PDCCH, the UE may interpret the DCI carried by the PDCCH based on the control resource set and search space information, and may perform an operation indicated in the DCI. The DCI may include one of DCI Format 0_0, 0_1, or 0_2 for scheduling a physical uplink shared channel (PUSCH). The DCI may include one of DCI Format 1_0, 1_1, or 1_2 for scheduling a physical downlink shared channel (PDSCH). The DCI may include one of DCI Format 1_0, 1_1, or 1_2 for scheduling a physical uplink control channel (PUCCH). For reference, the PUCCH may include a PUCCH transmitting a HARQ-ACK. Further, the DCI may include DCI format 2_0, 2_1, or 2_4.

When the UE receives DCI format 1_0, 1_1, or 1_2 for scheduling the physical downlink shared channel (PDSCH), the UE has to receive the downlink shared channel scheduled by the DCI format. To this end, the UE has to interpret (determine) a slot in which the physical downlink shared channel is scheduled and a start index and length of a symbol in the slot from the DCI format. The TDRA field of the DCI format 1_0, 1_1, or 1_2 may indicate a K0 value, which is timing information about the scheduled slot, and an SLIV value, which is the index and length of the starting symbol in the slot. Here, the K0 value may be a non-negative integer value. Here, the SLIV may be a joint-encoded value of the index S and length L of the starting symbol in the slot. Further, the SLIV may be a value in which the values of the index S and length L of the starting symbol in the slot are separately transmitted. Here, S may have one value of 0, 1, ..., 13 in the case of a normal CP, and L may have one value of natural numbers satisfying the condition that S+L is less than or equal to 14. S may have one value of 0, 1, ..., and 11 in the case of an extended CP, and L may have one value of natural numbers satisfying the condition that S+L is less than or equal to 12.

The UE may determine a slot for receiving a physical downlink shared channel (PDSCH) based on the K0 value. More specifically, based on the K0 value, the index of the slot in which the DCI is to be received, and the subcarrier spacing (SCS) of the downlink BWP receiving the DCI or the subcarrier spacing of the downlink BWP receiving the scheduled downlink shared channel, the UE may determine the slot for receiving a physical downlink shared channel.

For example, it is assumed that the subcarrier spacings of the downlink BWP receiving the DCI and the downlink BWP receiving the scheduled physical downlink shared channel (PDSCH) are the same. It is assumed that the DCI is received in downlink slot n. In this case, the downlink shared channel (PDSCH) has to be received in downlink slot n+K0.

For example, it is assumed that the subcarrier spacing of the downlink BWP receiving the DCI is 15 kHz*2^mu_PDCCH, and the subcarrier spacing of the downlink BWP receiving the scheduled physical downlink shared channel (PDSCH) is 15 kHz*2^mu_PDSCH. It is assumed that the DCI is received in downlink slot n. Here, the index of downlink slot n is an index according to the subcarrier spacing of the downlink BWP receiving the DCI. In this case, the physical downlink shared channel has to be received in slot floor (n*2^mu_PDSCH/2^mu_PDCCH)+K0. Here, the downlink slot index floor (n*2^mu_PDSCH/2^mu_PDCCH)+K0 is an index according to the subcarrier spacing of the downlink BWP receiving the physical downlink shared channel. In the above description, mu_PDCCH or mu_PDSCH may have a value of 0, 1, 2, or 3.

Referring to FIG. 25, it is assumed that the UE receives a PDCCH for scheduling a physical downlink shared channel (PDSCH) in downlink slot n. It is assumed that K0=3 is indicated in the DCI delivered from the PDCCH. Further, it is assumed that the subcarrier spacing of the DL BWP in which the PDCCH is received is the same as the subcarrier spacing of the DL BWP in which the PDSCH is scheduled. In this case, the UE may determine that the PDSCH is scheduled in downlink slot n+K0, that is, slot n+3.

The UE may determine symbols for receiving a downlink shared channel (PDSCH) by using values of the index S and length L of a starting symbol in a slot in which the physical downlink shared channel (PDSCH) is to be received based on the K0 value. Symbols for receiving the physical downlink shared channel (PDSCH) are from symbol S to symbol S+L−1 in a slot obtained based on the K0 value. For reference, the symbols S to symbol S+L−1 are consecutive L symbols.

The UE may be additionally configured with downlink slot aggregation from the base station. The downlink slot aggregation value may be 2, 4, or 8. When the UE is configured with the downlink slot aggregation, the UE has to receive the physical downlink shared channel (PDSCH) in consecutive slots corresponding to the slot aggregation value from the slot obtained based on the K0 value.

When the UE receives DCI Format 1_0, 1_1, or 1_2 for scheduling the physical uplink control channel, the UE has to transmit the scheduled uplink control channel. The physical uplink control channel may include HARQ-ACK information. The PDSCH-to-HARQ_feedback timing indicator field included in the DCI Format 1_0, 1_1, or 1_2 may indicate a K1 value, which is a value for information on a slot in which the scheduled uplink control channel is to be transmitted. Here, the K1 value may be a non-negative integer value. The K1 value of DCI Format 1_0 may indicate one of {0, 1, 2, 3, 4, 5, 6, 7}. The K1 value that may be indicated in DCI Format 1_1 or 1_2 may be configured or set from the higher layer.

The HARQ-ACK information may be HARQ-ACK information on whether reception of two types of channels is successful. As a first type, when the physical downlink shared channel (PDSCH) is scheduled through DCI Format 1_0, 1_1, or 1_2, the information may be a HARQ-ACK regarding whether reception of the physical downlink shared channel (PDSCH) is successful. As a second type, when DCI Format 1_0, 1_1, or 1_2 is DCI indicating release of the semi-persistent physical downlink shared channel (SPS PDSCH), the information may be a HARQ-ACK regarding whether reception of DCI Format 1_0, 1_1, or 1_2 is successful.

The UE may determine a slot for transmitting the uplink control channel including the first type of HARQ-ACK information as follows. The UE may determine an uplink slot overlapping with the last symbol of a physical downlink shared channel (PDSCH) corresponding to the HARQ-ACK information. When the index of the uplink slot is m, an uplink slot in which the UE transmits the physical uplink control channel including the HARQ-ACK information may be m+K1. Here, the index of the uplink slot is a value according to a subcarrier spacing of the uplink BWP through which the uplink control channel is transmitted.

For reference, when the UE is configured for downlink slot aggregation, the ending symbol represents the last symbol of the PDSCH scheduled in the last slot among slots in which the physical downlink shared channel (PDSCH) is received.

Referring to FIG. 26, it is assumed that the UE receives a PDCCH for scheduling a downlink shared channel (PDSCH) in downlink slot n. It is assumed that K0=3 and K1=2 are indicated in the DCI delivered from the PDCCH. In addition, it is assumed that the subcarrier spacing of the DL BWP in which the PDCCH is received, the subcarrier spacing of the DL BWP in which the PDSCH is scheduled, and the subcarrier spacing of the UL BWP in which the PUCCH is transmitted are the same. In this case, the UE may determine that the PDSCH is scheduled in downlink slot n+K0, that is, slot n+3. In addition, the UE determines an uplink slot overlapping with the last symbol of the PDSCH scheduled in downlink slot n+3. Here, the last symbol of the PDSCH of downlink slot n+3 overlaps with uplink slot n+3. Accordingly, the UE transmits the PUCCH in uplink slot n+3+K1, that is, slot n+5.

The UE may determine a slot for transmitting the physical uplink control channel including the second type of HARQ-ACK information as follows. The UE may determine an uplink slot overlapping with an ending symbol of a physical downlink control channel (PDCCH) corresponding to the HARQ-ACK information. When the index of the uplink slot is m, a slot in which the UE transmits the uplink control channel including the HARQ-ACK information may be m+K1. Here, the index of the slot is a value according to a subcarrier spacing of the uplink BWP through which the physical uplink control channel (PUCCH) is transmitted.

Figure 27:
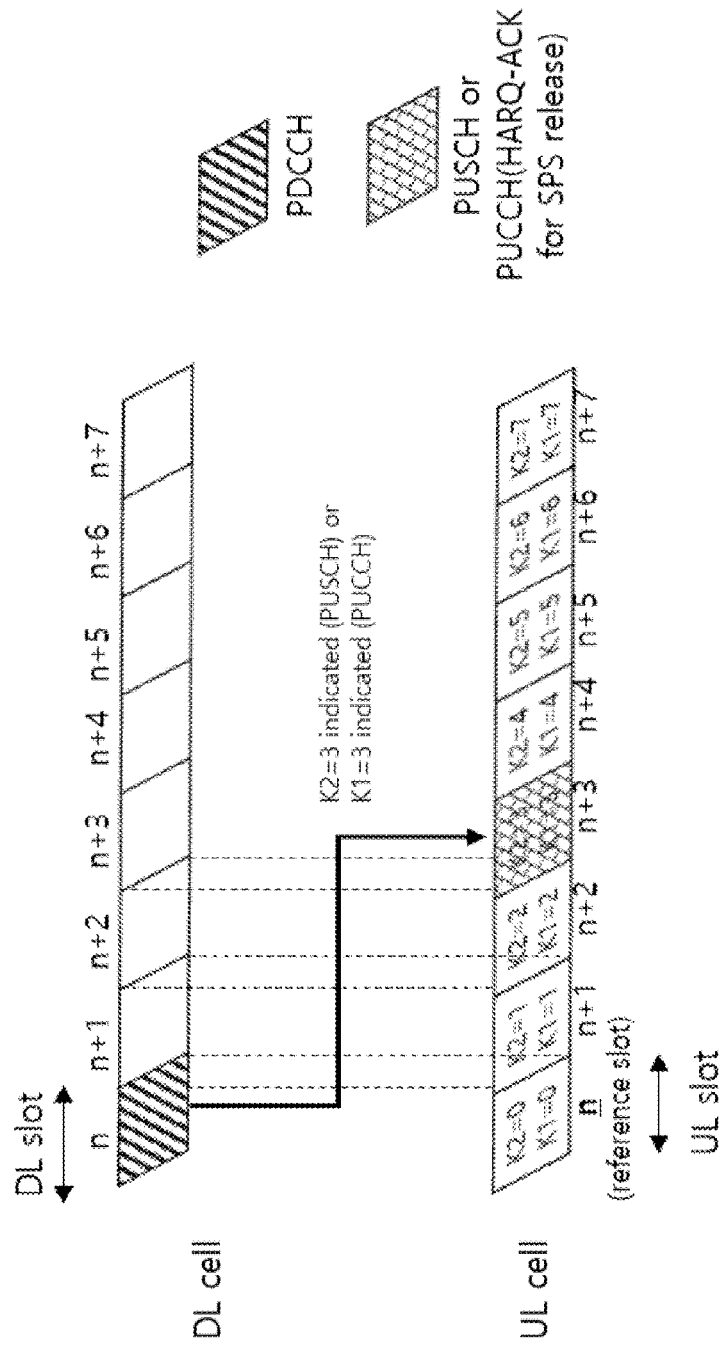
FIG. 27 is a diagram illustrating scheduling of a physical uplink shared channel and a physical uplink control channel.

Referring to FIG. 27, it is assumed that the UE receives a PDCCH transmitted by SPS PDSCH release DCI in downlink slot n. It is assumed that K1=3 is indicated in the DCI delivered from the PDCCH. Further, it is assumed that the subcarrier spacing of the DL BWP in which the PDCCH is received is the same as the subcarrier spacing of the UL BWP in which the PUCCH is transmitted. In this case, the UE determines an uplink slot overlapping with the last symbol of the PDCCH in downlink slot n. In this case, the UE may determine that the PUCCH carrying the HARQ-ACK of the SPS PDSCH release DCI is scheduled in uplink slot n+K1, that is, n+3.

When the UE receives DCI Format 0_0, 0_1, or 0_2 for scheduling the physical uplink shared channel, the UE has to transmit the scheduled uplink shared channel. To this end, the UE has to interpret (determine) a slot in which the physical uplink shared channel is scheduled and a start index and length of a symbol in the slot from the DCI. In the DCI format 0_0, 0_1, or 0_2, the TDRA field may indicate a K2 value, which is a value for information about a scheduled slot, and SLIV, which is a value for information about the index and length of a starting symbol in the slot. Here, the K2 value may be a non-negative integer value. Here, the SLIV may be a joint-encoded value of the index S and length L of the starting symbol in the slot. Further, the SLIV may be a value in which the values of the index S and length L of the starting symbol in the slot are separately transmitted. Here, S may have one value of 0, 1, . . . , 13 in the case of a normal CP, and L may have one value of natural numbers satisfying the condition that S+L is less than or equal to 14. S may have one value of 0, 1, . . . , and 11 in the case of an extended CP, and L may have one value of natural numbers satisfying the condition that S+L is less than or equal to 12.

The UE may determine a slot for transmitting a physical uplink shared channel (PUSCH) based on the K2 value. More specifically, based on the K2 value, the index of the slot in which the DCI is to be received, and the subcarrier spacing of the downlink BWP receiving the DCI or the subcarrier spacing of the uplink BWP transmit the uplink shared channel, the UE may determine the slot for transmitting a physical uplink shared channel (PUSCH).

For example, it is assumed that the subcarrier spacings of the downlink BWP receiving the DCI and the uplink BWP transmitting the scheduled physical uplink shared channel (PUSCH) are the same. It is assumed that the DCI is received in downlink slot n. In this case, the uplink shared channel (PUSCH) has to be transmitted in uplink slot n+K2.

For example, it is assumed that the subcarrier spacing of the downlink BWP receiving the DCI is 15 kHz*2^mu_PDCCH, and the subcarrier spacing of the uplink BWP receiving the scheduled physical uplink shared channel (PUSCH) is 15 kHz*2^mu_PUSCH. It is assumed that the DCI is received in downlink slot n. Here, the index of downlink slot n is an index according to the subcarrier spacing of the downlink BWP receiving the DCI. In this case, the physical uplink shared channel (PUSCH) has to be transmitted in slot floor (n*2^mu_PUSCH/2^mu_PDCCH)+ K2. Here, the uplink slot index floor (n*2^mu_PUSCH/ 2^mu_PDCCH)+K2 is an index according to the subcarrier spacing of the uplink BWP transmitting the uplink shared channel. In the above description, mu_PDCCH or mu_PUSCH may have a value of 0, 1, 2, or 3.

Referring to FIG. 27, it is assumed that the UE receives a PDCCH for scheduling a physical uplink shared channel (PUSCH) in downlink slot n. It is assumed that K2=3 is indicated in the DCI delivered from the PDCCH. Further, it is assumed that the subcarrier spacing of the DL BWP in which the PDCCH is received and the subcarrier spacing are the same as the subcarrier spacing of the UL BWP in which the PUCCH is transmitted. In this case, the UE may determine that the PUSCH is scheduled in uplink slot n+K2=n+3.

The UE may determine symbols for transmitting an uplink shared channel (PUSCH) by using values of the index S and length L of a starting symbol in a slot in which the physical uplink shared channel (PUSCH) is to be transmitted based on the K2 value. Symbols for transmitting the physical uplink shared channel (PUSCH) are from symbol S to symbol S+L−1 in a slot obtained based on the K2 value. For reference, the symbols S to symbol S+L−1 are consecutive L symbols.

The UE may be additionally configured with uplink slot aggregation from the base station. The uplink slot aggregation value may be 2, 4, or 8. When the UE is configured with the uplink slot aggregation, the UE has to transmit the physical uplink shared channel (PUSCH) in consecutive slots corresponding to the slot aggregation value from the slot obtained based on the K2 value.

In FIGS. 25 to 27, the UE has used the K0 value, the K1 value, and the K2 value to determine the slot in which the scheduled physical downlink shared channel (PDSCH) is received and the slots in which the physical uplink control channel (PUCCH) and the physical uplink shared channel (PUSCH) are transmitted. For convenience of the present disclosure, the slot obtained by assuming that the K0, K1, and K2 values are 0 is referred to as a reference point or a reference slot.

In FIG. 25, the reference slot to which the K0 value is applied is downlink slot n, which is the slot in which the PDCCH is received.

In FIG. 26, the reference slot to which the K1 value is applied is uplink slot n+3, which is an uplink slot overlapping with the last symbol of the PDSCH.

In FIG. 27, the reference slot to which the K1 value is applied is uplink slot n, which is an uplink slot overlapping with the last symbol of the PDCCH. In addition, the reference slot to which the K2 value is applied is uplink slot n.

For convenience of the present disclosure, the following description assumes that the subcarrier spacing of the downlink BWP for receiving the PDSCH and the PDCCH by the UE and the subcarrier spacing of the uplink BWP for transmitting the PUSCH and PUCCH are the same. In this case, separate uplink slots and downlink slots are not distinguished and expressed as slots.

When the base station may have data to periodically transmit to the UE, the base station may use a semi-persistent scheduling (SPS) scheme as one method for transmitting the data. Specific details of the method are as follows.

The UE may receive configuration information for the SPS scheme from the base station. The configuration information may be delivered through an RRC signal. The configuration information may include at least a period of the SPS. Here, the period of the SPS may be one of units of slots and units of ms.

The UE may receive a PDCCH for activating or deactivating (or releasing) the SPS scheme from the base station. The PDCCH may include DCI format 1_0, 1_1, or 1_2.

Here, DCI format 1_0, 1_1, or 1_2 may be scrambled with CS-RNTI. The UE may determine whether the PDCCH indicates activation or deactivation of the SPS scheme. The determination may be made based on values of FDRA, RV, MCS, or HARQ process number (HPN) fields delivered by the DCI format.

When the UE receives the PDCCH for activating the SPS scheme from the base station, the UE may obtain the following information through the next field of the PDCCH.

TDRA: Through this field, the UE may obtain information regarding a slot in which the SPS PDSCH of the SPS scheme starts and a starting symbol and length within the slot. Here, the slot in which the SPS PDSCH of the SPS scheme starts is indicated based on the PDCCH for activating the SPS scheme, and the starting symbol and length within the slot are indicated by the SLIV.

PDSCH-to-HARQ_feedback timing indicator: Through this field, the UE may obtain information regarding a slot for transmitting a HARQ-ACK of SPS PDSCH of SPS scheme. Here, the slot for transmitting the HARQ-ACK of the PDSCH of the SPS scheme may be indicated based on a slot to which the last symbol of the SPS PDSCH belongs.

The UE may receive the SPS PDSCH through the PDCCH information and may transmit a HARQ-ACK indicating whether the SPS PDSCH reception is successful. As described above, through the TDRA field, the UE obtains information regarding the slot in which the SPS PDSCH of the SPS scheme starts and the starting symbol and length within the slot. The UE may receive the SPS PDSCH for each SPS period. For example, when the UE is instructed to receive the SPS PDSCH in slot n from the PDCCH for activating, the UE has to receive the SPS PDSCH in slot n, slot n+P, slot n+2*P, and so on. In addition, the UE has to transmit the HARQ-ACK indicating whether the reception of the SPS PDSCH received in each period is successful. Here, P=1 is included. At this time, the slot in which the HARQ-ACK is transmitted is based on the PDSCH-to-HARQ_feedback timing indicator field. For example, when the PDSCH-to-HARQ_feedback timing indicator indicates the K1 value, the UE may transmit the HARQ-ACK of the SPS PDSCH received in slot n in slot n+K1, and may transmit the HARQ-ACK of the SPS PDSCH received in slot n+P in slot n+P+K1.

Here, the HARQ-ACK of SPS PDSCH is assumed to be 1 bit for convenience unless otherwise specified. When the SPS PDSCH has a plurality of bits according to the configuration of the higher layer, the present disclosure may be interpreted accordingly.

A problem to be solved in the present disclosure is to determine the PUCCH transmitting the HARQ-ACK of the SPS PDSCH or SPS PDSCH.

Figure 28:
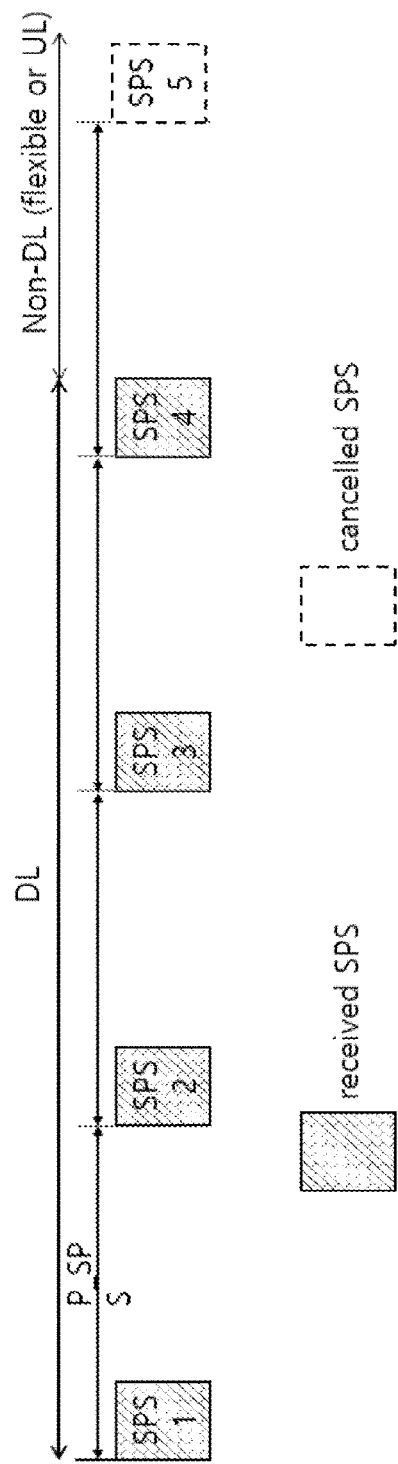
FIG. 28 is a diagram illustrating reception of an SPS PDSCH.

FIG. 28 is a diagram illustrating reception of an SPS PDSCH.

Referring to FIG. 28, the UE receives the SPS PDSCH. In FIG. 28, the period of SPS is given as P_SPS. The UE has to receive the SPS PDSCH for each period P_SPS of the SPS. In FIG. 28, a first SPS PDSCH is referred to as SPS1, a second SPS PDSCH is referred to as SPS2, a third SPS PDSCH is referred to as SPS3, a fourth SPS PDSCH is referred to as SPS4, and a fifth SPS PDSCH is referred to as SPS5.

Referring to FIG. 28, when a cell receiving the SPS PDSCH operates in a time division duplex (TDD) scheme, the UE may determine whether or not the SPS PDSCH may be received according to a direction of the cell.

More specifically, when the cell operates in the TDD scheme, the UE may be configured with one of a downlink symbol, an uplink symbol, or a flexible symbol in a direction of each symbol of the cell. Here, the downlink symbol is a symbol through which the UE may receive a downlink signal or channel, the uplink symbol is a symbol through which the UE may transmit an uplink signal or channel, and the flexible symbol is a symbol for which a direction has not yet been determined and which is capable of receiving or transmitting a downlink or uplink signal or channel.

If all symbols for receiving the SPS PDSCH are downlink symbols, the UE receives the SPS PDSCH.

If at least one symbol among the symbols for receiving the SPS PDSCH overlaps with an uplink symbol, the UE does not receive the SPS PDSCH.

If a symbol for receiving the SPS PDSCH does not overlap with an uplink symbol but overlaps with at least one flexible symbol, the UE either receives the SPS PDSCH or does not receive the SPS PDSCH. Here, as to whether or not to receive, the determination may be made according to separate signaling or the selection may be made through one of two operations (reception or non-reception). As an example, when the UE is configured to receive dynamic slot format information (SFI), the UE does not receive the SPS PDSCH. If the UE is not configured to receive dynamic slot format information (SFI), the UE receives the SPS PDSCH.

In the present disclosure, for convenience, the operation of the UE is described using a downlink symbol and an uplink symbol. However, the flexible symbol may be interpreted as being operated as a downlink symbol or an uplink symbol according to the configuration. As an example, when reception of the SPS PDSCH is determined, the flexible symbol may be interpreted as being operated as the uplink symbol.

Referring to FIG. 28, SPS1, SPS2, SPS3, and SPS4 overlap with the downlink symbol. Accordingly, the UE receives SPS1, SPS2, SPS3, and SPS4. However, since SPS5 overlaps with the uplink symbol, the UE may not receive SPS5. In addition, the UE may not receive SPS5 and may not transmit a corresponding HARQ-ACK.

Figure 29:
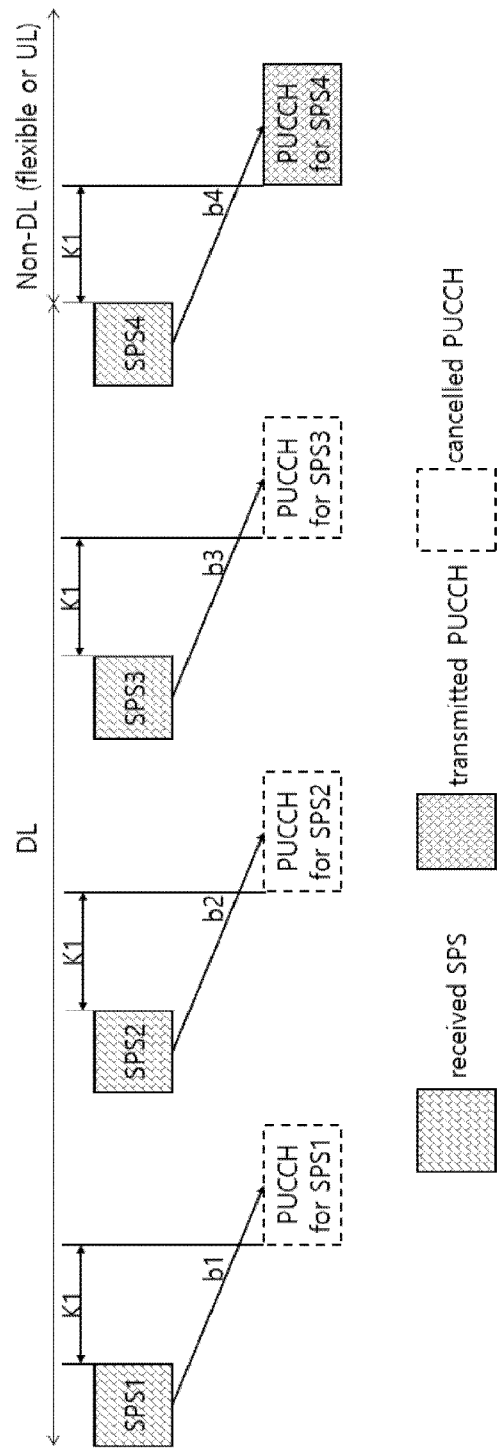
FIG. 29 is a diagram illustrating HARQ-ACK transmission of an SPS PDSCH.

FIG. 29 is a diagram illustrating HARQ-ACK transmission of an SPS PDSCH.

Referring to FIG. 29, transmission of a PUCCH carrying an HARQ-ACK of an SPS PDSCH by the UE is shown. In FIG. 29, the PDSCH-to-HARQ_feedback timing indicator assumes K1. The UE has to receive the SPS PDSCH for each period P_SPS of the SPS and transmit the PUCCH carrying the HARQ-ACK of the SPS PDSCH after K1 slots from the slot in which the SPS PDSCH is received. In FIG. 29, HARQ-ACK information about SPS1 is denoted by b1, HARQ-ACK information about SPS2 is denoted by b2, HARQ-ACK information about SPS3 is denoted by b3, and HARQ-ACK information about SPS4 is denoted by b4. In FIG. 29, a PUCCH carrying the HARQ-ACK information b1 about SPS1 is denoted by PUCCH for SPS1, a PUCCH carrying the HARQ-ACK information b2 about SPS2 is denoted by PUCCH for SPS2, a PUCCH carrying HARQ-ACK information b3 about SPS3 is denoted by PUCCH for SPS3, and a PUCCH carrying HARQ-ACK information b4 about SPS4 is denoted by PUCCH for SPS4.

If all symbols for transmitting the PUCCH of the SPS PDSCH are uplink symbols, the UE transmits the PUCCH of the SPS PDSCH.

If at least one of the symbols for transmitting the PUCCH of the SPS PDSCH overlaps with the downlink symbol, the UE does not transmit the PUCCH of the SPS PDSCH.

If a symbol for transmitting the PUCCH of the SPS PDSCH does not overlap with the downlink symbol but overlaps with at least one flexible symbol, the UE transmits the PUCCH of the SPS PDSCH or does not transmit it. Here, as to whether or not to transmit, the determination may be mad according to separate signaling or the selection may be made through one of two operations (transmission or non-transmission). As an example, when the UE is configured to receive dynamic slot format information (SFI), the UE does not transmit the PUCCH of the SPS PDSCH. If the UE is not configured to receive dynamic slot format information (SFI), the UE transmits the PUCCH of the SPS PDSCH.

In the present disclosure, for convenience, the operation of the UE is described using a downlink symbol and an uplink symbol. However, the flexible symbol may be interpreted as being operated as the downlink symbol or the uplink symbol according to the configuration. As an example, when transmission of the PUCCH carrying the HARQ-ACK of the SPS PDSCH is determined, the flexible symbol may be interpreted as being operated as the downlink symbol.

Referring to FIG. 29, PUCCH for SPS1, PUCCH for SPS2, and PUCCH for SPS3 overlap with the downlink symbol. Therefore, the UE may not transmit PUCCH for SPS1, PUCCH for SPS2, or PUCCH for SPS3. However, since PUCCH for SPS4 overlaps with the uplink symbol, the UE may transmit PUCCH for SPS4. Therefore, in FIG. 29, the UE may not transmit the HARQ-ACK information about SPS1, SPS2, and SPS3 to the base station, but may transmit the HARQ-ACK information about SPS4 to the base station.

In the previous description, when one cell operates in TDD, reception of the SPS PDSCH and transmission of the PUCCH carrying the HARQ-ACK of the SPS PDSCH, by the UE, have been described. It may be extended to a case where a plurality of cells are configured for one UE. Specifically, an operation of a UE in a plurality of cells is as follows.

If the UE supports a half-duplex operation and does not support a full-duplex operation, when a certain cell is a downlink symbol or is instructed or configured to receive a downlink signal or channel, the symbol may be regarded as a downlink symbol in another cell. That is, the UE does not transmit an uplink signal or channel in the symbol in another cell. If the UE supports the half-duplex operation and does not support the full-duplex operation, when a certain cell is an uplink symbol or is instructed or configured to receive an uplink signal or channel, the symbol may be regarded as an uplink symbol in another cell. That is, the UE does not receive a downlink signal or channel in the symbol in another cell.

The present embodiment discloses a method for transmitting a HARQ-ACK that the UE failed to transmit to the base station.

Figure 30:
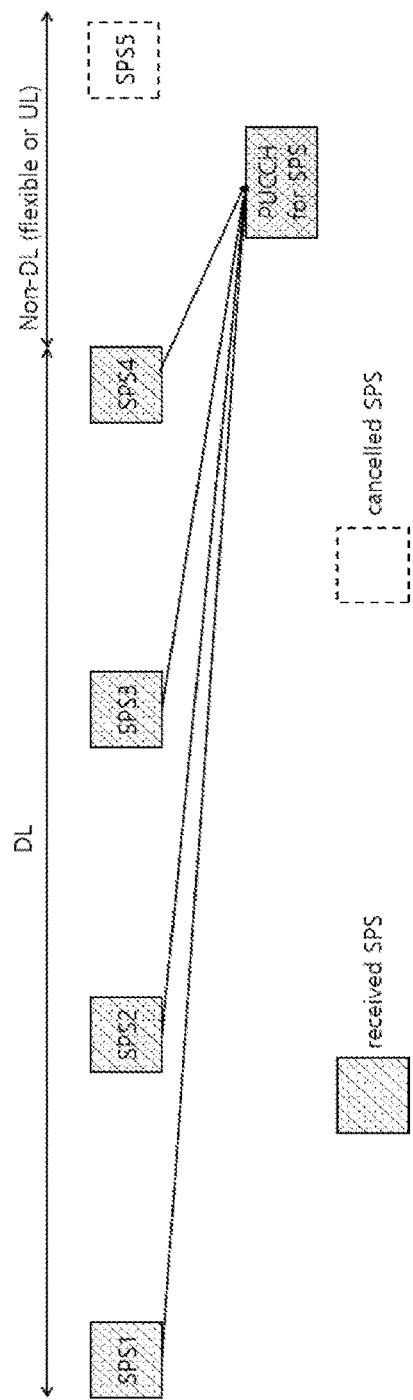
FIG. 30 is a diagram illustrating a PUCCH transmitting a HARQ-ACK of an SPS PDSCH according to one embodiment.

FIG. 30 is a diagram illustrating a PUCCH transmitting a HARQ-ACK of an SPS PDSCH according to one embodiment.

Referring to FIG. 30, when the UE may not transmit a PUCCH including the HARQ-ACK of the SPS PDSCH, the UE may transmit the HARQ-ACK on a PUCCH available for transmission. In FIG. 30, the PUCCH available for transmission is specified as a PUCCH for SPS. Referring to FIG. 30, the UE may perform the following steps.

As a first step, the UE may determine a receivable SPS PDSCH and an unreceivable SPS PDSCH. The determination may be made based on a direction of the symbol. The UE may determine HARQ-ACK information about the receivable SPS PDSCH as HARQ-ACK information to be transmitted to the base station, and may exclude HARQ-ACK information about the unreceivable SPS PDSCH from HARQ-ACK information to be transmitted to the base station. As an exclusion method, the HARQ-ACK information may not be transmitted or a NACK may be included as the HARQ-ACK information.

As a second step, the UE may select a PUCCH for carrying the HARQ-ACK information to be transmitted to the base station. If the PUCCH carrying the HARQ-ACK information about the SPS PDSCH is available for transmission according to the value of the PDSCH-to-HARQ_feedback timing indicator field, the UE may include and transmit the HARQ-ACK information about the SPS PDSCH in the PUCCH. If the PUCCH carrying the HARQ-ACK information about the SPS PDSCH is not available for transmission according to the value of the PDSCH-to-HARQ_feedback timing indicator field, the UE may include and transmit the HARQ-ACK information about the SPS PDSCH in the PUCCH for SPS. Here, the PUCCH for SPS is not a PUCCH carrying the HARQ-ACK information about the SPS PDSCH according to the value of the PDSCH-to-HARQ_feedback timing indicator field.

As a third step, the UE has to determine the PUCCH for SPS. A more specific embodiment of the third step is as follows.

As a first embodiment of the present disclosure, the UE may determine the PUCCH for SPS as follows. If the PUCCH carrying the HARQ-ACK of the first SPS PDSCH is not available for transmission, the UE may check whether the PUCCH carrying the HARQ-ACK of the next second SPS PDSCH is available for transmission. If the PUCCH carrying the HARQ-ACK of the 2nd SPS PDSCH is available for transmission, the UE may transmit the HARQ-ACK of the first SPS PDSCH and the HARQ-ACK of the second SPS PDSCH on the PUCCH available for transmission. If transmission of the PUCCH carrying the HARQ-ACK of the second SPS PDSCH is also not possible, the UE may check whether the PUCCH carrying the HARQ-ACK of the next third SPS PDSCH is available for transmission. In this way, when the PUCCH carrying the HARQ-ACK of the first SPS PDSCH is not available for transmission, the UE checks a PUCCH of an SPS PDSCH available for transmission among SPS PDSCHs subsequent to the first SPS PDSCH, and transmits the HARQ-ACK of the first SPS PDSCH on the PUCCH of the SPS PDSCH available for transmission.

Figure 31:
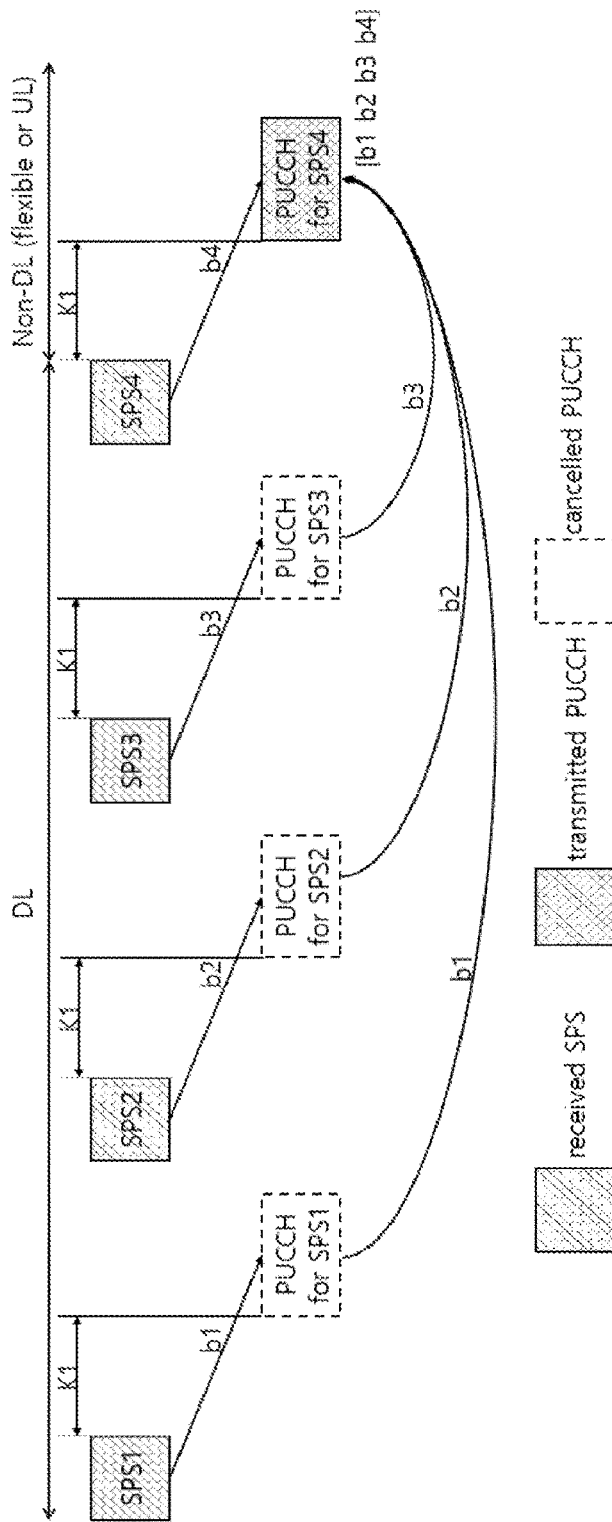
FIG. 31 is a diagram illustrating a PUCCH transmitting a HARQ-ACK of an SPS PDSCH according to another embodiment.

FIG. 31 is a diagram illustrating a PUCCH transmitting a HARQ-ACK of an SPS PDSCH according to another embodiment.

FIG. 31 illustrates a first embodiment of the present disclosure. The PUCCH (PUCCH for SPS1) carrying the HARQ-ACK (b1) of SPS1 is not available for transmission. In order to transmit the HARQ-ACK (b1), the UE has to select another PUCCH. First, it may be determined whether transmission of the PUCCH (PUCCH for SPS2) carrying the HARQ-ACK (b2) of SPS2, which is an SPS PDSCH following SPS1, is possible. Here, the PUCCH (PUCCH for SPS2) carrying the HARQ-ACK (b2) of SPS2 is not available for transmission. Next, it may be determined whether transmission of the PUCCH (PUCCH for SPS3) carrying the HARQ-ACK (b3) of SPS3, which is an SPS PDSCH following SPS2, is possible. Here, the PUCCH (PUCCH for SPS3) carrying the HARQ-ACK (b3) of SPS3 is not available for transmission. Next, it may be determined whether transmission of the PUCCH (PUCCH for SPS4) carrying the HARQ-ACK (b4) of SPS4, which is an SPS PDSCH following SPS3, is possible. Here, transmission of the PUCCH (PUCCH for SPS4) carrying the HARQ-ACK (b4) of SPS4 is possible. Accordingly, the UE may transmit the HARQ-ACK (b1) of SPS1 on the PUCCH for SPS4 carrying the HARQ-ACK (b4) of SPS4.

Similarly, the HARQ-ACK (b2) of SPS2 and the HARQ-ACK (b3) of SPS3 may also be transmitted on the PUCCH for SPS4 carrying the HARQ-ACK (b4) of SPS4.

Therefore, referring to FIG. 31, in the PUCCH for SPS4, not only the HARQ-ACK (b4) of SPS4, but also the HARQ-ACK (b1) of SPS1, the HARQ-ACK (b2) of SPS2, and the HARQ-ACK (b3) of SPS3 may be included. That is, the PUCCH for SPS4 may include [b1 b2 b3 b4] (here, b1, b2, b3, and b4 are arranged according to the order of slots, but they may be arranged differently).

If a plurality of SPS configurations are given to one UE, the first embodiment may be applied as follows.

One UE may be given a plurality of SPS configurations in one cell. Each SPS configuration may have each SPS period. The UE may receive each PDCCH for activating each SPS configuration. Each PDCCH may indicate a value of each PDSCH-to-HARQ_feedback timing indicator field.

Figure 32:
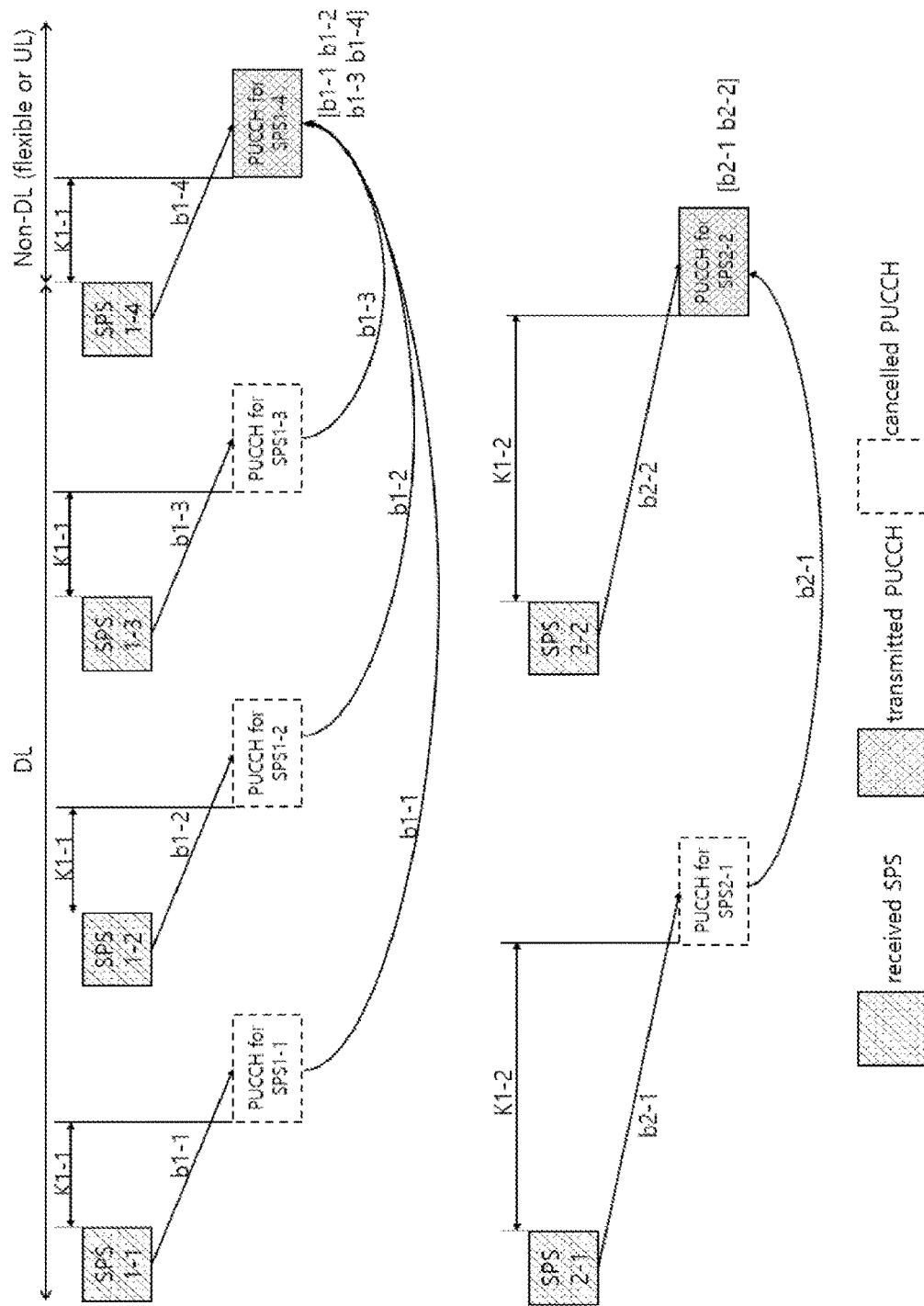
FIGS. 32 to 34 are diagrams illustrating PUCCHs transmitting HARQ-ACKs of SPS PDSCHs in a plurality of SPS configurations according to still another embodiment.
Figure 33:
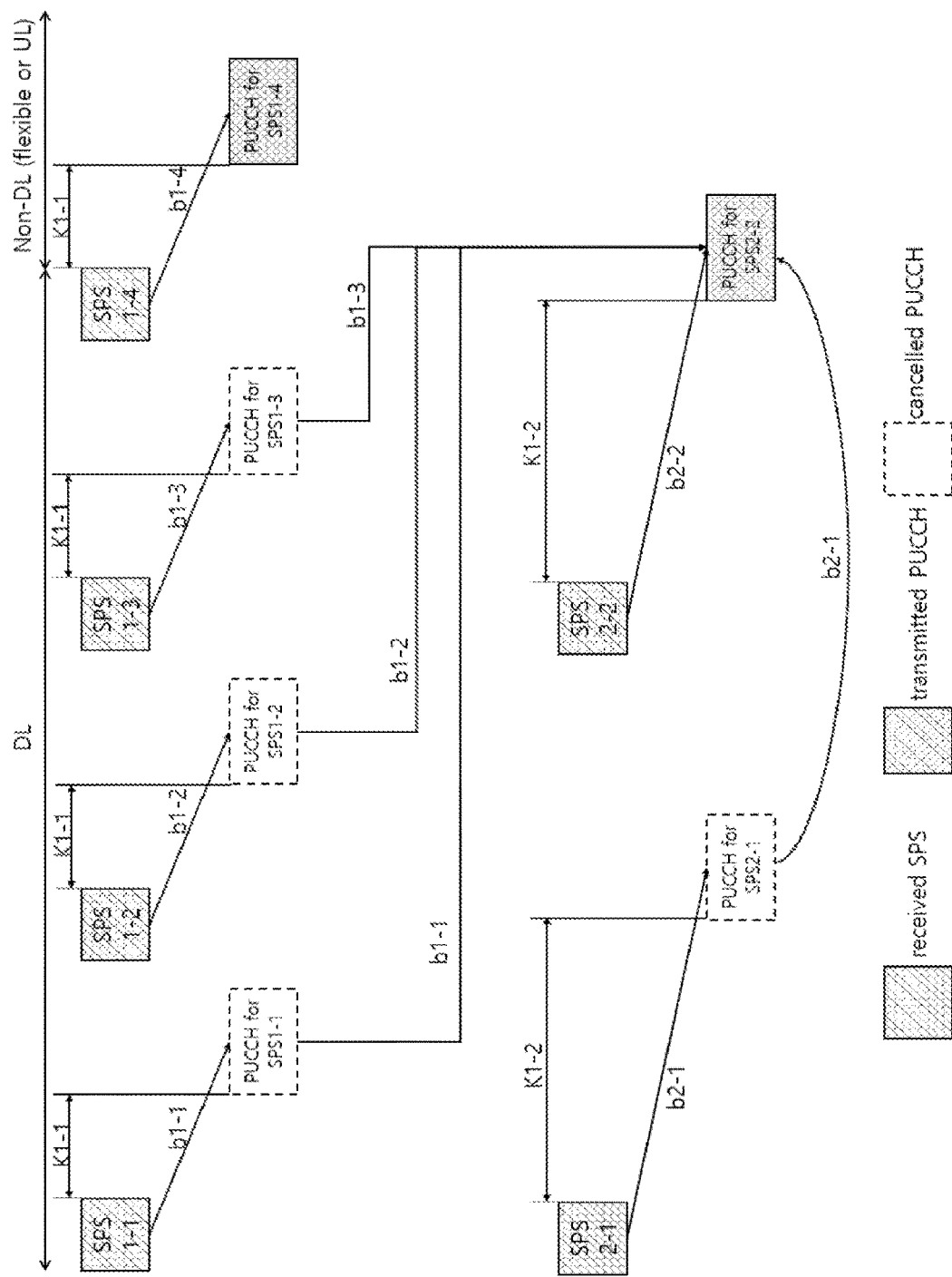
Figure 34:
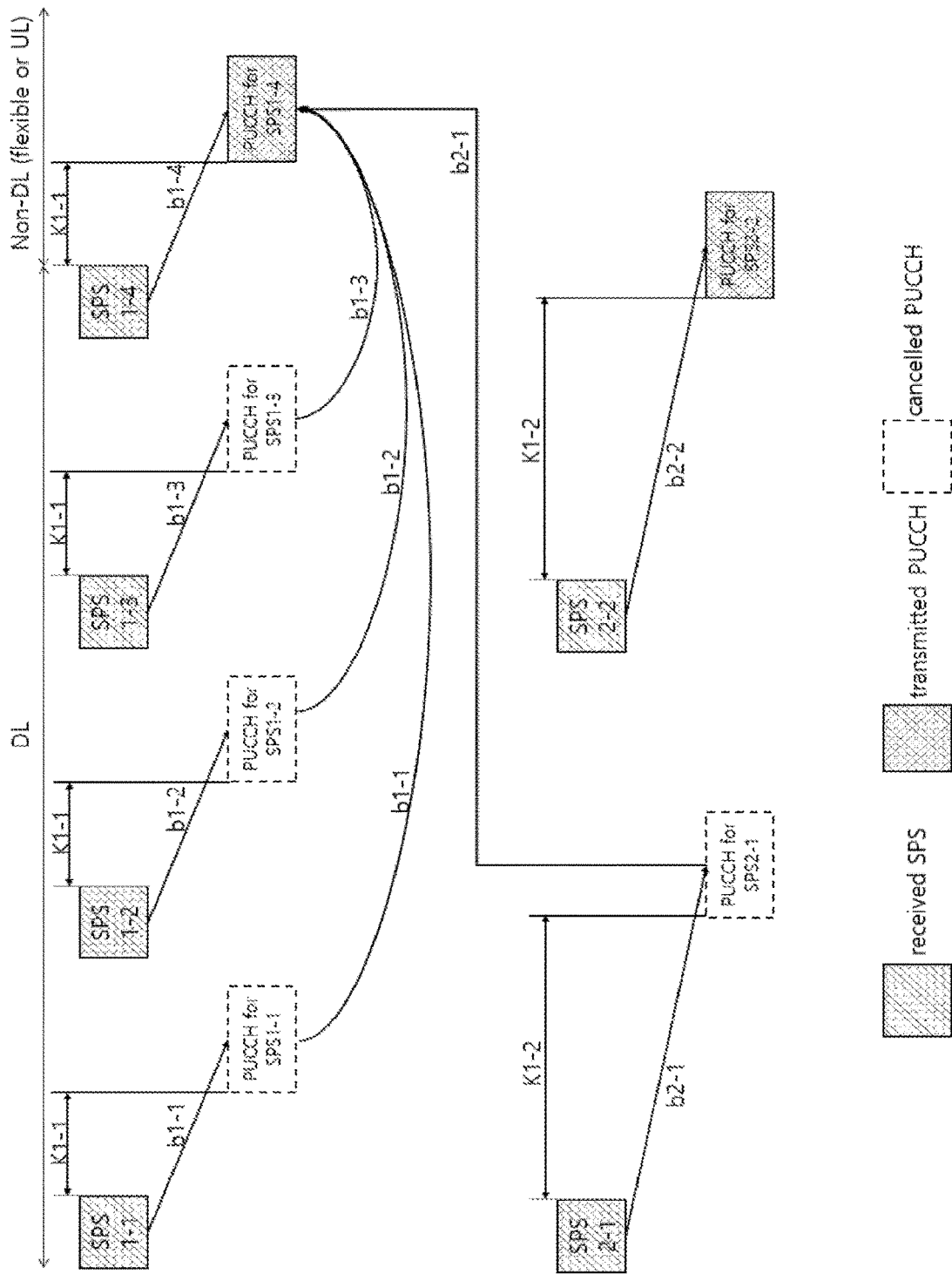

FIGS. 32 to 34 are diagrams illustrating PUCCHs transmitting HARQ-ACKs of SPS PDSCHs in a plurality of SPS configurations according to still another embodiment.

Referring to FIGS. 32 to 34, two SPS configurations may be given to one cell. SPS1-1, SPS1-2, SPS1-3, and SPS1-4 represent SPS PDSCHs according to the first SPS configuration, b1-1, b1-2, b1-3, and b1-4 represent HARQ-ACKs of SPS1-1, SPS1-2, SPS1-3, and SPS1-4, and a PUCCH for SPS1-1, a PUCCH for SPS1-2, a PUCCH for SPS1-3, and a PUCCH for SPS1-4 represent PUCCHs carrying HARQ-ACKs of SPS1-1, SPS1-2, SPS1-3, and SPS1-4. Here, the value of the PDSCH-to-HARQ_feedback timing indicator field according to the first SPS configuration is K1-1. SPS2-1 and SPS2-2 represent SPS PDSCHs according to the second SPS configuration, b2-1 and b2-2 represent HARQ-ACKs of SPS2-1 and SPS2-2, and a PUCCH for SPS2-1 and a PUCCH for SPS2-2 represent PUCCHs carrying HARQ-ACKs of SPS2-1 and SPS2-2.

The first SPS configuration has a shorter SPS period than the second SPS configuration.

The PUCCH for SPS1-1, the PUCCH for SPS1-2, and the PUCCH for SPS1-3 carrying the HARQ-ACK (b1-1) of SPS1-1, the HARQ-ACK (b1-2) of SPS1-2, and the HARQ-ACK (b1-3) of SPS1-3 according to the first SPS configuration for SPS1-1 may not be transmitted. In addition, the PUCCH for SPS2-1 carrying the HARQ-ACK (b2-1) of SPS2-1 according to the second SPS configuration may not be transmitted.

First embodiment 1 of the present disclosure is shown in FIG. 32.

Referring to FIG. 32, the UE may apply the first embodiment to an SPS PDSCH having the same SPS configuration. That is, a HARQ-ACK of an SPS PDSCH according to one SPS configuration may be transmitted on a PUCCH carrying a HARQ-ACK of another SPS PDSCH according to the SPS configuration. However, a HARQ-ACK of an SPS PDSCH according to one SPS configuration may not be transmitted on a PUCCH carrying a HARQ-ACK of an SPS PDSCH according to another SPS configuration.

The HARQ-ACK (b1-1) of SPS1-1, the HARQ-ACK (b1-2) of SPS1-2, and the HARQ-ACK (b1-3) of SPS1-3 of the first configuration may be included in the PUCCH for SPS1-4 carrying the HARQ-ACK (b1-4) of SPS1-4 of the first configuration. Accordingly, the PUCCH for SPS1-4 may include [b1-1, b1-2, b1-3, b1-4].

The HARQ-ACK (b2-1) of SPS2-1 of the second configuration may be included in the PUCCH for SPS2-2 carrying the HARQ-ACK (b2-2) of SPS2-2 of the second configuration. Accordingly, the PUCCH for SPS2-2 may include [b2-1, b2-2].

First embodiment 2 of the present disclosure is shown in FIG. 33.

Referring to FIG. 33, the UE may apply the first embodiment to SPS PDSCHs of all SPS configurations. That is, a HARQ-ACK of an SPS PDSCH according to one SPS configuration may be transmitted on a PUCCH carrying a HARQ-ACK of an SPS PDSCH according to the same or different SPS configuration.

Since the HARQ-ACK (b1-1) of SPS1-1, the HARQ-ACK (b1-2) of SPS1-2, and the HARQ-ACK (b1-3) of SPS1-3 of the first configuration may not be transmitted, it is necessary to find a PUCCH available for transmission. At this time, the PUCCH available for transmission may be found regardless of the SPS configuration. For example, the HARQ-ACK (b1-1) of SPS1-1 may be included in the PUCCH for SPS2-2, which is the earliest in time, among the PUCCH for SPS1-4 and the PUCCH for SPS2-2, which are PUCCHs available for transmission. As a result, in the PUCCH for SPS1-4, the HARQ-ACK (b1-4) of SPS1-4 in the first configuration may be included, and in the PUCCH for SPS2-2, the HARQ-ACK (b1-1) of SPS1-1, the HARQ-ACK (b1-2) in SPS1-2, and the HARQ-ACK (b1-3) of the first configuration, and the HARQ-ACK (b2-1) of SPS2-1 and the HARQ-ACK (b2-2) of SPS2-2 of the second configuration may be included.

First Embodiment 3 of the present disclosure is shown in FIG. 34.

Referring to FIG. 34, when the first embodiment is applied, the UE may apply the first embodiment only to an SPS PDSCH of a specific SPS configuration. That is, a HARQ-ACK of an SPS PDSCH according to one SPS configuration may be transmitted on a PUCCH carrying the HARQ-ACK of the SPS PDSCH according to the specific SPS configuration.

Here, preferably, the specific SPS configuration may be SPS configuration having the lowest ID among the SPS configurations configured in the UE.

Here, preferably, the specific SPS configuration may be SPS configuration having the lowest ID among the SPS configurations configured in the UE.

The first configuration is set as the specific SPS configuration. That is, the HARQ-ACKs of the SPS PDSCHs of the first configuration and the second configuration may be transmitted on the PUCCH carrying the HARQ-ACK of the SPS PDSCH of the first configuration. However, the HARQ-ACKs of the SPS PDSCHs of the first configuration and the second configuration may not be transmitted on the PUCCH carrying the HARQ-ACK of the SPS PDSCH of the second configuration.

Since the HARQ-ACK (b1-1) of SPS1-1, the HARQ-ACK (b1-2) of SPS1-2, and the HARQ-ACK (b1-3) of SPS1-3 of the first configuration may not be transmitted, it is necessary to find a PUCCH available for transmission. In this case, a PUCCH of the first SPS configuration that is available for transmission, which is the specific SPS configuration, may be found. For example, the HARQ-ACK (b1-1) of SPS1-1 may be included in the PUCCH for SPS1-4 of the first SPS configuration, which is the specific SPS configuration, among the PUCCH for SPS1-4 and the PUCCH for SPS2-2, which are PUCCHs available for transmission.

Since the HARQ-ACK (b2-1) of SPS2-1 of the second configuration may not be transmitted, a PUCCH available for transmission has to be found. In this case, a PUCCH of the first SPS configuration that is available for transmission, which is the specific SPS configuration, may be found. For example, the HARQ-ACK (b2-1) of SPS2-1 may be included in the PUCCH for SPS1-4 of the first SPS configuration, which is the specific SPS configuration, among the PUCCH for SPS1-4 and the PUCCH for SPS2-2, which are PUCCHs available for transmission.

As a result, the PUCCH for SPS1-4 may include [b1-1, b1-2, b1-3, b1-4, b2-1]. In addition, the PUCCH for 2-2 may include [b2-2].

Priorities may be set for the SPS configurations.

If the priorities are set for the SPS configurations, PUCCHs available for transmission may be limited to SPS configurations having the same priority. That is, if priorities are set for the SPS configurations, the HARQ-ACK of the SPS configuration with one priority may be included in a PUCCH carrying the HARQ-ACK of the SPS configuration with that priority.

For example, in the description of the previous first embodiments 1, 2, and 3, the SPS configurations may have the same priority.

For example, referring to FIG. 32, when the first configuration and the second configuration have different priorities, the HARQ-ACK of the SPS of the first configuration may be included in a transmission-available PUCCH (PUCCH for SPS1-4) of the SPS configuration having the same priority as that of the first configuration. In addition, the HARQ-ACK of the SPS of the second configuration may be included in a transmission-available PUCCH (PUCCH for SPS2-2) of the SPS configuration having the same priority as that of the second configuration.

If priorities are set for the SPS configurations, the HARQ-ACK of the SPS configuration with one priority may be included in a PUCCH carrying the HARQ-ACK of the SPS configuration with that priority or a priority lower than that priority.

For example, referring to FIG. 34, it is assumed that the priority of the first configuration is lower than the priority of the second configuration. In this case, the HARQ-ACK of the SPS of the first configuration may be included in a transmission-available PUCCH (PUCCH for SPS1-4) of the SPS configuration with the same priority as or lower priority than that of the first configuration. In addition, the HARQ-ACK of the SPS of the second configuration may be included in a transmission-available PUCCH (PUCCH for SPS1-4) of the SPS configuration with the same priority as or lower priority than that of the second configuration.

In the first embodiment and its derivatives first embodiments 1, 2, and 3, the UE has included and transmitted the HARQ-ACK failed to be transmitted on the PUCCH transmitting the HARQ-ACK of the SPS PDSCH. However, in this case, the UE may inadvertently transmit the HARQ-ACK of the SPS PDSCH together with the HARQ-ACK of another SPS PDSCH. A method capable of solving the above is disclosed in a second embodiment.

According to the second embodiment of the present disclosure, the base station may configure PUCCH resources in the UE. Here, the configuration may be configured in an RRC signal or an SPS activation PDCCH, and the configuration may include at least the following information.

Period of PUCCH resource (P_PUCCH): Similar to the SPS PDSCH having the period, the period of PUCCH resource may be configured.

PUCCH resource offset (O_PUCCH): A slot in which a PUCCH resource starts may be indicated. For example, when an offset value is given as O_PUCCH, the PUCCH resource starts at slot O_PUCCH. According to the period P_PUCCH, the PUCCH resource may exist in slot O_PUCCH, slot O_PUCCH+P_PUCCH, slot O_PUCCH+2*P_PUCCH, slot O_PUCCH+3*P_PUCCH, and so on. Here, O_PUCCH may be indicated as a PDSCH-to-HARQ_feedback timing indicator field of the SPS activation PDCCH.

Index of PUCCH resource: PUCCH resource within a slot may be configured with an index. The UE may determine the PUCCH resource corresponding to the index.

Figure 35:
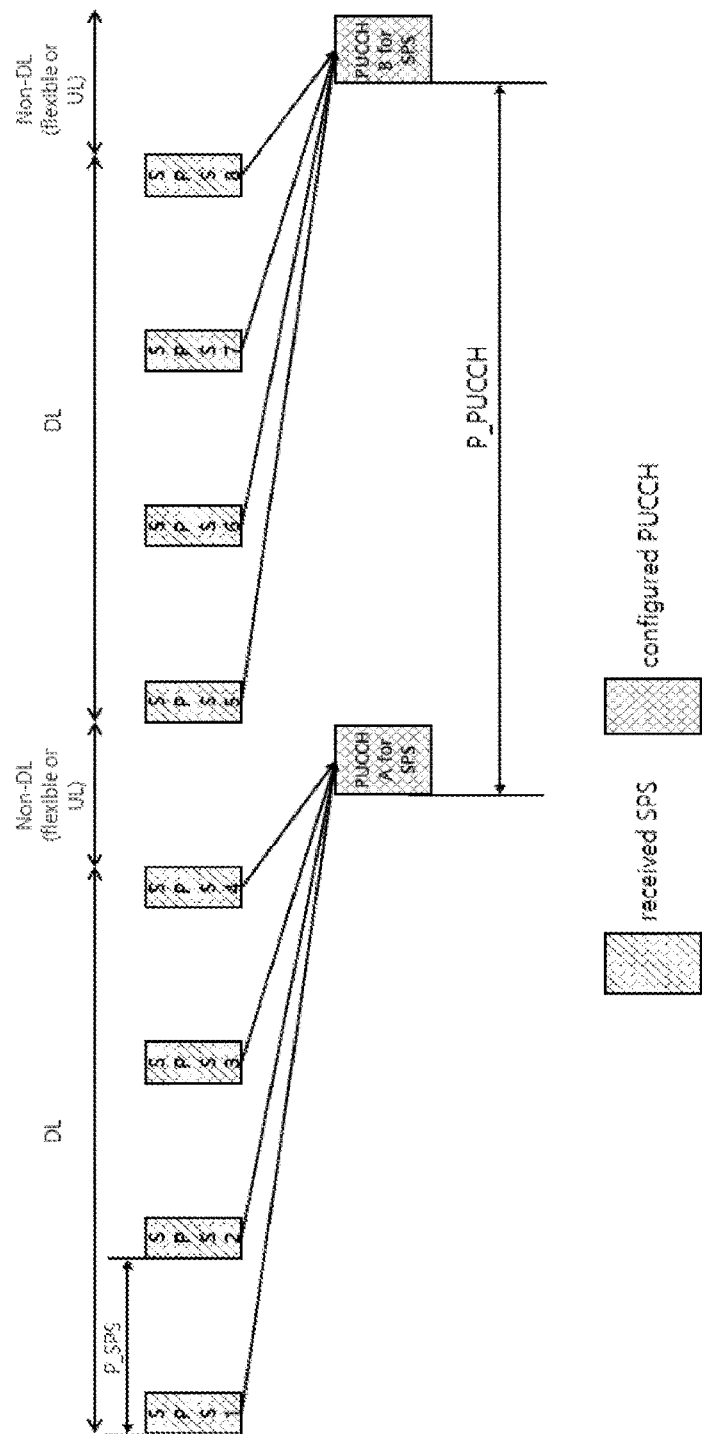
FIG. 35 is a diagram illustrating a PUCCH transmitting a HARQ-ACK of an SPS PDSCH through a PUCCH resource configuration according to still another embodiment.

The UE may include and transmit the HARQ-ACK of the SPS PDSCH in the configured PUCCH resource, as shown in FIG. 35.

FIG. 35 is a diagram illustrating a PUCCH transmitting a HARQ-ACK of an SPS PDSCH through a PUCCH resource configuration according to still another embodiment.

Referring to FIG. 35, SPS1, SPS2, . . . , and SPS8 are shown according to the SPS configuration (SPS period P_SPS). In addition, a PUCCH A for SPS and a PUCCH B for SPS are shown according to the PUCCH resource configuration (PUCCH resource period P_PUCCH).

According to the second embodiment of the present disclosure, the UE may transmit a HARQ-ACK of the SPS PDSCH in the configured PUCCH resource. More specifically, the HARQ-ACK of the SPS PDSCH may select the closest (previous) PUCCH resource among configured PUCCH resources starting after the last symbol in receiving the SPS PDSCH.

Referring to FIG. 35, the HARQ-ACK of SPS1 may be included in the closest PUCCH resource after the SPS1. Here, there may be the PUCCH A for SPS and the PUCCH B for SPS as PUCCH resources after SPS1, and the HARQ-ACK of SPS1 may be included in the PUCCH A for SPS that is closest among them. For example, a HARQ-ACK of SPS5 may be included in the closest PUCCH resource after the SPS5. Here, the HARQ-ACK of SPS5 may be included in the PUCCH B for SPS as a PUCCH resource after SPS5.

In the foregoing second embodiment, after receiving the SPS PDSCH, the UE has included the HARQ-ACK of the SPS PDSCH in the closest PUCCH resource. However, the UE requires processing time for receiving the SPS PDSCH. The processing time may be referred to as PDSCH processing time. That is, the UE requires the PDSCH processing time as a time for receiving the SPS PDSCH and generating the HARQ-ACK indicating whether the SPS PDSCH reception is successful. Therefore, as in the second embodiment, including the HARQ-ACK in the closest PUCCH after receiving the SPS PDSCH may violate the PDSCH processing time.

In a second embodiment 1 of the present disclosure, the UE may transmit a HARQ-ACK of the SPS PDSCH in the configured PUCCH resource. At this time, a PUCCH resource may be selected in consideration of the PDSCH processing time of the SPS PDSCH. More specifically, the HARQ-ACK of the SPS PDSCH may select the closest (previous) PUCCH resource among configured PUCCH resources starting after the PDSCH processing time from the last symbol in receiving the SPS PDSCH.

Figure 36:
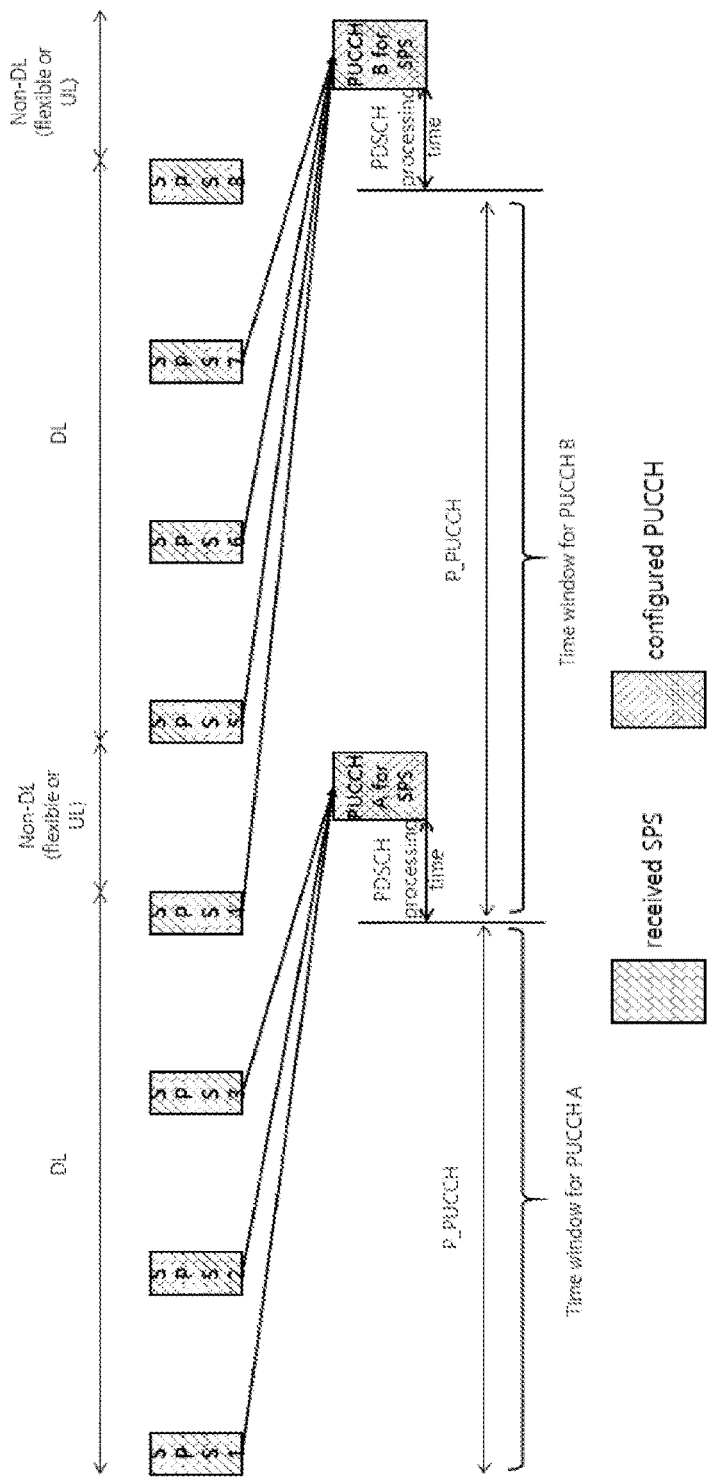
FIG. 36 is a diagram illustrating a PUCCH transmitting a HARQ-ACK of an SPS PDSCH through a PUCCH resource configuration according to still another embodiment.

FIG. 36 is a diagram illustrating a PUCCH transmitting a HARQ-ACK of an SPS PDSCH through a PUCCH resource configuration according to still another embodiment.

Referring to FIG. 36, for a HARQ-ACK of SPS4, there are the PUCCH A for SPS and the PUCCH B for SPS as the closest PUCCH resources after the SPS4. However, the time between the PUCCH A for SPS and SPS4 does not satisfy the PDSCH processing time. Therefore, the HARQ-ACK of SPS4 may not be transmitted on the PUCCH A for SPS. Since the time between the PUCCH B for SPS and SPS4 satisfies the PDSCH processing time, the HARQ-ACK of SPS4 may be transmitted on the PUCCH B for SPS.

Here, a value defined in "5.3 UE PDSCH processing procedure time" of TS38.214 may be used for the PDSCH processing time.

The following embodiments relate to a method for transmitting a HARQ-ACK of an SPS PDSCH and a HARQ-ACK of SPS release DCI when a UE receives SPS deactivation DCI (SPS release DCI).

Figure 37:
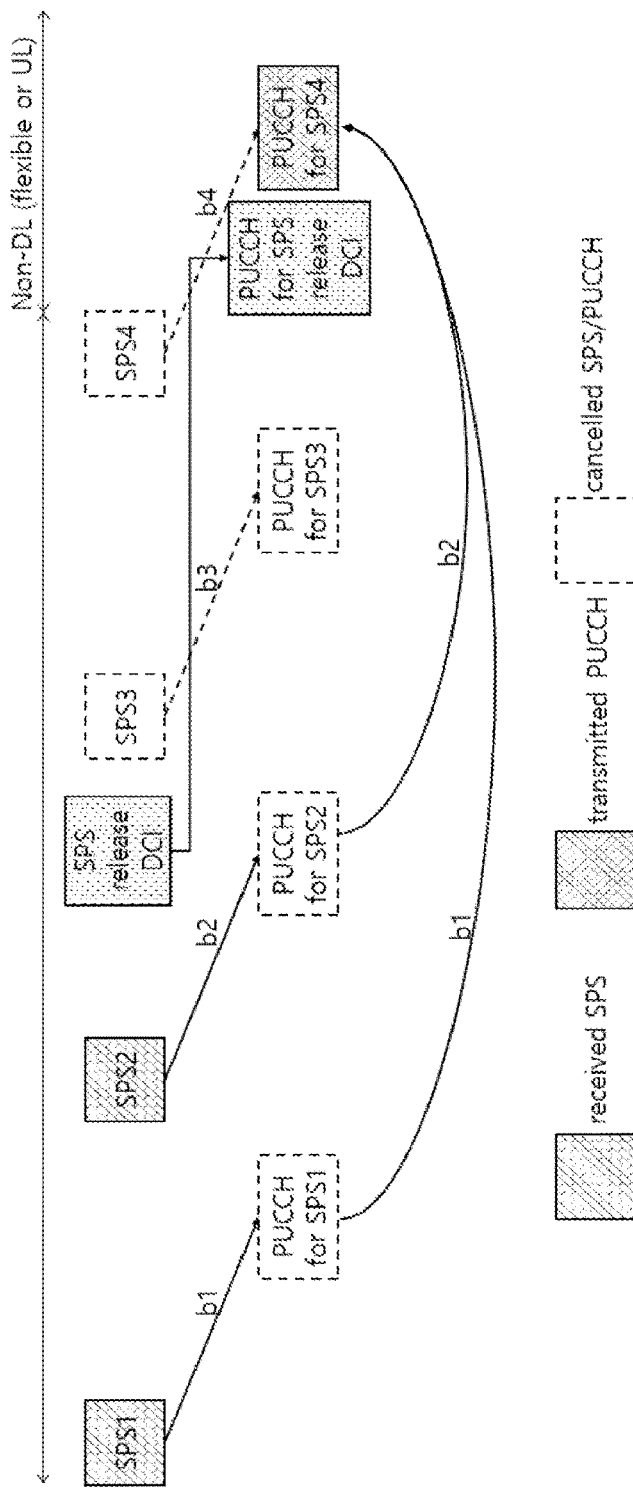
FIG. 37 is a diagram illustrating a PUCCH transmitting a HARQ-ACK of an SPS PDSCH when a UE receives SPS release downlink control information (DCI) according to one embodiment.

FIG. 37 is a diagram illustrating a PUCCH transmitting a HARQ-ACK of an SPS PDSCH when a UE receives SPS release downlink control information (DCI) according to one embodiment.

Referring to FIG. 37, the UE may receive the SPS release DCI between SPS2 and SPS3. Accordingly, the UE does not receive SPS PDSCHs (SPS3, SPS4) after the SPS release DCI. In this case, the UE has to determine how to transmit the HARQ-ACK of the SPS PDSCH.

As a fourth embodiment of the present disclosure, an operation when the UE receives the SPS release DCI is as follows. The UE may determine a PUCCH to transmit the HARQ-ACK of the SPS PDSCH regardless of whether or not the SPS release DCI is received. That is, referring to FIG. 23, in order to transmit the HARQ-ACK (b1) of SPS1, the HARQ-ACK (b2) of SPS2, and the HARQ-ACK (b3) of SPS3 regardless of whether or not the SPS release DCI is received, the UE may select the PUCCH for SPS4, which is a PUCCH available for transmission. In other words, when the SPS release DCI is not received, the PUCCH for SPS4 may include the HARQ-ACK (b1) of SPS1, the HARQ-ACK (b2) of SPS2, the HARQ-ACK (b3) of SPS3, and the HARQ-ACK (b4) of SPS4, and when the SPS release DCI is received, similarly, the PUCCH for SPS4 may include the HARQ-ACK (b1) of SPS1, the HARQ-ACK (b2) of SPS2, the HARQ-ACK (b3) of SPS3, and the HARQ-ACK (b4) of SPS4. Therefore, [b1 b2 b3 b4] may be transmitted in the PUCCH for SPS4 regardless of whether or not the SPS release DCI is received.

The fourth embodiment is robust against DTX (reception failure) of the SPS release DCI because the HARQ-ACK of the SPS is transmitted regardless of whether or not the SPS release DCI is received. However, referring to FIG. 23, since SPS3 and SPS4 are already released SPS PDSCHs, HARQ-ACKs of SPS3 and SPS4 are NACK, and the information does not need to be transmitted to the base station. Accordingly, in the fourth embodiment, transmitted HARQ-ACK information may be limited to SPS PDSCHs prior to reception of the SPS release DCI. That is, referring to FIG. 37, the PUCCH for SPS4 may transmit the HARQ-ACK (b1) of SPS1 and the HARQ-ACK (b2) of SPS2, which are SPSs before the SPS release DCI is received, and may not transmit the HARQ-ACK (b3) of SPS3 and the HARQ-ACK (b4) of SPS4, which are SPSs after the SPS release DCI is received.

In the fourth embodiment, the PUCCH carrying HARQ-ACK of an already released SPS is used. Referring to FIG. 37, SPS4 corresponding to the PUCCH for SPS4 by which the HARQ-ACK is transmitted has already been released. Therefore, the PUCCH for SPS4 is also released and is not possible to use. Hereinafter, an embodiment for solving the above is disclosed.

As a fifth embodiment of the present disclosure, an operation when the UE receives the SPS release DCI is as follows. The UE may determine as a PUCCH transmitting the HARQ-ACK of the SPS release DCI as a PUCCH to transmit the HARQ-ACK of the SPS PDSCH. A more specific example is as shown in FIG. 38.

Figure 38:
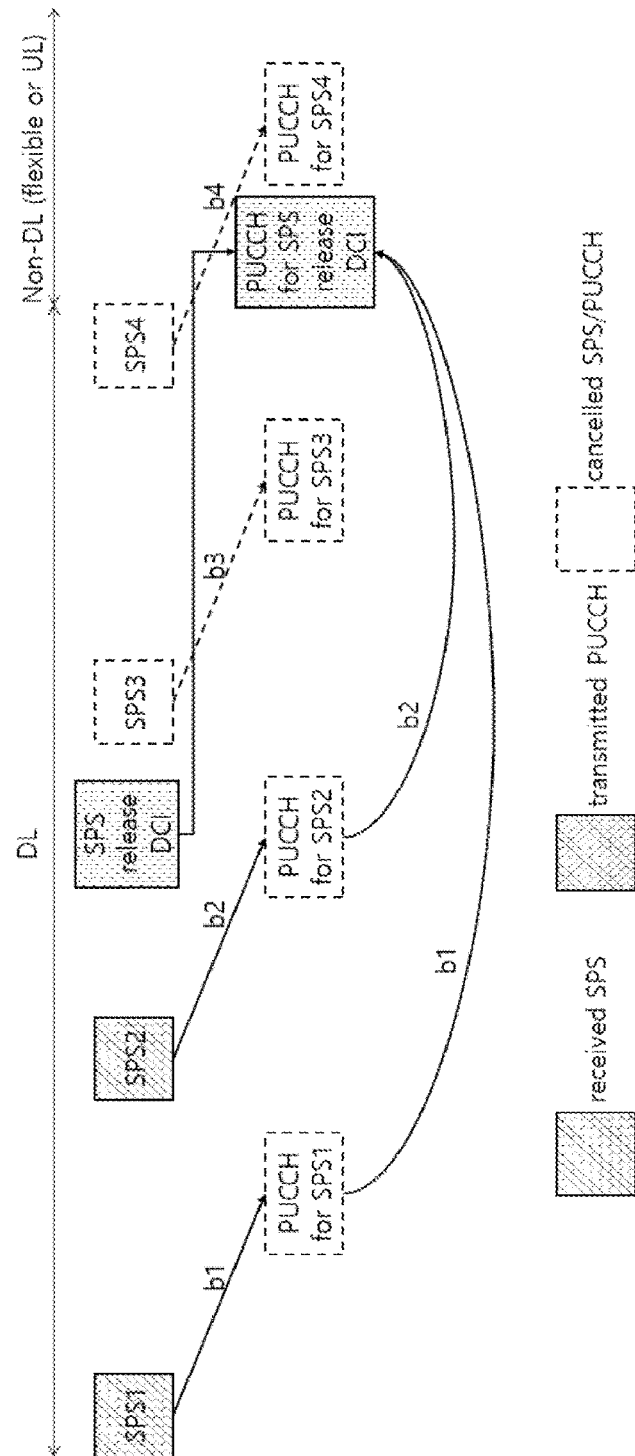
FIG. 38 is a diagram illustrating a PUCCH transmitting a HARQ-ACK of an SPS PDSCH when a UE receives SPS release DCI according to another embodiment.

FIG. 38 is a diagram illustrating a PUCCH transmitting a HARQ-ACK of an SPS PDSCH when a UE receives SPS release DCI according to another embodiment.

Referring to FIG. 38, when the UE determines a PUCCH to transmit the HARQ-ACK (b1) of SPS1 and the HARQ-ACK (b2) of SPS2, the UE may select the PUCCH transmitting the HARQ-ACK of the SPS release DCI (PUCCH for SPS release DCI). Therefore, the PUCCH for SPS release DCI may include the HARQ-ACK of SPS release DCI, the HARQ-ACK (b1) of SPS1, and the HARQ-ACK (b2) of SPS2.

Figure 39:
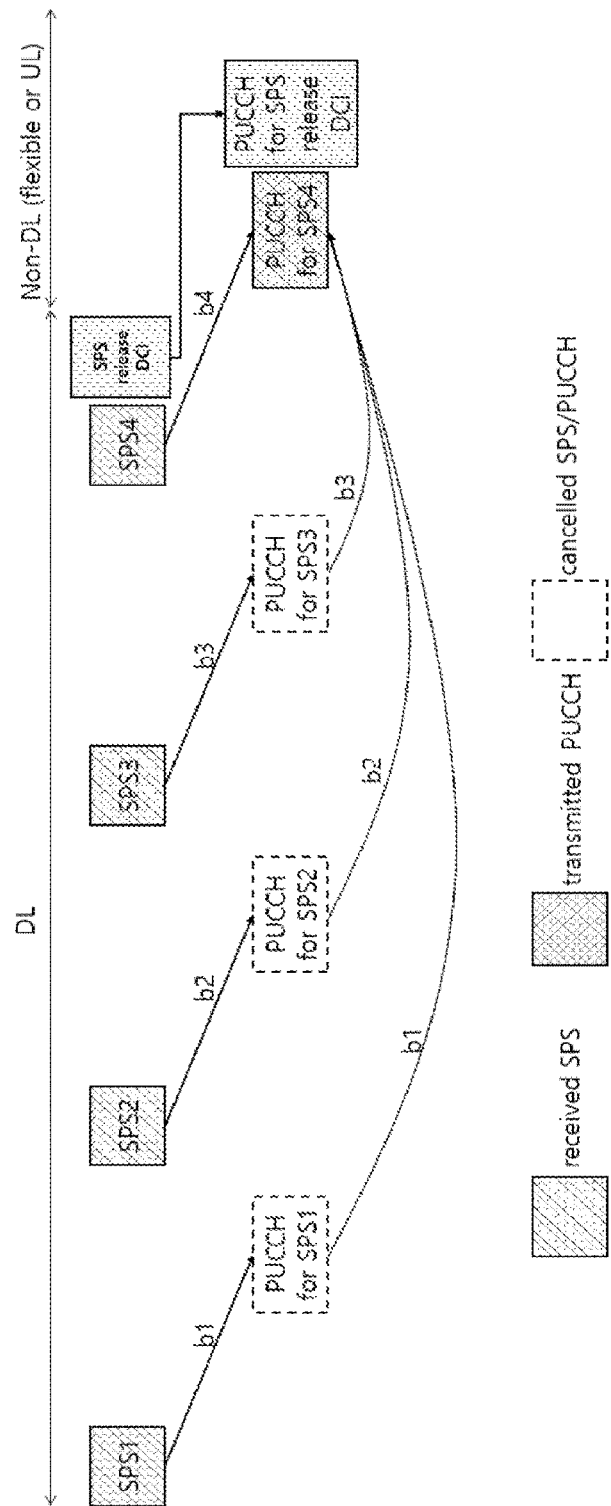
FIG. 39 is a diagram illustrating a PUCCH transmitting a HARQ-ACK of an SPS PDSCH when a UE receives SPS release DCI according to still another embodiment.

FIG. 39 is a diagram illustrating a PUCCH transmitting a HARQ-ACK of an SPS PDSCH when a UE receives SPS release DCI according to still another embodiment.

Referring to FIG. 39, the fifth embodiment is applied because SPS4 corresponding to PUCCH for SPS4 transmitting the HARQ-ACK (b1) of SPS1 and the HARQ-ACK (b2) of SPS2 is released as the UE receives the SPS release DCI. If SPS4 corresponding to the PUCCH for SPS4 is not released (e.g., the SPS release DCI is received after SPS4), the UE may transmit the HARQ-ACK (b1) of SPS1, the HARQ-ACK (b2) of SPS2, the HARQ-ACK (b3) of SPS3, and the HARQ-ACK (b4) of SPS4 on the PUCCH for SPS4.

Figure 40:
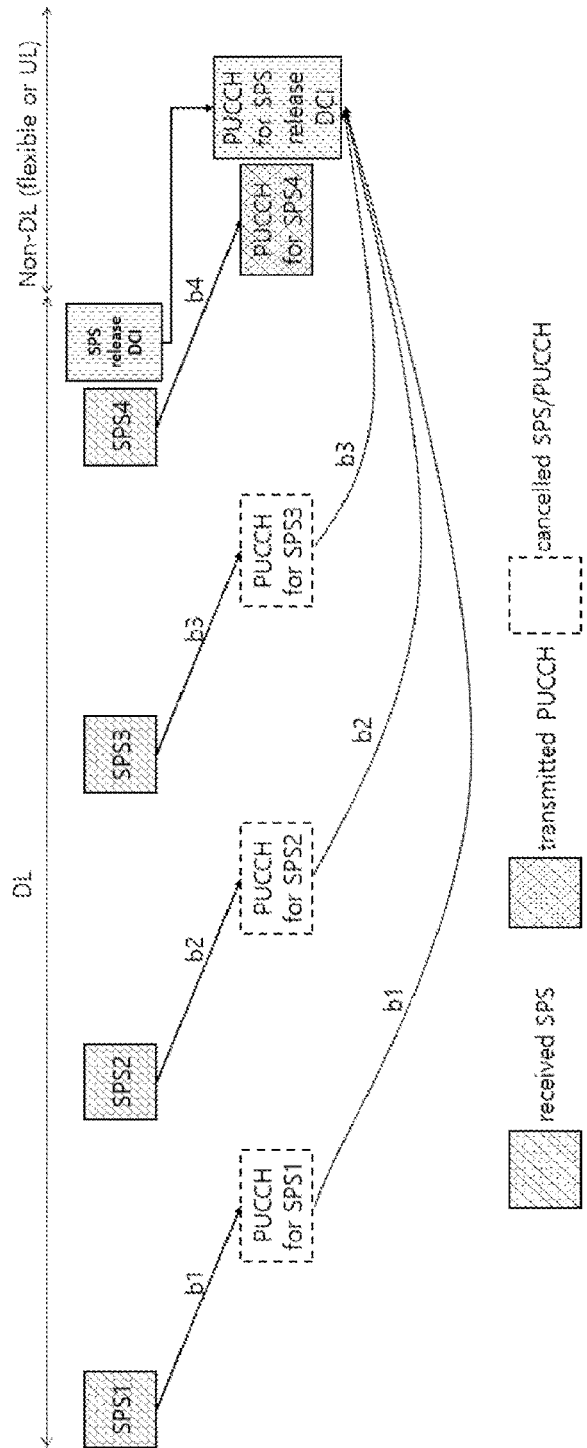
FIG. 40 is a diagram illustrating a PUCCH transmitting a HARQ-ACK of an SPS PDSCH when a UE receives SPS release DCI according to still another embodiment.

FIG. 40 is a diagram illustrating a PUCCH transmitting a HARQ-ACK of an SPS PDSCH when a UE receives SPS release DCI according to still another embodiment.

Referring to FIG. 40, the UE may include HARQ-ACKs that has failed to be transmitted in the PUCCH for the SPS release DCI that always transmits the HARQ-ACK of the SPS release DCI. This is because even if SPS4 corresponding to the PUCCH for SPS4 is not released (for example, the SPS release DCI is received after SPS4), the UE may transmit the HARQ-ACK (b1) of SPS1, the HARQ-ACK (b2) of SPS2, and the HARQ-ACK (b3) of SPS3 on the PUCCH for the SPS release DCI.

Another problem to be solved in the present embodiment is to arrange the order of HARQ-ACK bits. As mentioned above, when the PUCCH carrying the HARQ-ACK of the SPS PDSCH is not possible to transmit, the HARQ-ACK may be transmitted on another PUCCH. In this case, it is necessary to determine the order of HARQ-ACK bits on the other PUCCH.

As a preferred method for determining HARQ-ACK bits, the UE may first place HARQ-ACK bits to be originally transmitted on the PUCCH, and then place delayed HARQ-ACK bits. Here, when the PUCCH carrying the HARQ-ACK of the SPS PDSCH is not transmitted, the HARQ-ACK transferred to the PUCCH for being transmitted is referred to as delayed HARQ-ACK bits. The order of delayed HARQ-ACK bits may be determined based on at least the following.

In one aspect, the order of delayed HARQ-ACK bits may be determined according to an ascending order of indices of PUCCH slots on which the delayed HARQ-ACK is to be transmitted.

In another aspect, the order of delayed HARQ-ACK bits may be determined according to an ascending order of indices of PUCCH slots of the SPS PDSCH corresponding to the delayed HARQ-ACK.

In still another aspect, the order of delayed HARQ-ACK bits may be determined according to an ascending order of HARQ process numbers (HPNs) of the SPS PDSCH corresponding to the delayed HARQ-ACK.

In still another aspect, the order of delayed HARQ-ACK bits may be determined according to an ascending order of indices of the cell of the SPS PDSCH corresponding to the delayed HARQ-ACK.

The above criteria may be used in combination. In addition, although a determination is made according to the ascending order of the indices of the cell of the SPS PDSCH corresponding to the delayed HARQ-ACK, another criterion may be additionally applied in the same cell.

The SPS HARQ-ACK transmission of the present disclosure described above may be summarized step by step as follows.

Step 1) When the PUCCH resource for the SPS HARQ-ACK overlaps with an invalid UL symbol in (sub-)slot n, the UE does not use the PUCCH resource (drop).

Here, the PUCCH resource for the SPS HARQ-ACK is a PUCCH resource configured in a higher layer signal n1PUCCH-AN in SPS-config or SPS-PUCCH-AN-r16 in sps-PUCCH-AN-List-r16. n1PUCCH-AN in SPS-config indicates a PUCCH resource for transmitting a 1-bit HARQ-ACK of SPS. Here, the PUCCH format is Format 0 or 1. SPS-PUCCH-AN-r16 in sps-PUCCH-AN-List-r16 indicates up to four PUCCH resources. Here, one resource is selected from among up to four PUCCH resources according to an SPS HARQ-ACK bit-size.

Here, the invalid UL symbol may include at least one of semi-static DL, SSB, CORESET #0, a higher priority uplink channel, and a PRACH channel.

Step 2-1) When the PUCCH resource for DG HARQ-ACK is scheduled in (sub-)slot n, the UE multiplexes the SPS HARQ-ACK to be transmitted in slot n with a DG HARQ-ACK and transmits it in the PUCCH resource for DG HARQ-ACK.

Here, the PUCCH resource for dynamic grant (DG) HARQ-ACK is a PUCCH resource in which transmission of a HARQ-ACK of a PDSCH scheduled through DCI Format 1-0, 1-1, or 1-2 is indicated. This may be indicated through a PUCCH resource indicator (PRI) field included in DCI Format 1-0, 1-1, or 1-2.

Here, multiplexing may create a bit sequence by connecting (cascading) DG HARQ-ACK bits and SPS HARQ-ACK bits to be transmitted in slot n. This may be applied to a case of a type-1 codebook or a type-2 codebook. In the case of a Type-3 codebook, DG HARQ-ACK bits and SPS HARQ-ACK bits are not connected and transmitted. In this case, according to a Type-3 codebook generation method, HARQ-ACK bits are sorted and generated in ascending order of cell index and ascending order of HARQ process numbers in one cell index.

Step 2-2) When the PUCCH resource for the DG HARQ-ACK is not scheduled in (sub-)slot n and another configured PUCCH resource is valid, the UE transmits an SPS HARQ-ACK instead in the valid configured PUCCH resource.

Here, the other configured PUCCH resource may include a PUCCH resource configured for SPS HARQ-ACK transmission or a PUCCH resource configured for DG HARQ-ACK transmission. The PUCCH resource configured for SPS HARQ-ACK transmission may include a PUCCH resource configured in a higher layer signal n1PUCCH-AN in SPS-config or SPS-PUCCH-AN-r16 in sps-PUCCH-AN-List-r16. The PUCCH resource configured for DG HARQ-ACK transmission may include a PUCCH resource that may be indicated by the PUCCH resource indicator (PRI) field of DCI formats 1-0, 1-1, or 1-2.

Here, when the other configured PUCCH resource does not overlap with an invalid UL symbol, the UE may determine that the corresponding PUCCH resource is valid.

Here, if there are a plurality of valid configured PUCCH resources, the UE has to determine one PUCCH resource among them. A specific method will be described below.

Step 2-3) When the PUCCH resource for the DG HARQ-ACK is not scheduled in (sub-)slot n and all other configured PUCCH resources are invalid, the UE determines whether SPS HARQ-ACK transmission is possible in (sub-)slot n+P.

Here, P may be a period of the SPS PDSCH or P may be a specific value. Preferably, P may be given as 1.

Here, the determination as to whether SPS HARQ-ACK transmission is possible in slot n+P, may use Steps 1), 2-1), 2-2), and 2-3).

In the above Step 2-2), if there are a plurality of valid configured PUCCH resources, the UE has to determine one PUCCH resource among them. Specific methods are as follows.

First method: When there are a plurality of valid configured PUCCH resources, the UE may select a PUCCH resource based on a bit size transmittable by the PUCCH resource. More specifically, when the bits to be transmitted are B bits, a PUCCH resource capable of transmitting bits equal to or greater than the B bits is selected from among the valid configured PUCCH resources. If there are a plurality of PUCCH resources capable of transmitting bits greater than the B bits, a PUCCH resource capable of transmitting the smallest bits is selected from among them. A more detailed description is as follows.

SPS-PUCCH-AN-r16 in sps-PUCCH-AN-List-r16 may configure up to four PUCCH resources. A PUCCH resource configured for DG HARQ-ACK transmission may configure up to four PUCCH resources for one PRI value. More specifically, when HARQ-ACK bits are B bits, if $0<B\leq N1$, HARQ-ACK bits are transmitted on a PUCCH (~N1 bits), if $N1<B\leq N2$, HARQ-ACK bits are transmitted on a PUCCH (~N2 bits), if $N2<B\leq N3$, HARQ-ACK bits may be transmitted on a PUCCH (~N3 bits), and if $N3<B\leq N4$, HARQ-ACK bits may be transmitted on a PUCCH (~N4 bits).

Figure 41:
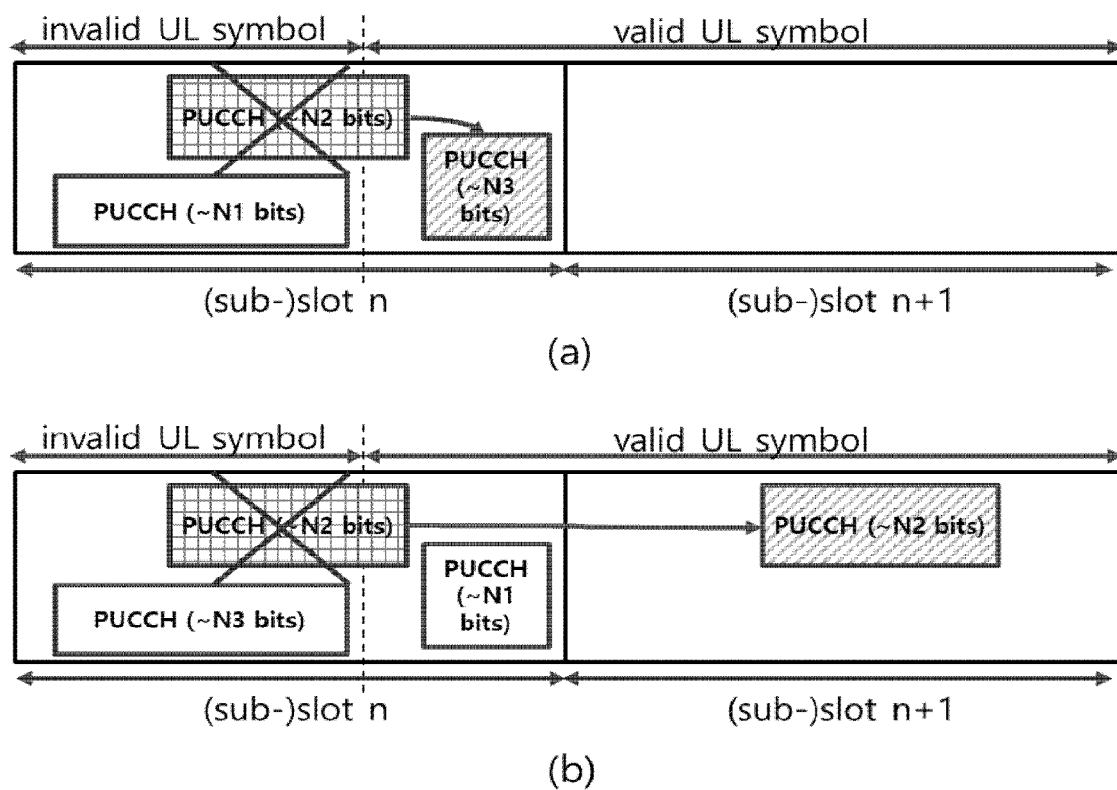
FIG. 41 is a diagram illustrating a method for determining a valid PUCCH resource by a UE according to an example.

FIG. 41 is a diagram illustrating a method for determining a valid PUCCH resource by a UE according to an example.

Referring to FIG. 41, it is assumed that HARQ-ACK bits to be transmitted are B bits and $N1<B\leq N2$. In this case, the UE has to transmit the B bits on the PUCCH (~N2 bits). However, as shown in FIG. 41, when the PUCCH (~N2 bits) overlaps with an invalid UL symbol, the UE does not transmit the PUCCH (~N2 bits) according to step 1). Then, the UE may transmit the B bits in another configured PUCCH resource according to Step 2-2).

Referring to FIG. 41(a), the PUCCH (~N1 bits) is not valid because it overlaps with an invalid UL symbol. The PUCCH (~N3 bits) is valid because it does not overlap with an invalid UL symbol. The UE may check whether B bits is capable of being transmitted on the PUCCH (~N3 bits). Since N3 is larger than B (B is smaller than N2 and N3 is larger than N2), the PUCCH (~N3 bits) may transmit B bits. Therefore, the UE may transmit the B bits on the PUCCH (~N3 bits).

Referring to FIG. 41(b), the PUCCH (~N3 bits) is not valid because it overlaps with an invalid UL symbol. Since the PUCCH (~N1 bits) does not overlap with an invalid UL symbol, the UE determines the corresponding PUCCH as valid. The UE may check whether B bits is capable of being transmitted on the PUCCH (~N1 bits). Since N1 is smaller than B, the PUCCH (~N1 bits) may not transmit B bits. Therefore, the UE may not transmit in (sub-)slot n because there is no valid PUCCH resource capable of transmitting the B bits, and may determine whether transmission is possible in (sub-)slot n+1.

Figure 42:
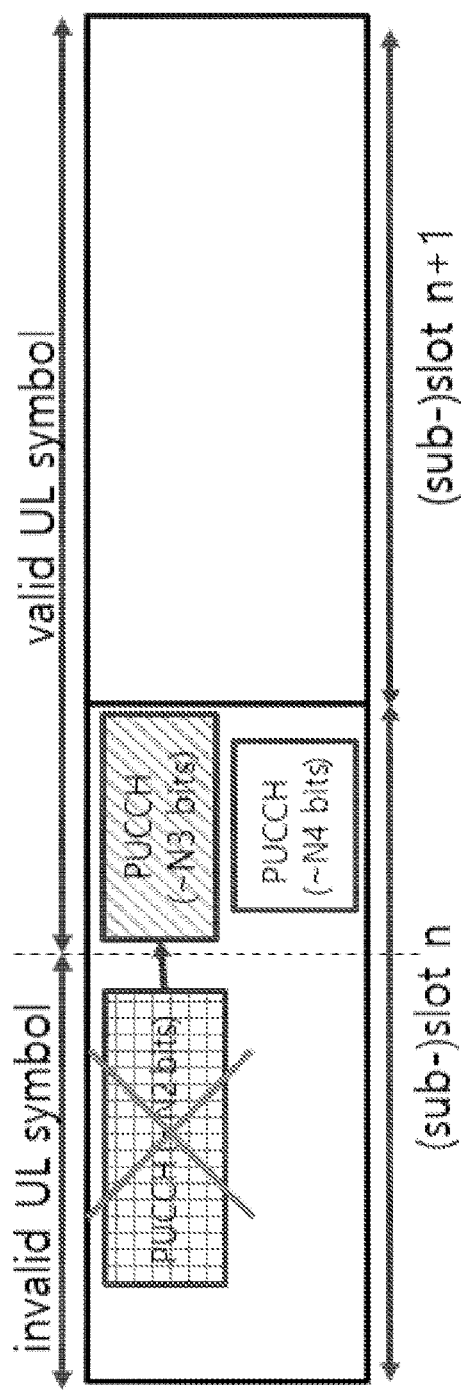
FIG. 42 is a diagram illustrating a method for determining a valid PUCCH resource by a UE according to another example.

FIG. 42 is a diagram illustrating a method for determining a valid PUCCH resource by a UE according to another example.

Referring to FIG. 42, the PUCCH (~N3 bits) is valid because it does not overlap with an invalid UL symbol. The PUCCH (~N4 bits) is valid because it does not overlap with an invalid UL symbol. In addition, the two PUCCH resources may transmit B bits. Here, N3 and N4 are larger values than B. Therefore, there are two or more valid PUCCH resources. In this case, the UE has to select one PUCCH resource. The UE does not need to select a larger PUCCH resource to transmit B bits. This is because if a larger PUCCH resource is selected, the PUCCH resource may be wasted. Therefore, the UE may select a smaller PUCCH resource. In FIG. 42, the UE may select the PUCCH (~N3 bits). Here, N3 is a smaller value than N4.

Second method: When there are a plurality of valid configured PUCCH resources, the UE may determine one PUCCH resource based on at least one of a starting symbol, an ending symbol, or the number of symbols of the PUCCH resource. When based on the starting symbol, it is possible to select a PUCCH resource that starts earlier (of the most preceding starting symbol). This is because a PUCCH resource that starts earlier (of the most preceding starting symbol) may reduce the delay time. When based on the ending symbol, it is possible to select a PUCCH resource that ends earlier (of the most preceding ending symbol). This is because a PUCCH resource that ends earlier (of the most preceding ending symbol) may reduce the delay time. When based on the number of symbols, the UE may select a PUCCH resource with a larger number of symbols. This is because the PUCCH resource with a larger number of symbols may increase reliability.

Figure 43:
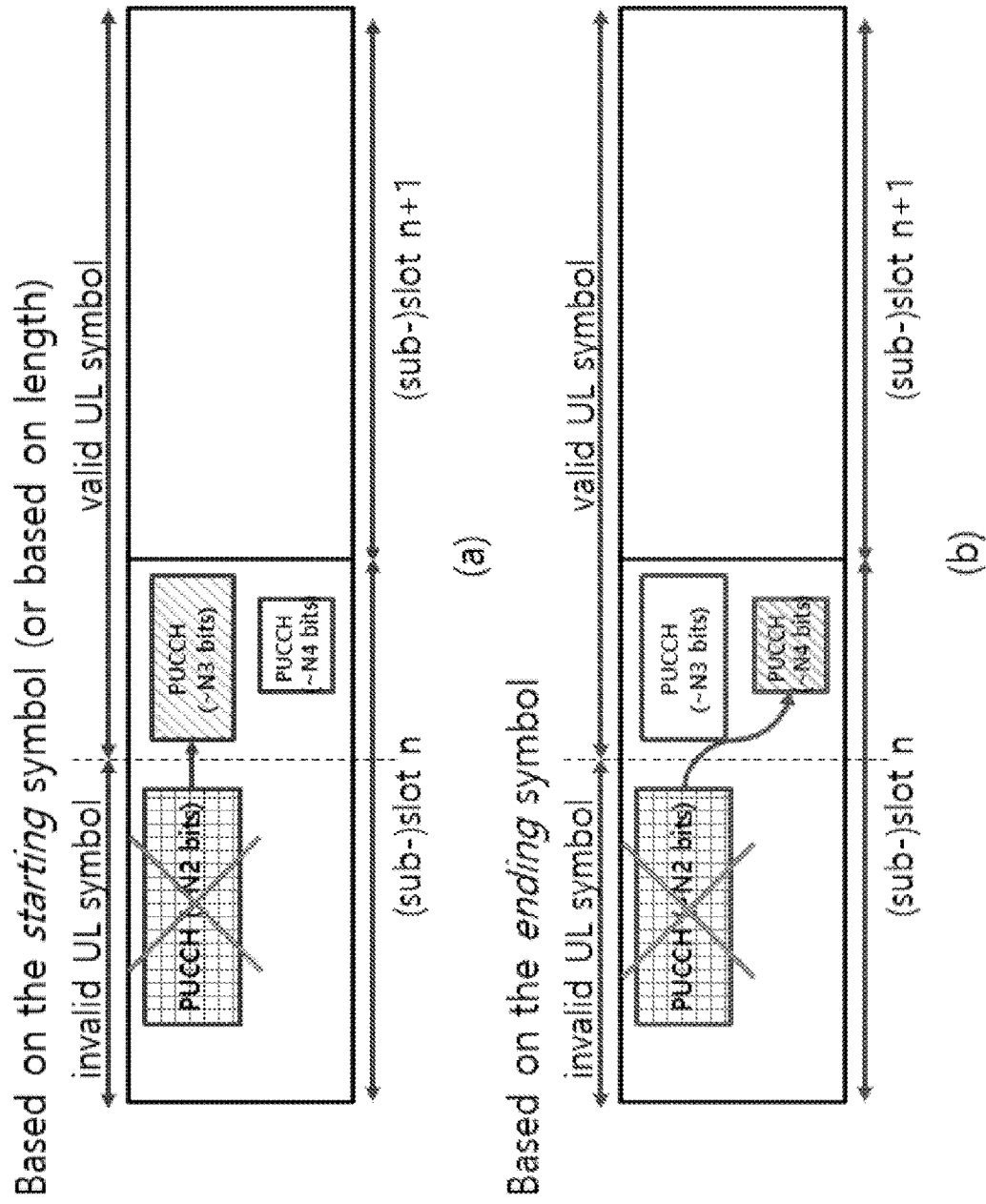
FIG. 43 is a diagram illustrating a method for determining a valid PUCCH resource by a UE according to still another example.

FIG. 43 is a diagram illustrating a method for determining a valid PUCCH resource by a UE according to still another example.

Referring to FIG. 43, the PUCCH (~N3 bits) is valid because it does not overlap with an invalid UL symbol. The PUCCH (~N4 bits) is valid because it does not overlap with an invalid UL symbol. There are two or more valid PUCCH resources. In this case, the UE has to select one PUCCH resource. For example, the UE may select the PUCCH (~N3 bits) that starts earlier (of the most preceding starting symbol) as shown in FIG. 43(a). In addition, the UE may select the PUCCH (~N3 bits) with a larger number of symbols as shown in FIG. 43(a). Alternatively, the UE may select the PUCCH (~N4 bits) that ends earlier (of the most preceding ending symbol) as shown in FIG. 43(b).

Figure 44:
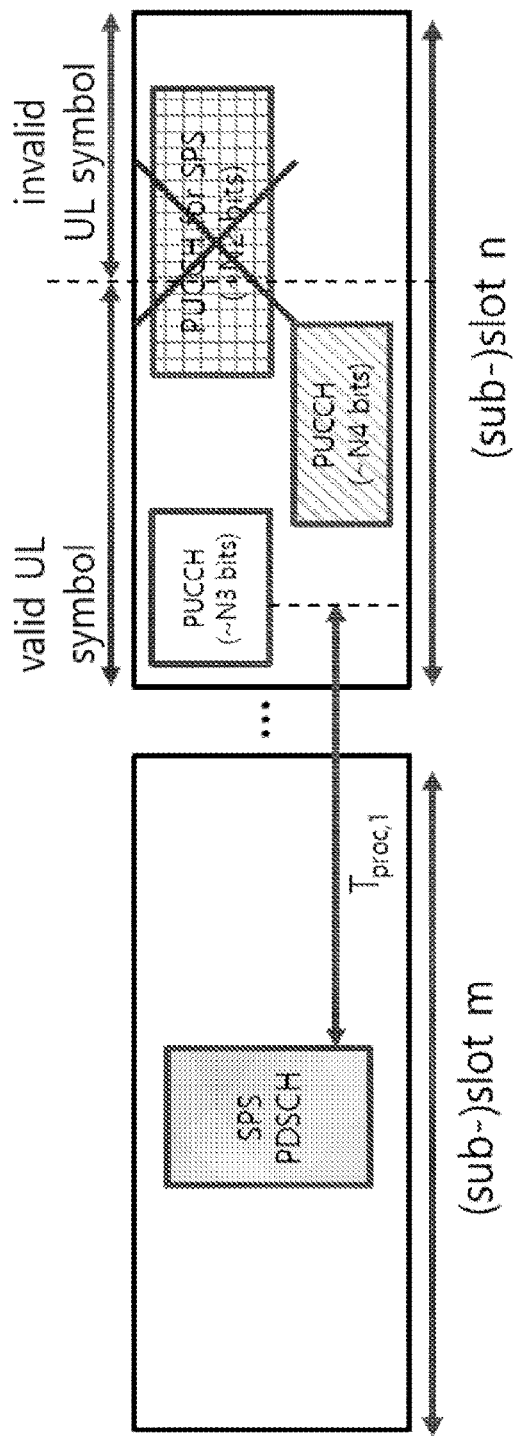
FIG. 44 is a diagram illustrating a method for determining a valid PUCCH resource by a UE according to still another example.

FIG. 44 is a diagram illustrating a method for determining a valid PUCCH resource by a UE according to still another example.

Referring to FIG. 44, the PUCCH (~N3 bits) is valid because it does not overlap with an invalid UL symbol. The PUCCH (~N4 bits) is valid because it does not overlap with an invalid UL symbol. There are two or more valid PUCCH resources. In this case, the UE has to select one PUCCH resource. However, some PUCCH resources among valid PUCCH resources may not satisfy a processing time condition for PDSCH decoding and HARQ-ACK generation. In this case, the UE may not transmit a valid HARQ-ACK in the PUCCH resource. Therefore, it is desirable to select a PUCCH resource that satisfies the processing time condition.

In FIG. 44, the PUCCH resource (~N3 bits) is a PUCCH resource that starts earlier (of the most preceding starting symbol), but does not satisfy a processing time condition $T_{proc,1}$. Therefore, since a valid HARQ-ACK of the SPS PDSCH may not be transmitted on the PUCCH (~N3 bits), the UE may select the PUCCH (~N4 bits).

Third method: When there are a plurality of valid configured PUCCH resources, the UE may select one PUCCH resource based on the index of the PUCCH resource. A unique index may be assigned to the PUCCH resource. The UE may select a PUCCH resource corresponding to the lowest index (or a specific index configured in a higher layer) among unique indices of valid PUCCH resources.

Fourth method: When there are a plurality of valid configured PUCCH resources and some of them are PUCCH resources configured for SPS HARQ-ACK transmission and others are PUCCH resources configured for DG HARQ-ACK transmission, the UE may preferentially select one of the PUCCH resources configured for SPS HARQ-ACK transmission and PUCCH resources configured for DG HARQ-ACK transmission. That is, the UE may preferentially select the PUCCH resources configured for SPS HARQ-ACK transmission among the plurality of PUCCH resources and then may select one PUCCH resource. If one PUCCH resource is not selected among the PUCCH resources configured for SPS HARQ-ACK transmission, the UE may select one PUCCH resource among PUCCH resources configured for DG HARQ-ACK transmission. Conversely, the UE may preferentially select the PUCCH resources configured for DG HARQ-ACK transmission among the plurality of PUCCH resources and then may select one PUCCH resource. If one PUCCH resource is not selected among the PUCCH resources configured for DG HARQ-ACK transmission, the UE may select one PUCCH resource among PUCCH resources configured for SPS HARQ-ACK transmission.

In general, URLLC services require low delay time. Therefore, a HARQ-ACK of the SPS PDSCH for URLLC service has to be transmitted within a certain time for retransmission within a short time. Therefore, when the HARQ-ACK of the SPS PDSCH is delayed, if there is a maximum possible delay time, the HARQ-ACK transmission may be unnecessary when the maximum delay time is exceeded.

Another embodiment of the present disclosure relates to a method for determining a maximum possible delay slot when a HARQ-ACK of an SPS PDSCH is delayed.

Hereinafter, unless otherwise stated in the present specification, it is assumed that when a HARQ-ACK of an SPS PDSCH is transmitted on a PUCCH, the PUCCH is repeatedly transmitted in a plurality of slots. Here, it is assumed that the PUCCH is repeatedly transmitted in N slots.

When a PUCCH transmitting the HARQ-ACK is repeatedly transmitted in a plurality of slots, some of the plurality of slots are slots within the maximum possible delay slot (that is, slots that satisfy the delay time), and the remaining slots may be slots after the maximum possible delay slot (that is, slots that does not satisfy the delay time).

One UE may be given a plurality of SPS PDSCH configurations. In this case, since each SPS PDSCH configuration may provide the same or different URLLC service, the same or different maximum possible delay slot may be set in the SPS PDSCH configuration. HARQ-ACKs of SPS PDSCHs according to the plurality of SPS PDSCH configurations may be transmitted on the same PUCCH. In other words, the HARQ-ACK included in one PUCCH may have the same or different maximum possible delay slot according to the same or different URLLC service.

Conditions to which the present embodiment is applied may include the following: i) The PUCCH on which the HARQ-ACK of the SPS PDSCH is transmitted is repeatedly transmitted in a plurality of slots (N slots). ii) One UE is given two or more SPS PDSCH configurations. Here, two or more SPS PDSCH configurations may include the same maximum possible delay slot or different maximum possible delay slots. iii) In the present embodiment, two SPS PDSCH configurations are described for convenience, but the present disclosure is not limited to two SPS PDSCH configurations and a larger number of SPS PDSCH configurations may be applied. The two SPS PDSCH configurations are called SPS PDSCH Configuration #0 and SPS PDSCH Configuration #1.

Figure 45:
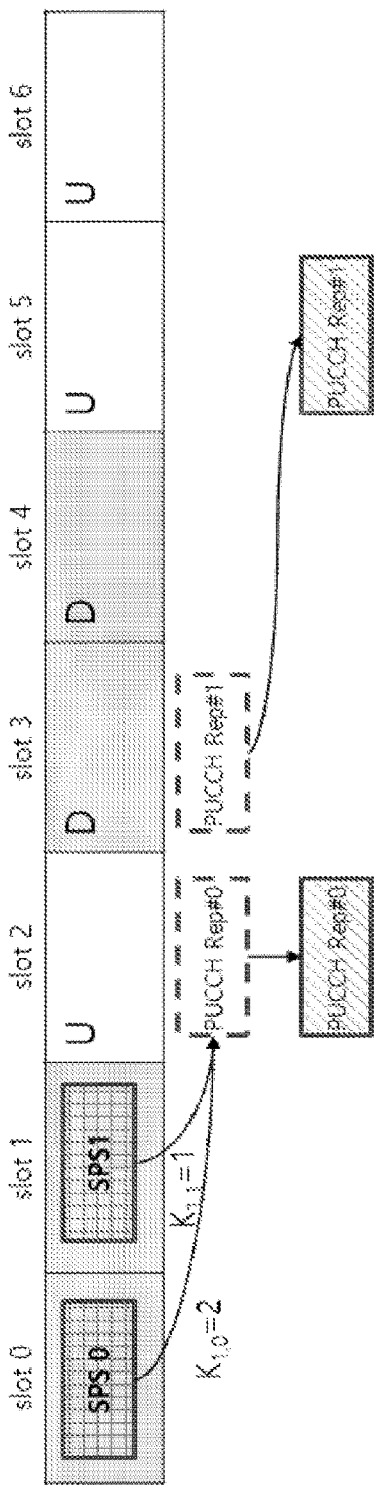
FIG. 45 illustrates an example of a scenario to which the present embodiment is applied.

FIG. 45 illustrates an example of a scenario to which the present embodiment is applied.

Referring to FIG. 45, slots 0, 1, 3, and 4 are DL slots, and slots 2, 5, and 6 are UL slots. Here, in the DL slots, the UE may receive downlink channels and signals, but may not transmit uplink channels and signals. Here, in the UL slots, the UE may receive uplink channels and signals, but may not transmit downlink channels and signals. In the present disclosure, for convenience, DL slots and UL slots are represented, but they may be expressed as DL symbols and UL symbols.

The UE may be provided with two SPS PDSCH configurations. According to SPS PDSCH configuration #0, the UE may be configured to receive the SPS PDSCH (indicated as SPS0 in FIG. 31 and subsequent drawings) in slot 0. According to SPS PDSCH Configuration #1, the UE may be configured to receive the SPS PDSCH (indicated as SPS1 in FIG. 31 and subsequent drawings) in slot 1.

A slot in which a HARQ-ACK is transmitted is determined according to each SPS PDSCH configuration. In SPS PDSCH configuration #0, the K1 value indicating the slot in which the HARQ-ACK is transmitted (indicated as $K_{1,0}$ in FIG. 45 and subsequent drawings) is given 2, and in SPS PDSCH configuration #1, the K1 value indicating the slot in which the HARQ-ACK is transmitted (indicated as $K_{1,1}$ in FIG. 45 and subsequent drawings) is given 1. Therefore, the UE has to transmit, in slot 2, the HARQ-ACK of the SPS PDSCH (SPS0) configured for reception in slot 0, and has to transmit, in slot 2, the HARQ-ACK of the SPS PDSCH (SPS1) configured for reception in slot 1. That is, the UE has to transmit, in slot 2, the HARQ-ACKs of the SPS PDSCH (SPS0) of slot 0 and the SPS PDSCH (SPS1) of slot 1.

The PUCCH transmitting HARQ-ACKs (HARQ-ACKs of the SPS PDSCH (SPS0) of slot 0 and the SPS PDSCH (SPS1) of slot 1) in slot 2 may be repeatedly transmitted in a plurality of slots. Here, the number of repeated plurality of slots is 2. The UE may repeatedly transmit the PUCCH in slot 2 and slot 3. A first repeated PUCCH is referred to as PUCCH Rep #0, and a second repeated PUCCH is referred to as PUCCH Rep #1. Slot 2 is a UL slot and is capable of PUCCH Rep #0 transmission, but slot 3 is a DL slot and is not capable of PUCCH Rep #0 transmission. The UE may delay transmission of PUCCH Rep #0 to be transmitted in slot 3 to a slot available for transmission after slot 3. Since slot 5 is a UL slot in FIG. 31, the UE may transmit PUCCH Rep #1 in slot 5. That is, the PUCCH transmitting HARQ-ACKs of the SPS PDSCH (SPS0) of slot 0 and the SPS PDSCH (SPS1) of slot 1 is repeatedly transmitted in slots 2 and 5.

PUCCH Rep #1, which has to be transmitted in slot 3, is delayed to slot 5. If the base station may determine the correct HARQ-ACK only after receiving both PUCCH Rep #0 and PUCCH Rep #1, the base station has to wait until it receives PUCCH Rep #1 transmitted in slot 5. In this case, the base station may not instruct fast HARQ-ACK reception and retransmission. As another example, when the delay of the service transmitted by the SPS is short and the base station must receive the HARQ-ACK until at least slot 3 to instruct retransmission, the base station may not instruct the retransmission even if the base station receives the PUCCH Rep #1 transmitted in slot 5. Therefore, a determination has to be made as to whether transmission of delayed PUCCH Rep #1 is necessary.

The service transmitted by SPS PDSCH Configuration #0 and the service transmitted by SPS PDSCH Configuration #1 may have different service requirements. For example, in the case of SPS PDSCH Configuration #0, the service may have a large delay time, and in the case of SPS PDSCH Configuration #1, the service may have a relative short delay time. Accordingly, among HARQ-ACKs transmitted by PUCCH Rep #1 in slot 5, the HARQ-ACK of SPS0 according to SPS PDSCH Configuration #0 may be valid, and the HARQ-ACK of SPS1 according to SPS PDSCH Configuration #1 may not be valid. Therefore, PUCCH Rep #1 in slot 5 needs to include the HARQ-ACK of SPS0, but does not need to include the HARQ-ACK of SPS1.

For reference, in the present disclosure, when the base station may perform retransmission within a delay time through the HARQ-ACK, the HARQ-ACK is considered valid. Otherwise, the HARQ-ACK is considered invalid.

It is assumed that PUCCH Rep #0 includes HARQ-ACK information about both SPS0 and SPS1, and PUCCH Rep #1 includes HARQ-ACK information about SPS0 but does not include HARQ-ACK information about SPS1. In this case, a method for receiving PUCCH Rep #0 and PUCCH Rep #1 in the base station may be complicated. When the PUCCH is repeatedly transmitted in a plurality of slots, the PUCCH transmitted in each slot always includes the same uplink control information (UCI). Accordingly, the base station may determine the UCI by soft-combining the PUCCHs received in each slot. However, when the UCI included in PUCCH Rep #0 is different from the UCI included in PUCCH Rep #1, it is difficult to perform soft combining in the base station, and as a consequence, a more complex receiver has to be used. Further, when the size of UCI transmitted by PUCCH in each slot is different, PUCCH resources may be different. Therefore, if possible, the PUCCH repeatedly transmitted in a plurality of slots has to include the same UCI.

In order to solve the above, embodiments of the present disclosure are disclosed.

First, before looking at the embodiments, validity of two HARQ-ACKs may be determined as follows.

Validity of HARQ-ACKs

Valid if $K_1 + K_{def} \leq Y$ is satisfied. otherwise not valid  (Condition 1)

Valid if $K_{def} \leq Y$ is satisfied. otherwise not valid (void)  (Condition 2)

In Condition 1 and Condition 2, Y represents a maximum delay time. In the present disclosure, for convenience, the unit of Y is a slot, but the unit of Y may be a symbol or an absolute time (for example, ms). The Y value may be the same or different for each SPS PDSCH configuration. For example, the Y value may be included in each SPS PDSCH configuration. For example, SPS PDSCH Configuration #0 may set $Y_0$ as the maximum delay time, and SPS PDSCH Configuration #1 may set $Y_1$ as the maximum delay time. Here, $Y_0$ and $Y_1$ values may be the same or different.

In Condition 1, K1 represents a spacing between the slot to which the PDSCH belongs and the slot in which a HARQ-ACK is transmitted. The K1 value may be indicated in SPS PDSCH configuration or in downlink control information (DCI) for activating SPS PDSCH. The K1 value may be different for each SPS PDSCH configuration. For example, $K_{1,0}$ may be indicated as a K1 value in SPS PDSCH Configuration #0, and $K_{1,1}$ may be indicated as the K1 value in SPS PDSCH Configuration #1.

In Condition 1 and Condition 2 above, $K_{def}$ represents a delay caused by delay in PUCCH transmission. More specifically, when the PUCCH is repeatedly transmitted in a plurality of slots, $K_{def}$ may be defined as follows.
Definition of $K_{def}$ The $K_{def}$ value of the Nth PUCCH repetition may be determined according to one of the following two options.

(Option 1): Difference between the slot indicated for a first PUCCH repetition transmission (the slot indicated by the K1 value) and the slot for transmission of actual Nth PUCCH repetition (Option 2): Difference between the slot (when the slot indicated by the K1 value is the slot indicated for the first repetition PUCCH transmission, the slot indicated for the Nth PUCCH repetition transmission) for which the Nth PUCCH repetition transmission is indicated and the slot for transmission of actual Nth PUCCH repetition According to Option 1, the $K_{def}$ value indicates how many slots later the Nth PUCCH repetition is transmitted from the slot indicated for the first PUCCH repetition transmission. That is, the $K_{def}$ value indicates how much later the Nth PUCCH repetition is transmitted compared to the transmission of the first PUCCH.

According to Option 2, the $K_{def}$ value represents a delay time between the slot indicated for the Nth PUCCH repetition transmission before delayed transmission and the slot for transmission of actual Nth PUCCH repetition. That is, the $K_{def}$ value represents how much delay time occurs for each PUCCH repetition transmission.

In this way, the UE may check validity of the HARQ-ACK in units of slots. However, the proposal of the present disclosure may be applied to check the validity of the HARQ-ACK in units of symbols. In this case, the validity of the HARQ-ACK may be checked as follows.
Validity of HARQ-ACK (in Units of Symbols)

(Condition 1): Valid if an interval between the last symbol of the PDSCH and the last symbol of the transmission of the actual PUCCH repetition is smaller than or equal to Y. otherwise not valid (void)

(Condition 2-1): Valid if an interval between the last symbol of the indicated first PDSCH repetition transmission and the last symbol of the actual Nth PUCCH repetition transmission is smaller than or equal to Y. otherwise not valid (void)

(Condition 2-2): Valid if an interval between the last symbol of the indicated Nth PDSCH repetition transmission and the last symbol of the actual PUCCH repetition transmission is smaller than or equal to Y. otherwise not valid (void)

Here, the last symbol of the PUCCH repetition transmission may be replaced with the first symbol of the PUCCH repetition transmission. Embodiments of the present disclosure are as follows.

First Embodiment: The UE checks validity of a HARQ-ACK in the first PUCCH repetition, and transmits the valid HARQ-ACK in the first PUCCH repetition. An invalid HARQ-ACK is not transmitted in the PUCCH repetition. Subsequent PUCCH repetitions are transmitted including the same HARQ-ACK as the first PUCCH repetition. If the UE is instructed or configured to transmit the PUCCH repeatedly N times, the UE transmits the PUCCH repeatedly N times.

Second Embodiment: The UE checks validity of a deferral HARQ-ACK in the first PUCCH repetition, and transmits the valid HARQ-ACK in the first PUCCH repetition. An invalid HARQ-ACK is not transmitted in the PUCCH repetition. Subsequent PUCCH repetitions include the same HARQ-ACK as the first PUCCH repetition. If all HARQ-ACKs transmitted in subsequent PUCCH repetitions are not valid, the UE does not transmit that PUCCH repetition and subsequent PUCCH repetitions. That is, even if the UE is instructed or configured to transmit the PUCCH repeatedly N times, when all HARQ-ACKs included in the PUCCH repetitions are not valid, the UE does not transmit the PUCCH.

Third Embodiment: The UE checks validity of the HARQ-ACK in the last PUCCH repetition, and transmits the valid HARQ-ACK in the last PUCCH repetition. An invalid HARQ-ACK is not transmitted in the PUCCH repetition. The PUCCH repetition before the last PUCCH repetition includes the same HARQ-ACK as the last PUCCH repetition. If the UE is instructed or configured to transmit the PUCCH repeatedly N times, the UE transmits the PUCCH repeatedly N times.

The UE may be instructed to retransmit the SPS PDSCH by receiving the DCI. In this case, the UE may no longer need to transmit the HARQ-ACK of the SPS PDSCH by PUCCH repetition. Therefore, the HARQ-ACK may be regarded as an invalid HARQ-ACK when retransmission of the SPS PDSCH is indicated through DCI in the first to third embodiments.

Figure 46:
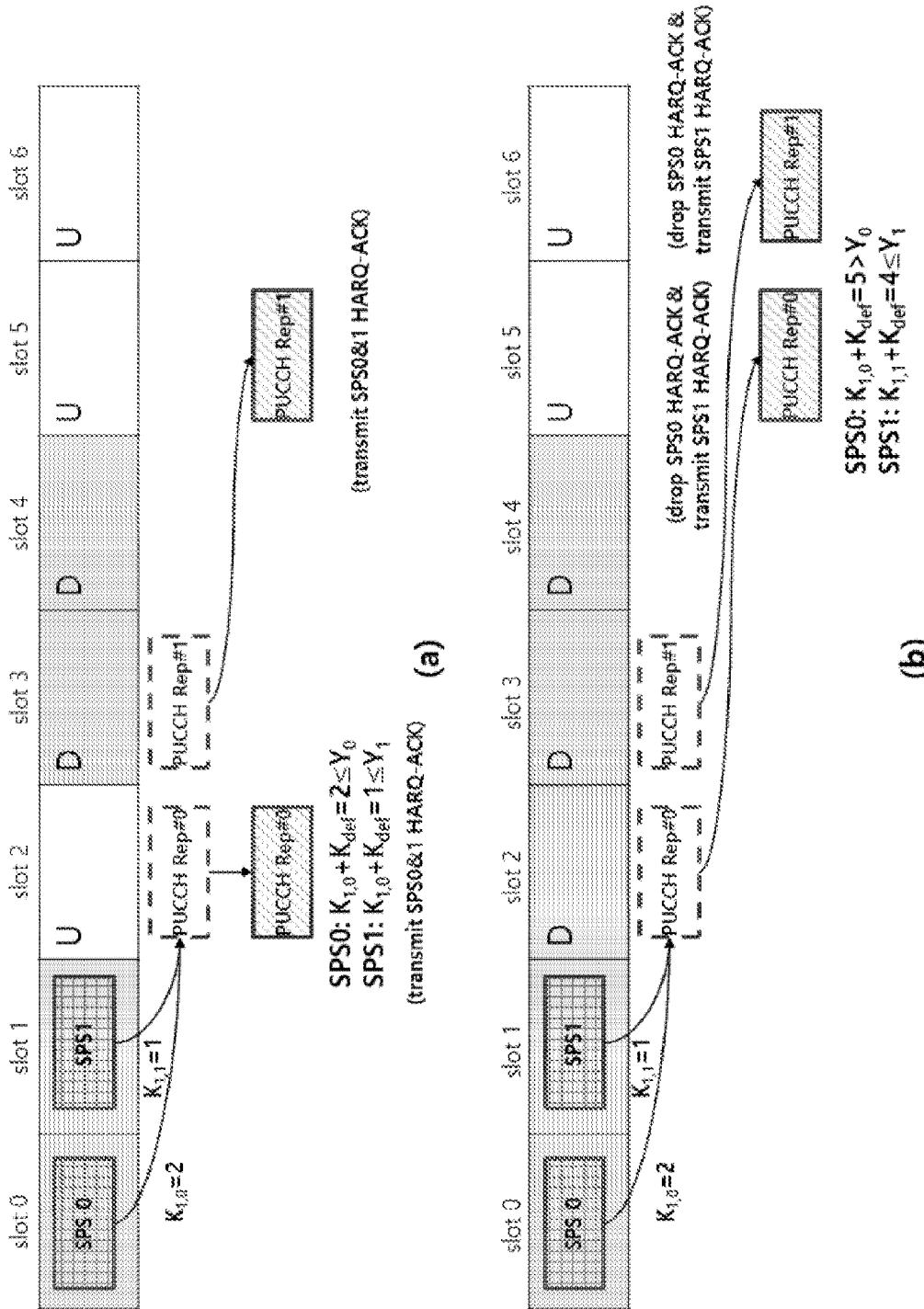
FIG. 46 illustrates a method for determining validity of a HARQ-ACK by a UE according to an example.

First Embodiment, Validity of HARQ-ACK: First Condition ($K_1+K_{def} \leq Y$) Method FIG. 46 illustrates a method for determining validity of a HARQ-ACK by a UE according to an example.

Referring to FIG. 46(a), the UE is instructed to repeatedly transmit the HARQ-ACK of SPS0 and the HARQ-ACK of SPS1 in slot 2 and slot 3. Since slot 3 is a DL slot and PUCCH Rep #1 may not be transmitted in slot 3, PUCCH Rep #1 is transmitted in slot 5. The maximum delay time in SPS PDSCH Configuration #0 is $Y_{1,0}=4$, and the maximum delay time in SPS PDSCH Configuration #1 is $Y_{1,1}=4$. Here, the validity of the HARQ-ACK follows Condition 1 ($K_1+K_{def} \leq Y$) method described above.

According to the first embodiment of the present disclosure, the UE may determine the validity of the HARQ-ACK in PUCCH Rep #0, which is the first PUCCH repetition. Here, PUCCH Rep #0 is $K_{def,0}$ because the slot indicated for transmission and the slot that is actually transmitted are the same. Since $K_{1,0}+K_{def}=2$ and it is not greater than $Y_0=4$, the HARQ-ACK of SPS0 is valid. In addition, since $K_{1,1}+K_{def}=1$ and it is not greater than $Y_1=4$, the HARQ-ACK of SPS1 is valid. Therefore, since the HARQ-ACK of SPS0 and the HARQ-ACK of SPS1 are valid in PUCCH Rep #0, the UE may include and transmit two HARQ-ACK information pieces in PUCCH Rep #0. The UE may include and transmit the two HARQ-ACK information pieces in a subsequent PUCCH repetition (PUCCH Rep #1).

The UE is instructed to repeatedly transmit the HARQ-ACK of SPS0 and the HARQ-ACK of SPS1 in slot 2 and slot 3. Since slot 2 is a DL slot and PUCCH Rep #0 may not be transmitted in slot 2, PUCCH Rep #0 is transmitted in slot 5. Since slot 3 is a DL slot and PUCCH Rep #1 may not be transmitted in slot 3, PUCCH Rep #0 is transmitted in slot 6. The maximum delay time in SPS PDSCH Configuration #0 is $Y_{1,0}=4$, and the maximum delay time in SPS PDSCH Configuration #1 is $Y_{1,1}=4$. Here, the validity of the HARQ-ACK follows Condition 1 ($K_1+K_{def} \leq Y$) method described above.

According to the first embodiment of the present disclosure, the UE may determine the validity of the HARQ-ACK in PUCCH Rep #0, which is the first PUCCH repetition. Here, PUCCH Rep #0 is $K_{def}3$ because there is a difference of three slots between the slot indicated for transmission (slot 2) and the slot that is actually transmitted (slot 5). Since $K_{1,0}+K_{def}=5$ and it is greater than $Y_0=4$, the HARQ-ACK of SPS0 is not valid. In addition, since $K_{1,1}+K_{def}=4$ and it is not greater than $Y_1=4$, the HARQ-ACK of SPS1 is valid. That is, since the HARQ-ACK of SPS1 is valid in PUCCH Rep #0, the UE may include and transmit HARQ-ACK information about SPS1 in PUCCH Rep #0. The UE may include and transmit the HARQ-ACK information about SPS1 in a subsequent PUCCH repetition (PUCCH Rep #1). Here, HARQ-ACK information about SPS0 is not transmitted (dropped).

Figure 47:
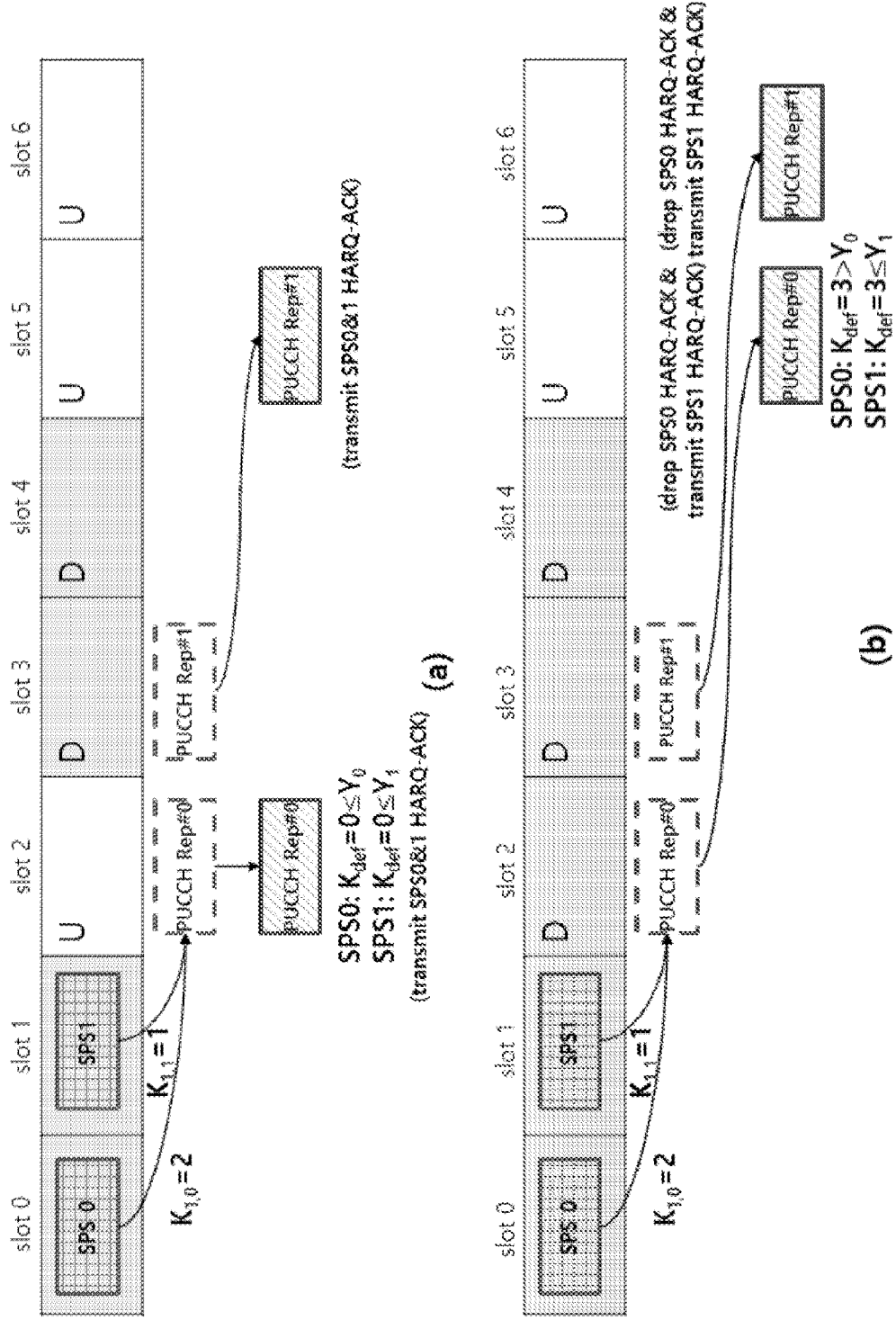
FIG. 47 illustrates a method for determining validity of a HARQ-ACK by a UE according to another example.

First Embodiment, Validity of HARQ-ACK:
Second Condition ($K_{def} \leq Y$) Method FIG. 47 illustrates a method for determining validity of a HARQ-ACK by a UE according to another example.

Referring to FIG. 47(a), the UE is instructed to repeatedly transmit the HARQ-ACK of SPS0 and the HARQ-ACK of SPS1 in slot 2 and slot 3. Since slot 3 is a DL slot and PUCCH Rep #1 may not be transmitted in slot 3, PUCCH Rep #1 is transmitted in slot 5. The maximum delay time in SPS PDSCH Configuration #0 is $Y_{1,0}=2$, and the maximum delay time in SPS PDSCH Configuration #1 is $Y_{1,1}=4$. Here, the validity of the HARQ-ACK follows Condition 2 ($K_{def} \leq Y$) method described above.

According to the first embodiment, the UE may determine the validity of the HARQ-ACK in PUCCH Rep #0, which is the first PUCCH repetition. Here, PUCCH Rep #0 is $K_{def0}$ because the slot indicated for transmission and the slot that is actually transmitted are the same. Since $K_{def}=0$ and it is not greater than $Y_0=2$, the HARQ-ACK of SPS0 is valid. In addition, since $K_{def}=0$ and it is not greater than $Y_1=4$, the HARQ-ACK of SPS1 is valid. That is, since the HARQ-ACK of SPS0 and the HARQ-ACK of SPS1 are valid in PUCCH Rep #0, the UE may include and transmit the two HARQ-ACK information pieces in PUCCH Rep #0. The UE may include and transmit the two HARQ-ACK information pieces in a subsequent PUCCH repetition (PUCCH Rep #1).

The UE is instructed to repeatedly transmit the HARQ-ACK of SPS0 and the HARQ-ACK of SPS1 in slot 2 and slot 3. Since slot 2 is a DL slot and PUCCH Rep #0 may not be transmitted in slot 2, PUCCH Rep #0 is transmitted in slot 5. Since slot 3 is a DL slot and PUCCH Rep #1 may not be transmitted in slot 3, PUCCH Rep #0 is transmitted in slot 6. The maximum delay time in SPS PDSCH Configuration #0 is $Y_{1,0}=2$, and the maximum delay time in SPS PDSCH Configuration #1 is $Y_{1,1}=4$. Here, the validity of the HARQ-ACK follows Condition 2 ($K_{def} \leq Y$) method described above.

According to the first embodiment, the UE may determine the validity of the HARQ-ACK in PUCCH Rep #0, which is the first PUCCH repetition. Here, PUCCH Rep #0 is $K_{def}3$ because slot indicated for transmission (slot 2) and the slot that is actually transmitted (slot 5) are the same. Since $K_{def}=3$ and it is greater than $Y_0=2$, the HARQ-ACK of SPS0 is not valid. In addition, since $K_{def}=3$ and it is not greater than $Y_1=4$, the HARQ-ACK of SPS1 is valid. That is, since the HARQ-ACK of SPS1 is valid in PUCCH Rep #0, the UE may include and transmit HARQ-ACK information about SPS1 in PUCCH Rep #0. The UE may include and transmit the HARQ-ACK information about SPS1 in a subsequent PUCCH repetition (PUCCH Rep #1). Here, HARQ-ACK information about SPS0 is not transmitted (dropped).

Second Embodiment, Validity of HARQ-ACK:
First Condition ($K_1+K_{def} \leq Y$) Method, $K_{def}$: Method of Option 1

Figure 48:
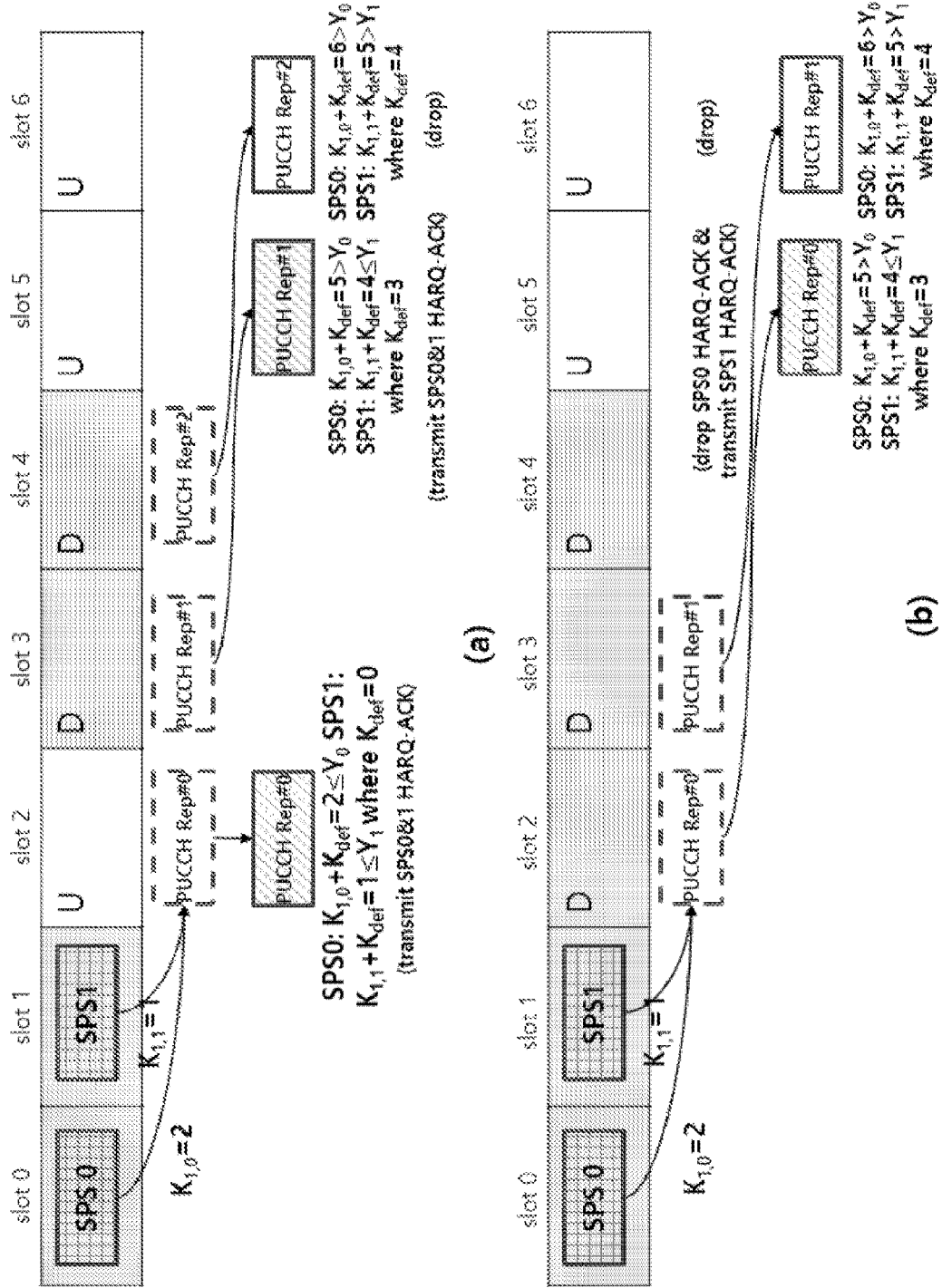
FIG. 48 illustrates a method for determining validity of a HARQ-ACK by a UE according to still another example.

FIG. 48 illustrates a method for determining validity of a HARQ-ACK by a UE according to still another example.

Referring to FIG. 48(a), the UE is instructed to repeatedly transmit the HARQ-ACK of SPS0 and the HARQ-ACK of SPS1 in slot 2, slot 3, and slot 4. Since slot 3 is a DL slot and PUCCH Rep #1 may not be transmitted in slot 3, PUCCH Rep #1 is transmitted in slot 5. Since slot 4 is a DL slot and PUCCH Rep #2 may not be transmitted in slot 4, PUCCH Rep #2 is transmitted in slot 6. The maximum delay time in SPS PDSCH Configuration #0 is $Y_{1,0}=4$, and the maximum delay time in SPS PDSCH Configuration #1 is $Y_{1,1}=4$. Here, the validity of the HARQ-ACK follows Condition 1 ($K_1+K_{def} \leq Y$) method described above. In addition, $K_{def}$ is determined according to the method of Option 1.

According to the second embodiment, the UE may determine the validity of the HARQ-ACK in PUCCH Rep #0, which is the first PUCCH repetition. Here, PUCCH Rep #0 is $K_{def0}$ because the slot indicated for transmission and the slot that is actually transmitted are the same. Since $K_{1,0}+K_{def}=2$ and it is not greater than $Y_0=4$, the HARQ-ACK of SPS0 is valid. In addition, since $K_{1,1}+K_{def}=1$ and it is not greater than $Y_1=4$, the HARQ-ACK of SPS1 is valid. That is, since the HARQ-ACK of SPS0 and the HARQ-ACK of SPS1 are valid in PUCCH Rep #0, the UE may include and transmit the two HARQ-ACK information pieces in PUCCH Rep #0. The UE may include and transmit the two HARQ-ACK information pieces when subsequent PUCCH repetitions (PUCCH Rep #1, PUCCH Rep #2) are transmitted.

A determination as to whether a subsequent PUCCH repetition is to be transmitted is as follows. In order for the UE to determine whether PUCCH Rep #1, which is the second PUCCH repetition, is transmitted, the UE may determine the validity of HARQ-ACK in PUCCH Rep #1. Here, according to Option 1, the value of $K_{def}$ is 3 because a slot in which transmission of the first PUCCH is indicated is slot 2 and a slot in which PUCCH Rep #1 is actually transmitted is slot 5. Since $K_{1,0}+K_{def}=5$ and it is greater than $Y_0=4$, the HARQ-ACK of SPS0 is not valid. In addition, since $K_{1,1}+K_{def}=4$ and it is not greater than $Y_1=4$, the HARQ-ACK of SPS1 is valid. In PUCCH Rep #1, the HARQ-ACK of SPS0 is not valid, but the HARQ-ACK of SPS1 is valid. That is, since at least one HARQ-ACK is valid, the UE transmits PUCCH Rep #1. Here, PUCCH Rep #1 includes the same UCI as PUCCH Rep #0, which is the first repetition. That is, PUCCH Rep #1 includes the invalid HARQ-ACK of SPS0 and valid HARQ-ACK of SPS1.

In order for the UE to determine whether PUCCH Rep #2, which is the third PUCCH repetition, is transmitted, the UE may determine the validity of HARQ-ACK in PUCCH Rep #1. Here, according to Option 1, the value of $K_{def}$ is 4 because a slot in which transmission of the first PUCCH is indicated is slot 2 and a slot in which PUCCH Rep #2 is actually transmitted is slot 6. Since $K_{1,0}+K_{def}=6$ and it is greater than $Y_0=4$, the HARQ-ACK of SPS0 is not valid. In addition, since $K_{1,1}+K_{def}=5$ and it is greater than $Y_1=4$, the HARQ-ACK of SPS1 is not valid. Therefore, in PUCCH Rep #2, the HARQ-ACK of SPS0 and the HARQ-ACK of SPS1 are not valid. That is, since all HARQ-ACKs are not valid, the UE does not transmit PUCCH Rep #2 (drop).

The UE is instructed to repeatedly transmit the HARQ-ACK of SPS0 and the HARQ-ACK of SPS1 in slot 2 and slot 3. Since slot 2 is a DL slot and PUCCH Rep #0 may not be transmitted in slot 2, PUCCH Rep #0 is transmitted in slot 5. Since slot 3 is a DL slot and PUCCH Rep #1 may not be transmitted in slot 3, PUCCH Rep #1 is transmitted in slot 6. The maximum delay time in SPS PDSCH Configuration #0 is $Y_{1,0}=4$, and the maximum delay time in SPS PDSCH Configuration #1 is $Y_{1,1}=4$. Here, the validity of the HARQ-ACK follows Condition 1 ($K_1+K_{def} \leq Y$) method described above. In addition, $K_{def}$ is determined according to the method of Option 1.

According to the second embodiment, the UE may determine the validity of the HARQ-ACK in PUCCH Rep #0, which is the first PUCCH repetition. Here, according to Option 1, a slot (slot 2) in which transmission of the first PUCCH is indicated and a slot (slot 6) in which PUCCH Rep #2 is actually transmitted are $K_{def}3$. Since $K_{1,0}+K_{def}=5$ and it is greater than $Y_0=4$, the HARQ-ACK of SPS0 is not valid. In addition, since $K_{1,1}+K_{def}=1$ and it is not greater than $Y_1=4$, the HARQ-ACK of SPS1 is valid. Therefore, in PUCCH Rep #0, the HARQ-ACK of SPS0 is not valid, and the HARQ-ACK of SPS1 is valid. The UE may include and transmit valid SPS HARQ-ACK information in PUCCH Rep #0. When a subsequent PUCCH repetition (PUCCH Rep #1) is transmitted, the UE may include and transmit the HARQ-ACK information about SPS1. However, the UE does not transmit the HARQ-ACK information about SPS0 (drop).

A determination as to whether a subsequent PUCCH repetition is to be transmitted is as follows. In order for the UE to determine whether PUCCH Rep #1, which is the second PUCCH repetition, is transmitted, the UE may determine the validity of HARQ-ACK in PUCCH Rep #1. Here, according to Option 1, the value of $K_{def}$ is 4 because a slot in which transmission of the first PUCCH is indicated is slot 2 and a slot in which PUCCH Rep #1 is actually transmitted is slot 6. Since $K_{1,1}+K_{def}=5$ and it is greater than $Y_1=4$, the HARQ-ACK of SPS1 is not valid. Therefore, since all HARQ-ACKs are not valid, PUCCH Rep #1 is not transmitted (dropped). For reference, since the HARQ-ACK of SPS0 is dropped in the first repetition PUCCH transmission, there is no need to check validity of the HARQ-ACK of SPS0.

Second Embodiment, Validity of HARQ-ACK:
First Condition ($K_1+K_{def} \leq Y$) Method, $K_{def}$: Method of Option 2

Figure 49:
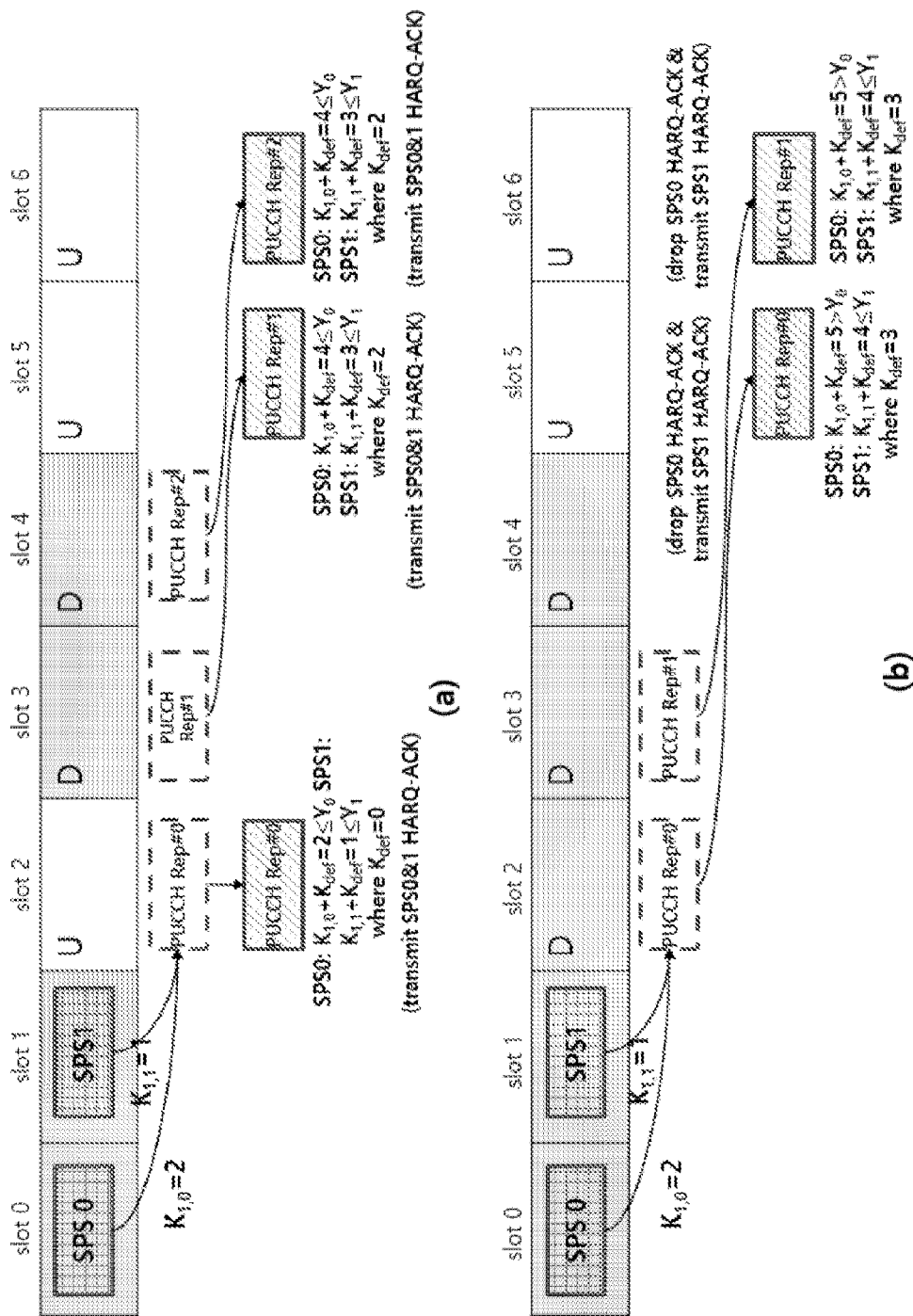
FIG. 49 illustrates a method for determining validity of a HARQ-ACK by a UE according to an example.

FIG. 49 illustrates a method for determining validity of a HARQ-ACK by a UE according to an example.

Referring to FIG. 49(a), the UE is instructed to repeatedly transmit the HARQ-ACK of SPS0 and the HARQ-ACK of SPS1 in slot 2, slot 3, and slot 4. Since slot 3 is a DL slot and PUCCH Rep #1 may not be transmitted in slot 3, PUCCH Rep #1 is transmitted in slot 5. Since slot 4 is a DL slot and PUCCH Rep #2 may not be transmitted in slot 4, PUCCH Rep #2 is transmitted in slot 6. The maximum delay time in SPS PDSCH Configuration #0 is $Y_{1,0}=4$, and the maximum delay time in SPS PDSCH Configuration #1 is $Y_{1,1}=4$. Here, the validity of the HARQ-ACK follows Condition 1 ($K_1+K_{def} \leq Y$) method described above. In addition, $K_{def}$ is determined according to the method of Option 2.

According to the second embodiment, the UE may determine the validity of the HARQ-ACK in PUCCH Rep #0, which is the first PUCCH repetition. Here, according to Option 2, $K_{def}$ is 0 because a slot (slot 2) indicated for transmission of PUCCH Rep #0 and a slot (slot 2) in which PUCCH Rep #0 is actually transmitted are the same. Since $K_{1,0}+K_{def}=2$ and it is not greater than $Y_0=4$, the HARQ-ACK of SPS0 is valid. In addition, since $K_{1,1}+K_{def}=1$ and it is not greater than $Y_1=4$, the HARQ-ACK of SPS1 is valid. That is, since the HARQ-ACK of SPS0 and the HARQ-ACK of SPS1 are valid in PUCCH Rep #0, the UE may include and transmit the two HARQ-ACK information pieces in PUCCH Rep #0. The UE may include and transmit the two HARQ-ACK information pieces when subsequent PUCCH repetitions (PUCCH Rep #1, PUCCH Rep #2) are transmitted.

A determination as to whether a subsequent PUCCH repetition is to be transmitted is as follows. In order for the UE to determine whether PUCCH Rep #1, which is the second PUCCH repetition, is transmitted, the UE may determine the validity of HARQ-ACK in PUCCH Rep #1. Here, according to Option 2, the value of $K_{def}$ is 2 because a slot in which transmission of PUCCH Rep #1 is indicated is slot 3 and a slot in which PUCCH Rep #1 is actually transmitted is slot 5. Since $K_{1,0}+K_{def}=4$ and it is greater than $Y_0=4$, the HARQ-ACK of SPS0 is not valid. In addition, since $K_{1,1}+K_{def}=3$ and it is not greater than $Y_1=4$, the HARQ-ACK of SPS1 is valid. Therefore, in PUCCH Rep #1, the HARQ-ACK of SPS0 is not valid, but the HARQ-ACK of SPS1 is valid. That is, since at least one HARQ-ACK is valid, the UE transmits PUCCH Rep #1. Here, PUCCH Rep #1 includes the same UCI as PUCCH Rep #0, which is the first repetition. That is, PUCCH Rep #1 includes the invalid HARQ-ACK of SPS0 and valid HARQ-ACK of SPS1.

In order for the UE to determine whether PUCCH Rep #2, which is the third PUCCH repetition, is transmitted, the UE may determine the validity of HARQ-ACK in PUCCH Rep #2. Here, according to Option 2, the value of $K_{def}$ is 2 because a slot in which transmission of PUCCH Rep #2 is indicated is slot 4 and a slot in which PUCCH Rep #2 actually transmitted is slot 6. Since $K_{1,0}+K_{def}=4$ and it is greater than $Y_0=4$, the HARQ-ACK of SPS0 is not valid. In addition, since $K_{1,1}+K_{def}=3$ and it is not greater than $Y_1=4$, the HARQ-ACK of SPS1 is valid. Therefore, in PUCCH Rep #2, the HARQ-ACK of SPS0 is not valid, but the HARQ-ACK of SPS1 is valid. That is, since at least one HARQ-ACK is valid, the UE transmits PUCCH Rep #2. Here, PUCCH Rep #2 includes the same UCI as PUCCH Rep #0, which is the first repetition. That is, PUCCH Rep #2 includes the invalid HARQ-ACK of SPS0 and valid HARQ-ACK of SPS1.

Referring to FIG. 49(b), the UE is instructed to repeatedly transmit the HARQ-ACK of SPS0 and the HARQ-ACK of SPS1 in slot 2 and slot 3. Since slot 2 is a DL slot and PUCCH Rep #0 may not be transmitted in slot 2, PUCCH Rep #0 is transmitted in slot 5. Since slot 3 is a DL slot and PUCCH Rep #1 may not be transmitted in slot 3, PUCCH Rep #1 is transmitted in slot 6. The maximum delay time in SPS PDSCH Configuration #0 is $Y_{1,0}=4$, and the maximum delay time in SPS PDSCH Configuration #1 is $Y_{1,1}=4$. Here, the validity of the HARQ-ACK follows Condition 1 ($K_1+K_{def} \leq Y$) method described above. In addition, $K_{def}$ is determined according to the method of Option 2.

According to the second embodiment, the UE may determine the validity of the HARQ-ACK in PUCCH Rep #0, which is the first PUCCH repetition. Here, according to Option 2, a slot (slot 2) in which PUCCH Rep #0 is indicated and a slot (slot 5) in which PUCCH Rep #0 is actually transmitted are $K_{def}$3. Since $K_{1,0}+K_{def}$=5 and it is greater than $Y_0$=4, the HARQ-ACK of SPS0 is not valid. In addition, since $K_{1,1}+K_{def}$=4 and it is not greater than $Y_1$=4, the HARQ-ACK of SPS1 is valid.

Therefore, in PUCCH Rep #0, the HARQ-ACK of SPS0 is not valid, and the HARQ-ACK of SPS1 is valid. The UE may include and transmit HARQ-ACK information about valid SPS1 in PUCCH Rep #0. When a subsequent PUCCH repetition (PUCCH Rep #1) is transmitted, the UE may include and transmit the HARQ-ACK information about SPS1. However, the UE does not transmit the HARQ-ACK information about SPS0 (drop).

A determination as to whether a subsequent PUCCH repetition is to be transmitted is as follows. In order for the UE to determine whether PUCCH Rep #1, which is the second PUCCH repetition, is transmitted, the UE may determine the validity of HARQ-ACK in PUCCH Rep #1. Here, according to Option 2, the value of $K_{def}$ is 3 because a slot in which transmission of PUCCH Rep #1 is indicated is slot 3 and a slot in which PUCCH Rep #1 is actually transmitted is slot 6. Since $K_{1,1}+K_{def}$=4 and it is not greater than $Y_1$=4, the HARQ-ACK of SPS1 is valid. That is, since at least one HARQ-ACK is valid, the UE transmits PUCCH Rep #1. Here, PUCCH Rep #1 includes the same UCI as PUCCH Rep #0, which is the first repetition. That is, PUCCH Rep #1 includes the HARQ-ACK of SPS1.

Second Embodiment, Validity of HARQ-ACK:
Second Condition ($K_{def}$≤Y) Method, $K_{def}$: Method of Option 1

Figure 50:
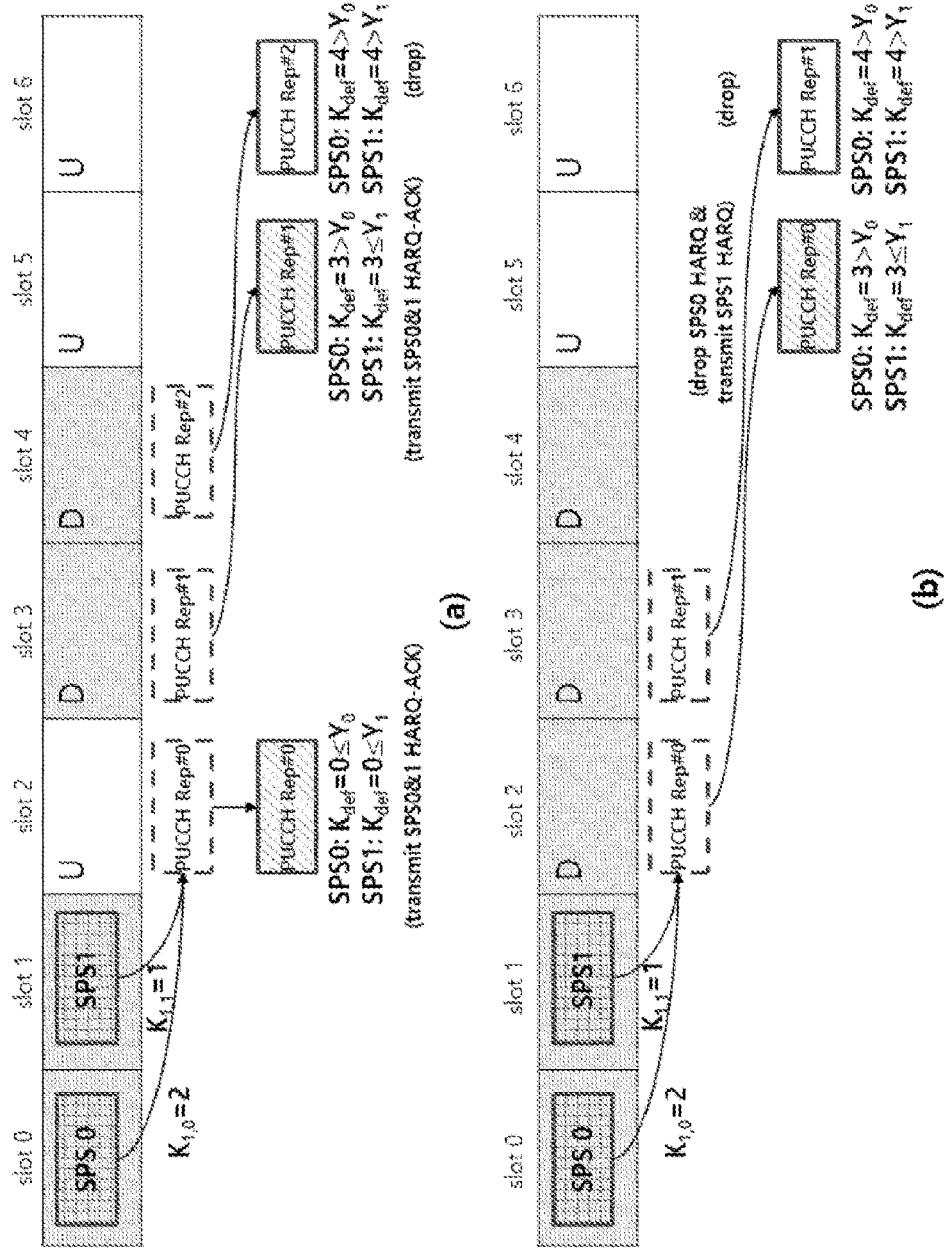
FIG. 50 illustrates a method for determining validity of a HARQ-ACK by a UE according to another example.

FIG. 50 illustrates a method for determining validity of a HARQ-ACK by a UE according to another example.

Referring to FIG. 50(*a*), the UE is instructed to repeatedly transmit the HARQ-ACK of SPS0 and the HARQ-ACK of SPS1 in slot 2, slot 3, and slot 4. Since slot 3 is a DL slot and PUCCH Rep #1 may not be transmitted in slot 3, PUCCH Rep #1 is transmitted in slot 5. Since slot 4 is a DL slot and PUCCH Rep #2 may not be transmitted in slot 4, PUCCH Rep #2 is transmitted in slot 6. The maximum delay time in SPS PDSCH Configuration #0 is $Y_{1,0}$=2, and the maximum delay time in SPS PDSCH Configuration #1 is $Y_{1,1}$=3. Here, the validity of the HARQ-ACK follows Condition 2 ($K_{def}$≤Y) method described above. In addition, $K_{def}$ is determined according to the method of Option 1.

According to the second embodiment, the UE may determine the validity of the HARQ-ACK in PUCCH Rep #0, which is the first PUCCH repetition. Here, according to Option 1, the value of $K_{def}$ is 0 because a slot (slot 2) in which transmission of the first PUCCH is indicated and a slot (slot 2) in which PUCCH Rep #0 is actually transmitted are the same. Since $K_{def}$=0 and it is not greater than $Y_0$=2, the HARQ-ACK of SPS0 is valid. In addition, since $K_{def}$=2 and it is not greater than $Y_1$=3, the HARQ-ACK of SPS1 is valid. That is, since the HARQ-ACK of SPS0 and the HARQ-ACK of SPS1 are valid in PUCCH Rep #0, the UE may include and transmit the two HARQ-ACK information pieces in PUCCH Rep #0. The UE may include and transmit the two HARQ-ACK information pieces when subsequent PUCCH repetitions (PUCCH Rep #1, PUCCH Rep #2) are transmitted.

A determination as to whether a subsequent PUCCH repetition is to be transmitted is as follows. In order for the UE to determine whether PUCCH Rep #1, which is the second PUCCH repetition, is transmitted, the UE may determine the validity of HARQ-ACK in PUCCH Rep #1. Here, according to Option 1, the value of $K_{def}$ is 3 because a slot in which transmission of the first PUCCH is indicated is slot 2 and a slot in which PUCCH Rep #1 is actually transmitted is slot 5. Since $K_{def}$=3 and it is greater than $Y_0$=2, the HARQ-ACK of SPS0 is not valid. In addition, since $K_{def}$=3 and it is not greater than $Y_1$=3, the HARQ-ACK of SPS1 is valid. Therefore, in PUCCH Rep #1, the HARQ-ACK of SPS0 is not valid, but the HARQ-ACK of SPS1 is valid. That is, since at least one HARQ-ACK is valid, the UE transmits PUCCH Rep #1. Here, PUCCH Rep #1 includes the same UCI as PUCCH Rep #0, which is the first repetition. That is, PUCCH Rep #1 includes the invalid HARQ-ACK of SPS0 and valid HARQ-ACK of SPS1.

In order for the UE to determine whether PUCCH Rep #2, which is the third PUCCH repetition, is transmitted, the UE may determine the validity of HARQ-ACK in PUCCH Rep #2. Here, according to Option 1, the value of $K_{def}$ is 4 because a slot in which transmission of the first PUCCH is indicated is slot 2 and a slot in which PUCCH Rep #2 is actually transmitted is slot 6. Since $K_{def}$=4 and it is greater than $Y_0$=2, the HARQ-ACK of SPS0 is not valid. In addition, since $K_{def}$=4 and it is greater than $Y_1$=3, the HARQ-ACK of SPS1 is not valid. That is, since HARQ-ACKs of all SPSs are not valid in PUCCH Rep #2, the UE does not transmit PUCCH Rep #2 (drop).

Referring to FIG. 40(*b*), the UE is instructed to repeatedly transmit the HARQ-ACK of SPS0 and the HARQ-ACK of SPS1 in slot 2 and slot 3. Since slot 2 is a DL slot and PUCCH Rep #0 may not be transmitted in slot 2, PUCCH Rep #0 is transmitted in slot 5. Since slot 3 is a DL slot and PUCCH Rep #1 may not be transmitted in slot 3, PUCCH Rep #1 is transmitted in slot 6. The maximum delay time in SPS PDSCH Configuration #0 is $Y_{1,0}$=2, and the maximum delay time in SPS PDSCH Configuration #1 is $Y_{1,1}$=3. Here, the validity of the HARQ-ACK follows Condition 2 ($K_{def}$≤Y) method described above. In addition, $K_{def}$ is determined according to the method of Option 1.

According to the second embodiment, the UE may determine the validity of the HARQ-ACK in PUCCH Rep #0, which is the first PUCCH repetition. Here, according to Option 1, a slot (slot 2) in which transmission of the first PUCCH is indicated and a slot (slot 6) in which PUCCH Rep #2 is actually transmitted are $K_{def}$3. Since $K_{def}$=3 and it is greater than $Y_0$=2, the HARQ-ACK of SPS0 is not valid. In addition, since $K_{def}$=3 and it is not greater than $Y_1$=3, the HARQ-ACK of SPS1 is valid.

Therefore, in PUCCH Rep #0, the HARQ-ACK of SPS0 is not valid, and the HARQ-ACK of SPS1 is valid. The UE may include and transmit HARQ-ACK information about valid SPS1 in PUCCH Rep #0. When a subsequent PUCCH repetition (PUCCH Rep #1) is transmitted, the UE may include and transmit the HARQ-ACK information about SPS1. However, the UE does not transmit the HARQ-ACK information about SPS0 (drop).

A determination as to whether a subsequent PUCCH repetition is to be transmitted is as follows. In order for the UE to determine whether PUCCH Rep #1, which is the second PUCCH repetition, is transmitted, the UE may determine the validity of HARQ-ACK in PUCCH Rep #1. Here, according to Option 1, the value of $K_{def}$ is 4 because a slot in which transmission of the first PUCCH is indicated is slot 2 and a slot in which PUCCH Rep #1 is actually transmitted is slot 6. Since $K_{def}$=4 and it is greater than $Y_1$=3, the HARQ-ACK of SPS1 is not valid. Therefore, since HARQ-ACKs of all SPSs are not valid in PUCCH Rep #1, PUCCH Rep #1 is not transmitted (dropped).

Second Embodiment, Validity of HARQ-ACK: Second Condition ($K_{def} \leq Y$) Method, $K_{def}$: Method of Option 2

Figure 51:
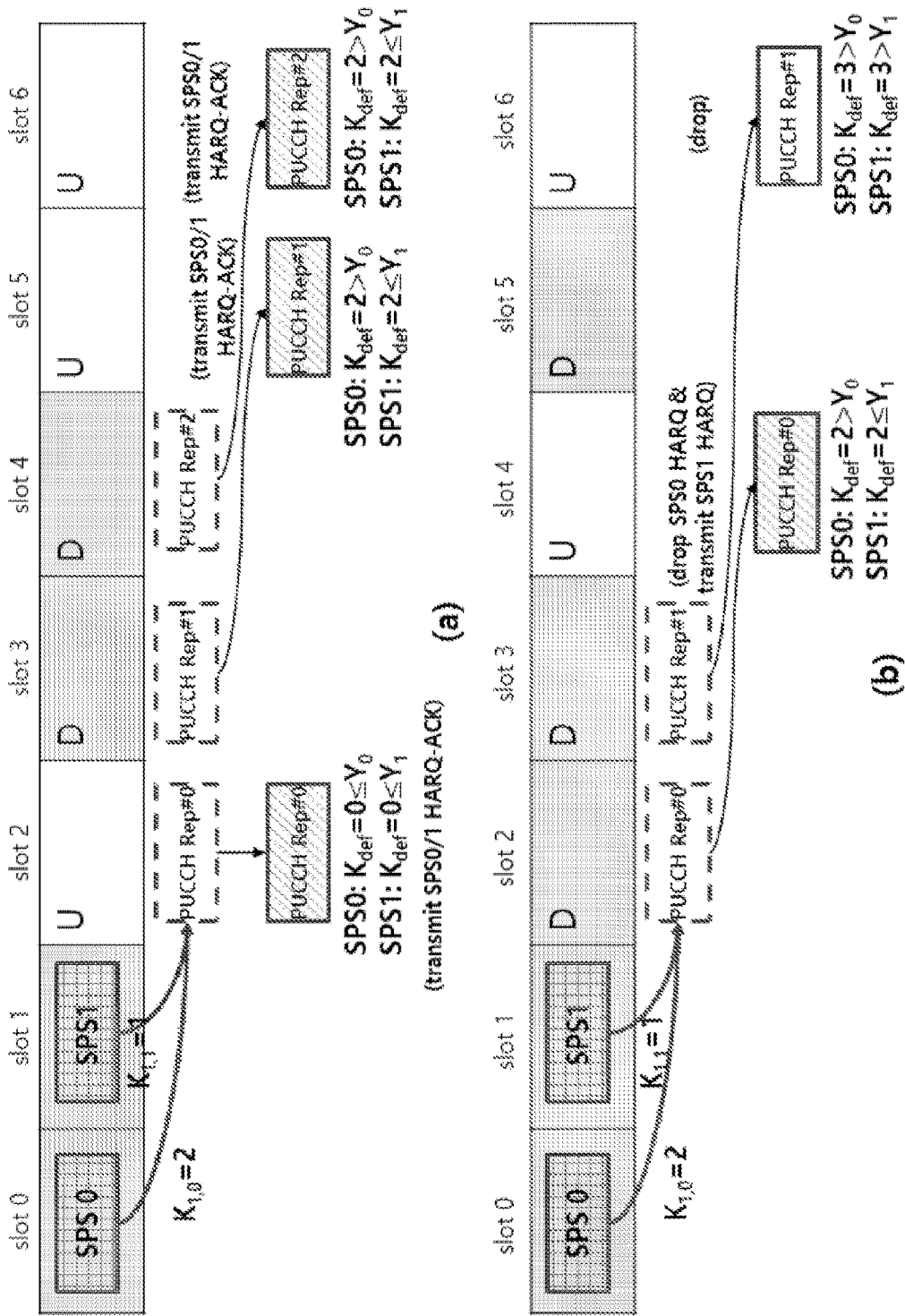
FIG. 51 illustrates a method for determining validity of a HARQ-ACK by a UE according to still another example.

FIG. 51 illustrates a method for determining validity of a HARQ-ACK by a UE according to still another example.

Referring to FIG. 51(a), the UE is instructed to repeatedly transmit the HARQ-ACK of SPS0 and the HARQ-ACK of SPS1 in slot 2, slot 3, and slot 4. Since slot 3 is a DL slot and PUCCH Rep #1 may not be transmitted in slot 3, PUCCH Rep #1 is transmitted in slot 5. Since slot 4 is a DL slot and PUCCH Rep #2 may not be transmitted in slot 4, PUCCH Rep #2 is transmitted in slot 6. The maximum delay time in SPS PDSCH Configuration #0 is $Y_{1,0}=1$, and the maximum delay time in SPS PDSCH Configuration #1 is $Y_{1,1}=2$. Here, the validity of the HARQ-ACK follows Condition 2 ($K_{def} \leq Y$) method described above. In addition, $K_{def}$ is determined according to the method of Option 2.

According to the second embodiment, the UE may determine the validity of the HARQ-ACK in PUCCH Rep #0, which is the first PUCCH repetition. Here, according to Option 2, $K_{def}$ is 0 because a slot (slot 2) indicated for transmission of PUCCH Rep #0 and a slot (slot 2) in which PUCCH Rep #0 is actually transmitted are the same. Since $K_{def}=0$ and it is not greater than $Y_0=1$, the HARQ-ACK of SPS0 is valid. In addition, since $K_{def}=0$ and it is not greater than $Y_1=2$, the HARQ-ACK of SPS1 is valid. Therefore, in PUCCH Rep #0, the HARQ-ACK of SPS0 and the HARQ-ACK of SPS1 are valid. That is, since the HARQ-ACK of SPS0 and the HARQ-ACK of SPS1 are valid in PUCCH Rep #0, the UE may include and transmit the two HARQ-ACK information pieces in PUCCH Rep #0.

The UE may include and transmit the two HARQ-ACK information pieces when subsequent PUCCH repetitions (PUCCH Rep #1, PUCCH Rep #2) are transmitted. A determination as to whether a subsequent PUCCH repetition is to be transmitted is as follows. In order for the UE to determine whether PUCCH Rep #1, which is the second PUCCH repetition, is transmitted, the UE may determine the validity of HARQ-ACK in PUCCH Rep #1. Here, according to Option 2, the value of $K_{def}$ is 2 because a slot in which transmission of PUCCH Rep #1 is indicated is slot 3 and a slot in which PUCCH Rep #1 is actually transmitted is slot 5. Since $K_{def}=2$ and it is greater than $Y_0=1$, the HARQ-ACK of SPS0 is not valid. In addition, since $K_{def}=2$ and it is not greater than $Y_1=2$, the HARQ-ACK of SPS1 is valid. Therefore, in PUCCH Rep #1, the HARQ-ACK of SPS0 is not valid, but the HARQ-ACK of SPS1 is valid. That is, since at least one HARQ-ACK is valid, the UE transmits PUCCH Rep #1. Here, PUCCH Rep #1 includes the same UCI as PUCCH Rep #0, which is the first repetition. That is, PUCCH Rep #1 includes the invalid HARQ-ACK of SPS0 and valid HARQ-ACK of SPS1.

In order for the UE to determine whether PUCCH Rep #2, which is the third PUCCH repetition, is transmitted, the UE may determine the validity of HARQ-ACK in PUCCH Rep #2. Here, according to Option 2, the value of $K_{def}$ is 2 because a slot in which transmission of PUCCH Rep #2 is indicated is slot 4 and a slot in which PUCCH Rep #2 is actually transmitted is slot 6. Since $K_{def}=2$ and it is greater than $Y_0=1$, the HARQ-ACK of SPS0 is not valid. In addition, since $K_{def}=2$ and it is not greater than $Y_1=2$, the HARQ-ACK of SPS1 is valid. Therefore, in PUCCH Rep #2, the HARQ-ACK of SPS0 is not valid, but the HARQ-ACK of SPS1 is valid. That is, since at least one HARQ-ACK is valid, the UE transmits PUCCH Rep #2. Here, PUCCH Rep #2 includes the same UCI as PUCCH Rep #0, which is the first repetition. That is, PUCCH Rep #2 includes the invalid HARQ-ACK of SPS0 and valid HARQ-ACK of SPS1.

Referring to FIG. 51(b), the UE is instructed to repeatedly transmit the HARQ-ACK of SPS0 and the HARQ-ACK of SPS1 in slot 2 and slot 3. Since slot 2 is a DL slot and PUCCH Rep #0 may not be transmitted in slot 2, PUCCH Rep #0 is transmitted in slot 4. Since slot 3 is a DL slot and PUCCH Rep #1 may not be transmitted in slot 3, PUCCH Rep #1 is transmitted in slot 6. The maximum delay time in SPS PDSCH Configuration #0 is $Y_{1,0}=1$, and the maximum delay time in SPS PDSCH Configuration #1 is $Y_{1,1}=2$. Here, the validity of the HARQ-ACK follows Condition 2 ($K_{def} \leq Y$) method described above. In addition, $K_{def}$ is determined according to the method of Option 2.

According to the second embodiment, the UE may determine the validity of the HARQ-ACK in PUCCH Rep #0, which is the first PUCCH repetition. Here, according to Option 2, a slot (slot 2) in which PUCCH Rep #0 is indicated and a slot (slot 4) in which PUCCH Rep #0 is actually transmitted are $K_{def}=2$. Since $K_{def}=2$ and it is greater than $Y_0=1$, the HARQ-ACK of SPS0 is not valid. In addition, since $K_{def}=2$ and it is not greater than $Y_1=2$, the HARQ-ACK of SPS1 is valid. Therefore, in PUCCH Rep #0, the HARQ-ACK of SPS0 is not valid, and the HARQ-ACK of SPS1 is valid. The UE may include and transmit HARQ-ACK information about valid SPS1 in PUCCH Rep #0. When a subsequent PUCCH repetition (PUCCH Rep #1) is transmitted, the UE may include and transmit the HARQ-ACK information about SPS1. However, the UE does not transmit the HARQ-ACK information about SPS0 (drop).

A determination as to whether a subsequent PUCCH repetition is to be transmitted is as follows. In order for the UE to determine whether PUCCH Rep #1, which is the second PUCCH repetition, is transmitted, the UE may determine the validity of HARQ-ACK in PUCCH Rep #1. Here, according to Option 2, the value of $K_{def}$ is 3 because a slot in which transmission of PUCCH Rep #1 is indicated is slot 3 and a slot in which PUCCH Rep #1 is actually transmitted is slot 6. Since $K_{def}=3$ and it is greater than $Y_1=2$, the HARQ-ACK of SPS1 is not valid. Therefore, since HARQ-ACKs of all SPSs are not valid in PUCCH Rep #1, PUCCH Rep #1 is not transmitted (dropped).

Third Embodiment, Validity of HARQ-ACK: First Condition ($K_1+K_{def} \leq Y$) Method, $K_{def}$: Method of Option 1

Figure 52:
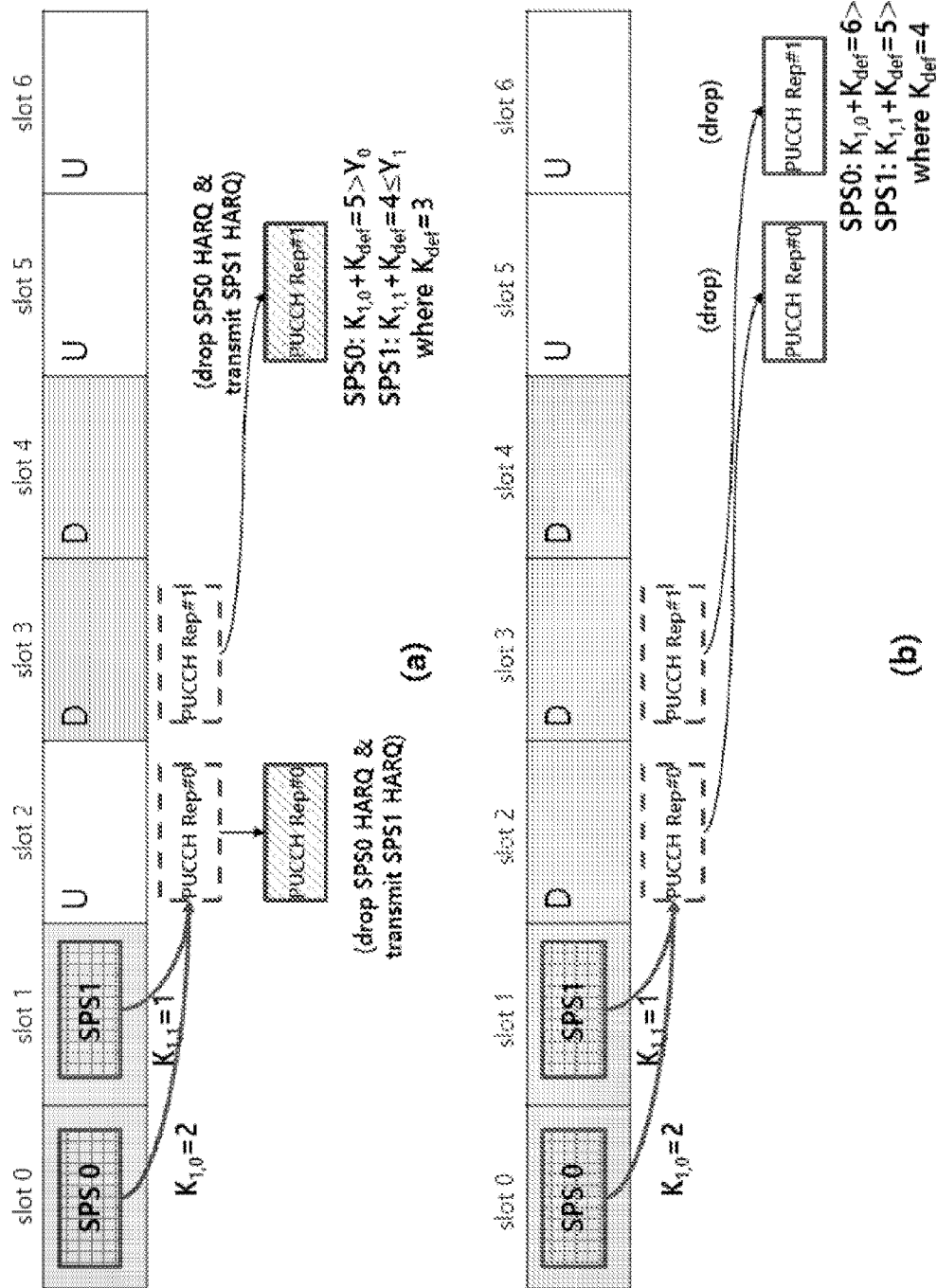
FIG. 52 illustrates a method for determining validity of a HARQ-ACK by a UE according to still another example.

FIG. 52 illustrates a method for determining validity of a HARQ-ACK by a UE according to still another example.

Referring to FIG. 52(a), the UE is instructed to repeatedly transmit the HARQ-ACK of SPS0 and the HARQ-ACK of SPS1 in slot 2 and slot 3. Since slot 3 is a DL slot and PUCCH Rep #1 may not be transmitted in slot 3, PUCCH Rep #1 is transmitted in slot 5. The maximum delay time in SPS PDSCH Configuration #0 is $Y_{1,0}=4$, and the maximum delay time in SPS PDSCH Configuration #1 is $Y_{1,1}=4$. Here, the validity of the HARQ-ACK follows Condition 1 ($K_1+K_{def} \leq Y$) method described above. In addition, $K_{def}$ is determined according to the method of Option 1.

According to the third embodiment, the UE may determine the validity of the HARQ-ACK in PUCCH Rep #1, which is the last PUCCH repetition. Here, according to Option 1, the value of $K_{def}$ is 3 because a slot in which transmission of the first PUCCH is indicated is slot 2 and a slot in which PUCCH Rep #1 is actually transmitted is slot 5. Since $K_{1,0}+K_{def}=5$ and it is greater than $Y_0=4$, the HARQ-ACK of SPS0 is not valid. In addition, since $K_{1,1}+K_{def}=4$ and it is not greater than $Y_1=4$, the HARQ-ACK of SPS1 is valid. Therefore, in the last PUCCH repetition (PUCCH Rep #1), the HARQ-ACK of SPS0 is not valid, and the HARQ-ACK of SPS1 is valid. Therefore, the HARQ-ACK of SPS1 valid in all PUCCH repetitions (PUCCH Rep #0, PUCCH Rep #1) is included. However, HARQ-ACK information about SPS0 is not transmitted (dropped).

Referring to FIG. 52(b), the UE is instructed to repeatedly transmit the HARQ-ACK of SPS0 and the HARQ-ACK of SPS1 in slot 2 and slot 3. Since slot 2 is a DL slot and PUCCH Rep #0 may not be transmitted in slot 2, PUCCH Rep #0 is transmitted in slot 5. Since slot 3 is a DL slot and PUCCH Rep #1 may not be transmitted in slot 3, PUCCH Rep #1 is transmitted in slot 6. The maximum delay time in SPS PDSCH Configuration #0 is $Y_{1,0}=4$, and the maximum delay time in SPS PDSCH Configuration #1 is $Y_{1,1}=4$. Here, the validity of the HARQ-ACK follows Condition 1 ($K_1+K_{def} \leq Y$) method described above. In addition, $K_{def}$ is determined according to the method of Option 1.

According to the third embodiment, the UE may determine the validity of the HARQ-ACK in PUCCH Rep #1, which is the last PUCCH repetition. Here, according to Option 1, the value of $K_{def}$ is 4 because a slot in which transmission of the first PUCCH is indicated is slot 2 and a slot in which PUCCH Rep #1 is actually transmitted is slot 6. Since $K_{1,0}+K_{def}=6$ and it is greater than $Y_0=4$, the HARQ-ACK of SPS0 is not valid. In addition, since $K_{1,1}+K_{def}=5$ and it is greater than $Y_1=4$, the HARQ-ACK of SPS1 is not valid. Therefore, in the last PUCCH repetition (PUCCH Rep #1), the HARQ-ACK of SPS0 and the HARQ-ACK of SPS1 are not valid. That is, since there is no valid HARQ-ACK in the last PUCCH repetition (PUCCH Rep #1), all PUCCH repetitions (PUCCH Rep #0, PUCCH Rep #1) are not transmitted (dropped).

Third Embodiment, Validity of HARQ-ACK: First Condition ($K_1+K_{def} \leq Y$) Method, $K_{def}$: Method of Option 2

Figure 53:
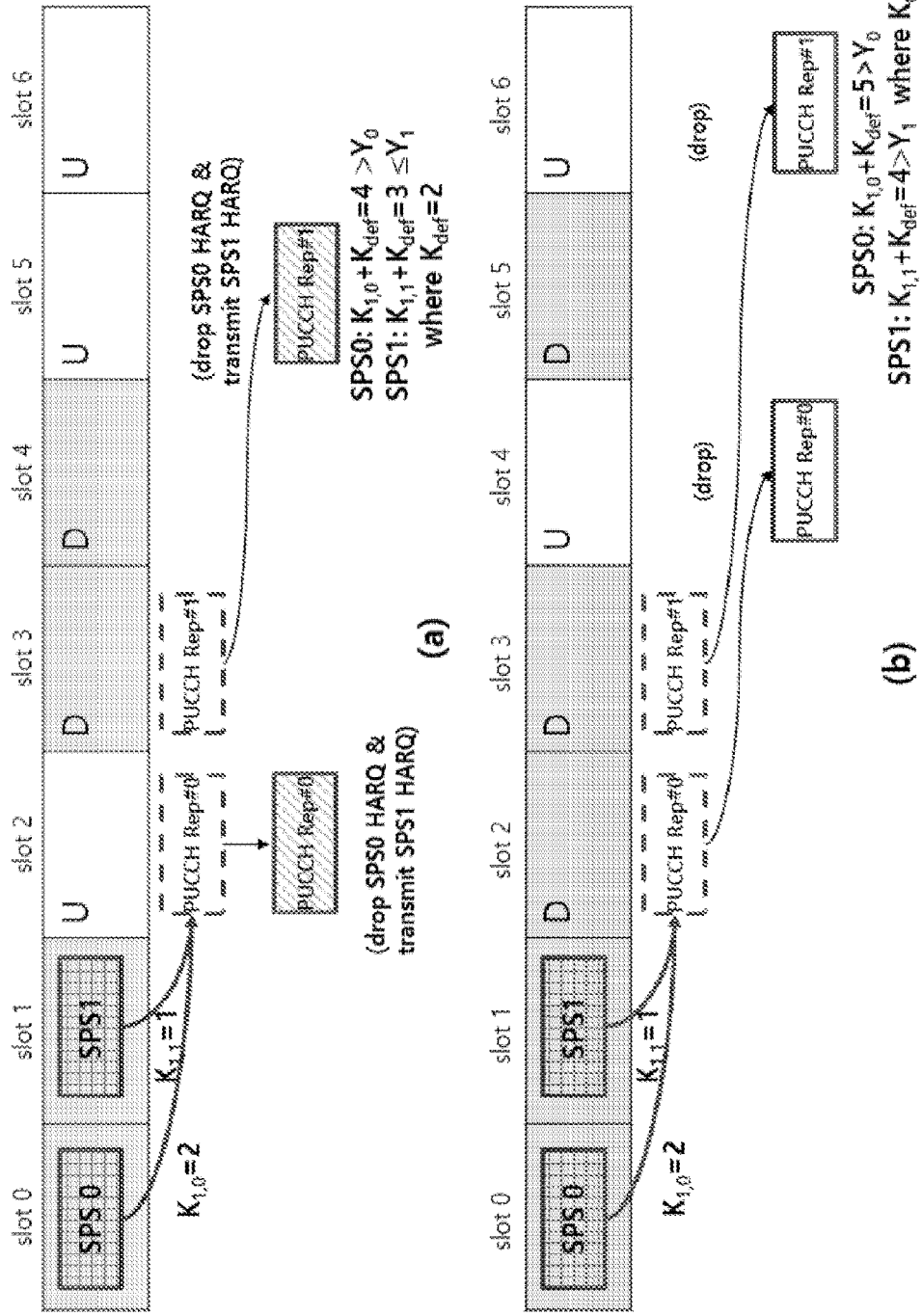
FIG. 53 illustrates a method for determining validity of a HARQ-ACK by a UE according to still another example.

FIG. 53 illustrates a method for determining validity of a HARQ-ACK by a UE according to still another example.

Referring to FIG. 53(a), the UE is instructed to repeatedly transmit the HARQ-ACK of SPS0 and the HARQ-ACK of SPS1 in slot 2 and slot 3. Since slot 3 is a DL slot and PUCCH Rep #1 may not be transmitted in slot 3, PUCCH Rep #1 is transmitted in slot 5. The maximum delay time in SPS PDSCH Configuration #0 is $Y_{1,0}=3$, and the maximum delay time in SPS PDSCH Configuration #1 is $Y_{1,1}=3$. Here, the validity of the HARQ-ACK follows Condition 1 ($K_1+K_{def} \leq Y$) method described above. In addition, $K_{def}$ is determined according to the method of Option 2.

According to the third embodiment, the UE may determine the validity of the HARQ-ACK in PUCCH Rep #1, which is the last PUCCH repetition. Here, according to Option 2, the value of $K_{def}$ is 2 because a slot in which transmission of PUCCH Rep #1 is indicated is slot 3 and a slot in which PUCCH Rep #1 is actually transmitted is slot 5. Since $K_{1,0}+K_{def}=4$ and it is greater than $Y_0=3$, the HARQ-ACK of SPS0 is not valid. In addition, since $K_{1,1}+K_{def}=3$ and it is not greater than $Y_1=3$, the HARQ-ACK of SPS1 is valid. Therefore, in the last PUCCH repetition (PUCCH Rep #1), the HARQ-ACK of SPS0 is not valid, and the HARQ-ACK of SPS1 is valid. Therefore, the UE includes the HARQ-ACK of SPS1 valid in all PUCCH repetitions (PUCCH Rep #0, PUCCH Rep #1). However, the UE does not transmit HARQ-ACK information about SPS0 (drop).

Referring to FIG. 53(b), the UE is instructed to repeatedly transmit the HARQ-ACK of SPS0 and the HARQ-ACK of SPS1 in slot 2 and slot 3. Since slot 2 is a DL slot and PUCCH Rep #0 may not be transmitted in slot 2, PUCCH Rep #0 is transmitted in slot 4. Since slot 3 is a DL slot and PUCCH Rep #1 may not be transmitted in slot 3, PUCCH Rep #1 is transmitted in slot 6. The maximum delay time in SPS PDSCH Configuration #0 is $Y_{1,0}=4$, and the maximum delay time in SPS PDSCH Configuration #1 is $Y_{1,1}=4$. Here, the validity of the HARQ-ACK follows Condition 1 ($K_1+K_{def} \leq Y$) method described above. In addition, $K_{def}$ is determined according to the method of Option 2.

According to the third embodiment, the UE may determine the validity of the HARQ-ACK in PUCCH Rep #1, which is the last PUCCH repetition. Here, according to Option 2, the value of $K_{def}$ is 3 because a slot in which transmission of PUCCH Rep #1 is indicated is slot 3 and a slot in which PUCCH Rep #1 is actually transmitted is slot 6. Since $K_{1,0}+K_{def}=5$ and it is greater than $Y_0=3$, the HARQ-ACK of SPS0 is not valid. In addition, since $K_{1,1}+K_{def}=4$ and it is greater than $Y_1=3$, the HARQ-ACK of SPS1 is not valid. Therefore, in the last PUCCH repetition (PUCCH Rep #1), the HARQ-ACK of SPS0 and the HARQ-ACK of SPS1 are not valid. Therefore, since there is no valid HARQ-ACK in the last PUCCH repetition (PUCCH Rep #1), the UE does not transmit all PUCCH repetitions (PUCCH Rep #0, PUCCH Rep #1) (drop).

Third Embodiment, Validity of HARQ-ACK: Second Condition ($K_{def} \leq Y$) Method, $K_{def}$: Method of Option 1

Figure 54:
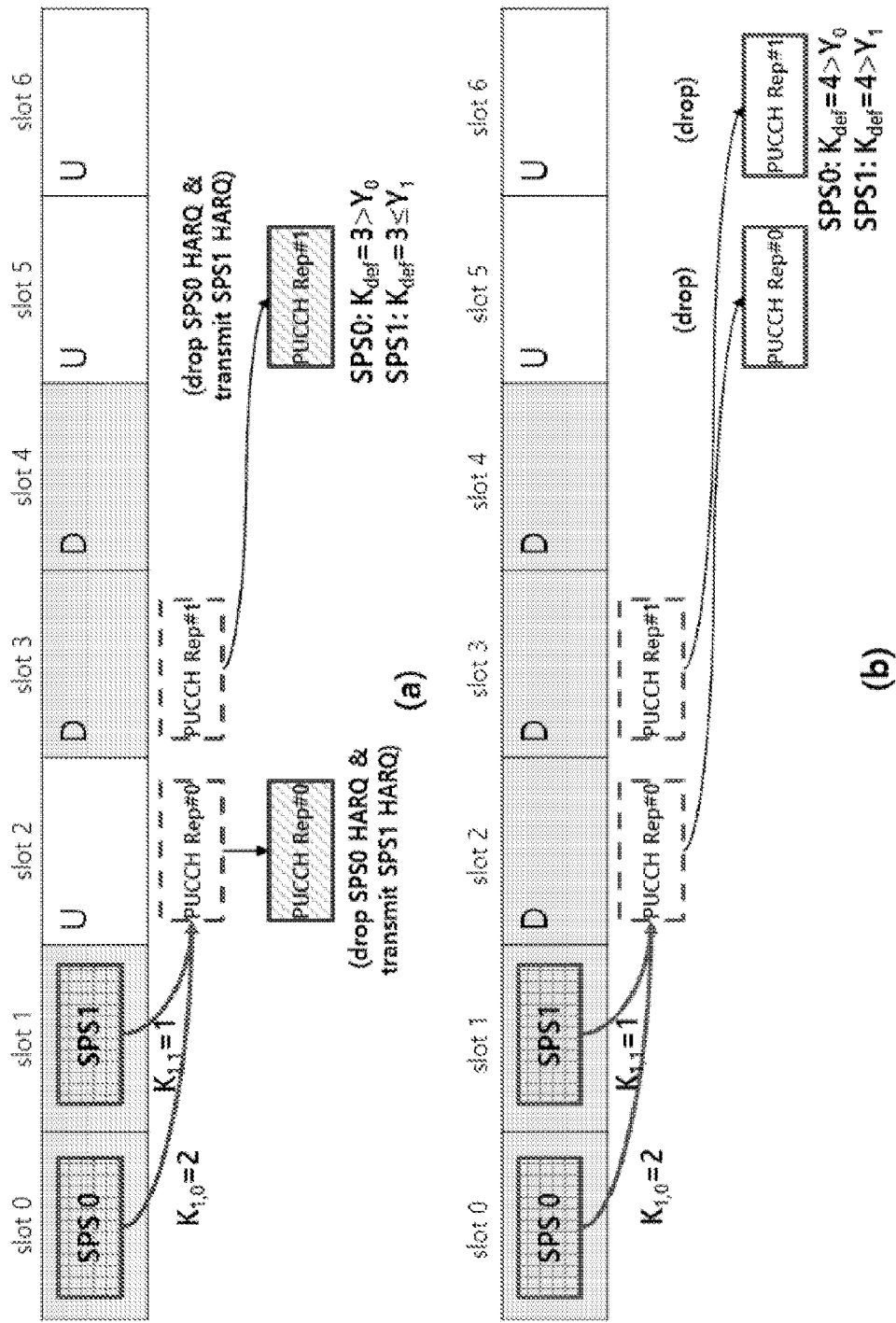
FIG. 54 illustrates a method for determining validity of a HARQ-ACK by a UE according to still another example.

FIG. 54 illustrates a method for determining validity of a HARQ-ACK by a UE according to still another example.

Referring to FIG. 54(a), the UE is instructed to repeatedly transmit the HARQ-ACK of SPS0 and the HARQ-ACK of SPS1 in slot 2 and slot 3. Since slot 3 is a DL slot and PUCCH Rep #1 may not be transmitted in slot 3, PUCCH Rep #1 is transmitted in slot 5. The maximum delay time in SPS PDSCH Configuration #0 is $Y_{1,0}=2$, and the maximum delay time in SPS PDSCH Configuration #1 is $Y_{1,1}=3$. Here, the validity of the HARQ-ACK follows Condition 2 ($K_{def} \leq Y$) method described above. In addition, $K_{def}$ is determined according to the method of Option 1.

According to the third embodiment, the UE may determine the validity of the HARQ-ACK in PUCCH Rep #1, which is the last PUCCH repetition. Here, according to Option 1, the value of $K_{def}$ is 3 because a slot in which transmission of the first PUCCH is indicated is slot 2 and a slot in which PUCCH Rep #1 is actually transmitted is slot 5. Since $K_{def}=3$ and it is greater than $Y_0=2$, the HARQ-ACK of SPS0 is not valid. In addition, since $K_{def}=3$ and it is not greater than $Y_1=3$, the HARQ-ACK of SPS1 is valid. Therefore, in the last PUCCH repetition (PUCCH Rep #1), the HARQ-ACK of SPS0 is not valid, and the HARQ-ACK of SPS1 is valid. Therefore, the UE includes the HARQ-ACK of SPS1 valid in all PUCCH repetitions (PUCCH Rep #0, PUCCH Rep #1). However, the UE does not transmit HARQ-ACK information about SPS0 (drop).

Referring to FIG. 54(b), the UE is instructed to repeatedly transmit the HARQ-ACK of SPS0 and the HARQ-ACK of SPS1 in slot 2 and slot 3. Since slot 2 is a DL slot and PUCCH Rep #0 may not be transmitted in slot 2, PUCCH Rep #0 is transmitted in slot 5. Since slot 3 is a DL slot and PUCCH Rep #1 may not be transmitted in slot 3, PUCCH Rep #1 is transmitted in slot 6. The maximum delay time in SPS PDSCH Configuration #0 is $Y_{1,0}=2$, and the maximum delay time in SPS PDSCH Configuration #1 is $Y_{1,1}=3$. Here, the validity of the HARQ-ACK follows Condition 2 ($K_{def} \leq Y$) method described above. In addition, $K_{def}$ is determined according to the method of Option 1.

According to the third embodiment, the UE may determine the validity of the HARQ-ACK in PUCCH Rep #1, which is the last PUCCH repetition. Here, according to Option 1, the value of $K_{def}$ is 4 because a slot in which transmission of the first PUCCH is indicated is slot 2 and a slot in which PUCCH Rep #1 is actually transmitted is slot 6. Since $K_{def}=4$ and it is greater than $Y_0=2$, the HARQ-ACK of SPS0 is not valid. In addition, since $K_{def}=4$ and it is greater than $Y_1=3$, the HARQ-ACK of SPS1 is not valid. Therefore, in the last PUCCH repetition (PUCCH Rep #1), the HARQ-ACK of SPS0 and the HARQ-ACK of SPS1 are not valid. That is, since there is no valid HARQ-ACK in the last PUCCH repetition (PUCCH Rep #1), the UE does not transmit all PUCCH repetitions (PUCCH Rep #0, PUCCH Rep #1) (drop).

Third Embodiment, Validity of HARQ-ACK:
Second Condition ($K_{def} \leq Y$) Method, $K_{def}$: Method of Option 2

Figure 55:
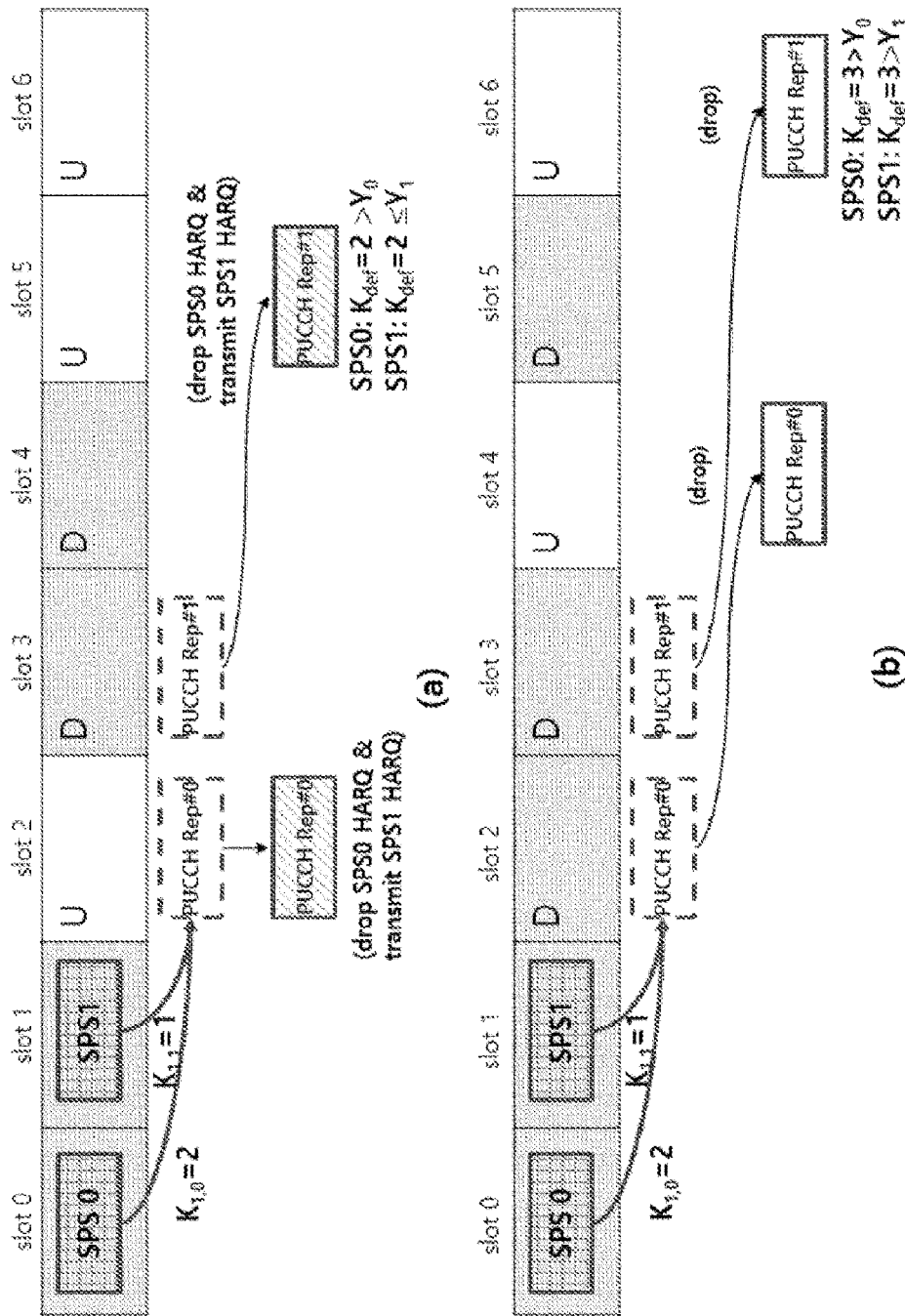
FIG. 55 illustrates a method for determining validity of a HARQ-ACK by a UE according to still another example.

FIG. 55 illustrates a method for determining validity of a HARQ-ACK by a UE according to still another example.

Referring to FIG. 55(a), the UE is instructed to repeatedly transmit the HARQ-ACK of SPS0 and the HARQ-ACK of SPS1 in slot 2 and slot 3. Since slot 3 is a DL slot and PUCCH Rep #1 may not be transmitted in slot 3, PUCCH Rep #1 is transmitted in slot 5. The maximum delay time in SPS PDSCH Configuration #0 is $Y_{1,0}=1$, and the maximum delay time in SPS PDSCH Configuration #1 is $Y_{1,1}=2$. Here, the validity of the HARQ-ACK follows Condition 2 ($K_{def} \leq Y$) method described above. In addition, $K_{def}$ is determined according to the method of Option 2.

According to the third embodiment, the UE may determine the validity of the HARQ-ACK in PUCCH Rep #1, which is the last PUCCH repetition. Here, according to Option 2, the value of $K_{def}$ is 2 because a slot in which transmission of PUCCH Rep #1 is indicated is slot 3 and a slot in which PUCCH Rep #1 is actually transmitted is slot 5. Since $K_{def}=2$ and it is greater than $Y_0=1$, the HARQ-ACK of SPS0 is not valid. In addition, since $K_{def}=2$ and it is not greater than $Y_1=2$, the HARQ-ACK of SPS1 is valid. Therefore, in the last PUCCH repetition (PUCCH Rep #1), the HARQ-ACK of SPS0 is not valid, and the HARQ-ACK of SPS1 is valid. That is, the UE includes the HARQ-ACK of SPS1 valid in all PUCCH repetitions (PUCCH Rep #0, PUCCH Rep #1). However, the UE does not transmit HARQ-ACK information about SPS0 (drop).

Referring to FIG. 55(b), the UE is instructed to repeatedly transmit the HARQ-ACK of SPS0 and the HARQ-ACK of SPS1 in slot 2 and slot 3. Since slot 2 is a DL slot and PUCCH Rep #0 may not be transmitted in slot 2, PUCCH Rep #0 is transmitted in slot 4. Since slot 3 is a DL slot and PUCCH Rep #1 may not be transmitted in slot 3, PUCCH Rep #1 is transmitted in slot 6.

The maximum delay time in SPS PDSCH Configuration #0 is $Y_{1,0}=1$, and the maximum delay time in SPS PDSCH Configuration #1 is $Y_{1,1}=2$. Here, the validity of the HARQ-ACK follows Condition 2 ($K_{def} \leq Y$) method described above. In addition, $K_{def}$ is determined according to the method of Option 2.

According to the third embodiment, the UE may determine the validity of the HARQ-ACK in PUCCH Rep #1, which is the last PUCCH repetition. Here, according to Option 2, the value of $K_{def}$ is 3 because a slot in which transmission of PUCCH Rep #1 is indicated is slot 3 and a slot in which PUCCH Rep #1 is actually transmitted is slot 6. Since $K_{def}=3$ and it is greater than $Y_1=1$, the HARQ-ACK of SPS0 is not valid. In addition, since $K_{def}=3$ and it is greater than $Y_1=2$, the HARQ-ACK of SPS1 is not valid. Therefore, in the last PUCCH repetition (PUCCH Rep #1), the HARQ-ACK of SPS0 and the HARQ-ACK of SPS1 are not valid. That is, since there is no valid HARQ-ACK in the last PUCCH repetition (PUCCH Rep #1), the UE does not transmit all PUCCH repetitions (PUCCH Rep #0, PUCCH Rep #1) (drop).

In the above examples for describing the first to third embodiments, SPS0 of SPS PDSCH Configuration #0 and SPS1 of SPS PDSCH Configuration #1 are indicated to transmit HARQ-ACKs in the same slot. However, HARQ-ACKs of SPS0 and SPS1 may be indicated to be transmitted in different slots. In this case, when the PUCCH on which the HARQ-ACK is transmitted is repeatedly transmitted in a plurality of slots, the PUCCH may overlap in some slots. In this case, the UE needs a PUCCH transmission method in some slots.

Figure 56:
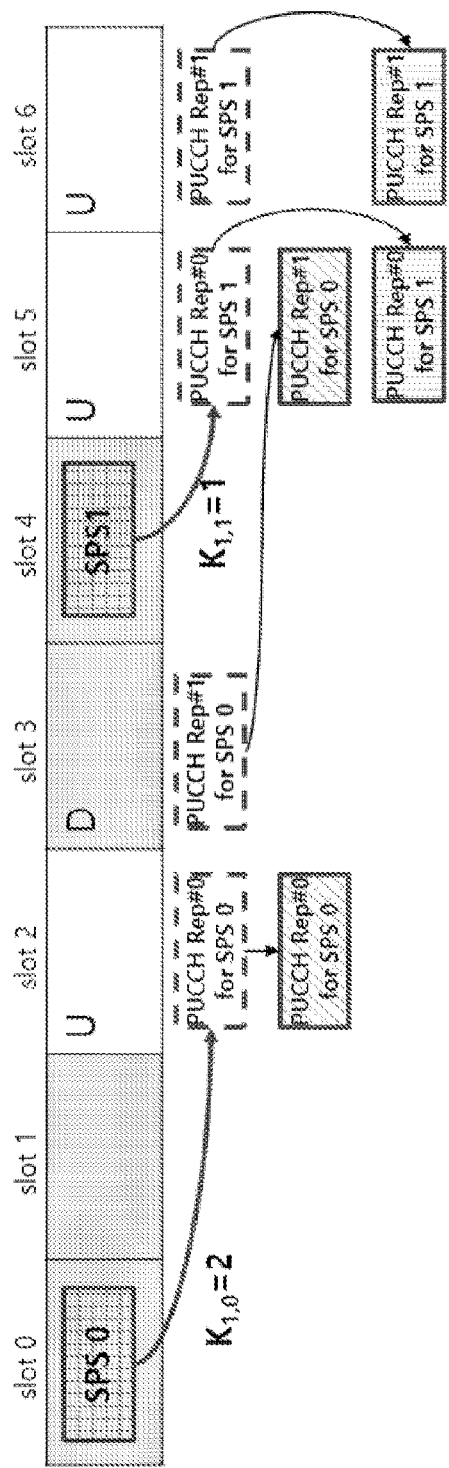
FIG. 56 illustrates a method for performing PUCCH repetition by a UE according to an example.

FIG. 56 illustrates a method for performing PUCCH repetition by a UE according to an example.

Referring to FIG. 56, the UE is configured to receive SPS0 of SPS PDSCH Configuration #0 in slot 0, and is configured to receive SPS1 of SPS PDSCH Configuration #1 in slot 4. In SPS PDSCH Configuration #0, K1,0=2 is set, and in SPS PDSCH Configuration #1, K1,1=1 is set. Therefore, the UE has to transmit the HARQ-ACK of SPS0 of slot 0 in slot 2, and has to transmit the HARQ-ACK of SPS1 of slot 4 in slot 5. When the HARQ-ACK is transmitted in slot 2, the PUCCH may be repeatedly transmitted in two slots. Here, the slots indicated with transmission are slot 2 and slot 3.

Since slot 3 is a DL slot, the PUCCH may not be transmitted, and thus the PUCCH is transmitted in slot 5. Therefore, the PUCCH for transmitting the HARQ-ACK of SPS0 is transmitted in slot 2 (PUCCH Rep #0 for SPS0) and slot 5 (PUCCH Rep #1 for SPS0). When the HARQ-ACK is transmitted in slot 5, the PUCCH may be repeatedly transmitted in two slots. Here, the slots indicated with transmission are slot 5 and slot 6. Since slot 5 and slot 6 are UL slots, the PUCCH for transmitting the HARQ-ACK of SPS1 is transmitted in slot 5 (PUCCH Rep #0 for SPS1) and slot 6 (PUCCH Rep #1 for SPS1).

The UE may overlap the second repetition of the PUCCH transmitting the HARQ-ACK of SPS0 and the first repetition of the PUCCH transmitting the HARQ-ACK of SPS1 in slot 5. Since the UE may not simultaneously transmit two PUCCHs in one slot, the overlapping problem has to be solved. Specific methods therefor are disclosed.

As a first method, the UE transmits a repetition of a earlier started PUCCH, and may not transmit a later started PUCCH (drop). This does not distinguish whether the earlier started PUCCH is transmitted in a slot indicated transmission or is a delayed PUCCH.

As a second method, the UE transmits a repetition of the later started PUCCH, and may not transmit the earlier started PUCCH (drop). This may be performed until transmission of the earlier started PUCCH collides with another repetition of the PUCCH.

As a third method, the UE may preferentially transmit the repetition of the PUCCH of the slot indicated for transmission. That is, when the repetition of the PUCCH overlaps with the repetition of the PUCCH delayed without transmission indication in the slot indicated for transmission, the UE may transmit the repetition of the PUCCH in the slot indicated for transmission, and may not transmit the repetition of the delayed PUCCH (drop). If both of the overlapping PUCCHs in one slot are repetitions of the PUCCH for which transmission is indicated (that is, the PUCCH that has not been delayed), the PUCCH that starts earlier among the two PUCCHs may be transmitted and the PUCCH that starts later may not be transmitted. If both of the overlapping PUCCHs in one slot are not repetitions of the PUCCH for which transmission is indicated (that is, the PUCCH that has been delayed), the PUCCH that starts earlier among the two PUCCHs may be transmitted and the PUCCH that starts later may not be transmitted.

As a fourth method, the UE may transmit repetitions of the PUCCH corresponding to a smaller number of repetitions among repetitions of the PUCCH started earlier and repetitions of the PUCCH started later. For example, by comparing the number of repetitions when the repetition of the PUCCH started earlier (including a PUCCH that does not repeat. At this time, it is assumed that the number of repetitions is 1) is transmitted with the number of repetitions when the repetition of the PUCCH started later is transmitted, repetitions of the PUCCH corresponding to the number of repetitions of the PUCCH of the smaller number of the two may be transmitted. If the number of repetitions of the earlier transmitted PUCCH is 1, the PUCCH may be transmitted because the earlier transmitted PUCCH has a smaller number of repetitions. In this way, performance degradation of the PUCCH may be suppressed by transmitting a smaller number of repetitions of the PUCCH more.

In the first to fourth methods, the UE does not perform at least one PUCCH repetition transmission. Therefore, performance degradation may not be avoided due to PUCCH repetition transmission the that is not performed. A fifth method for solving the above is disclosed.

As the fifth method for the present disclosure, the UE may transmit repetitions of the earlier started PUCCH in an overlapping slot, and may delay repetitions of the later started PUCCH to a slot capable of later transmission without transmitting in the overlapping slot. That is, when selecting a slot capable of PUCCH repetition transmission, the UE may exclude a slot in which repetition transmission of the earlier started PUCCH starts. That is, a slot for repeatedly transmitting the PUCCH may be selected from among slots in which PUCCH repetition transmission started earlier is not performed.

Figure 57:
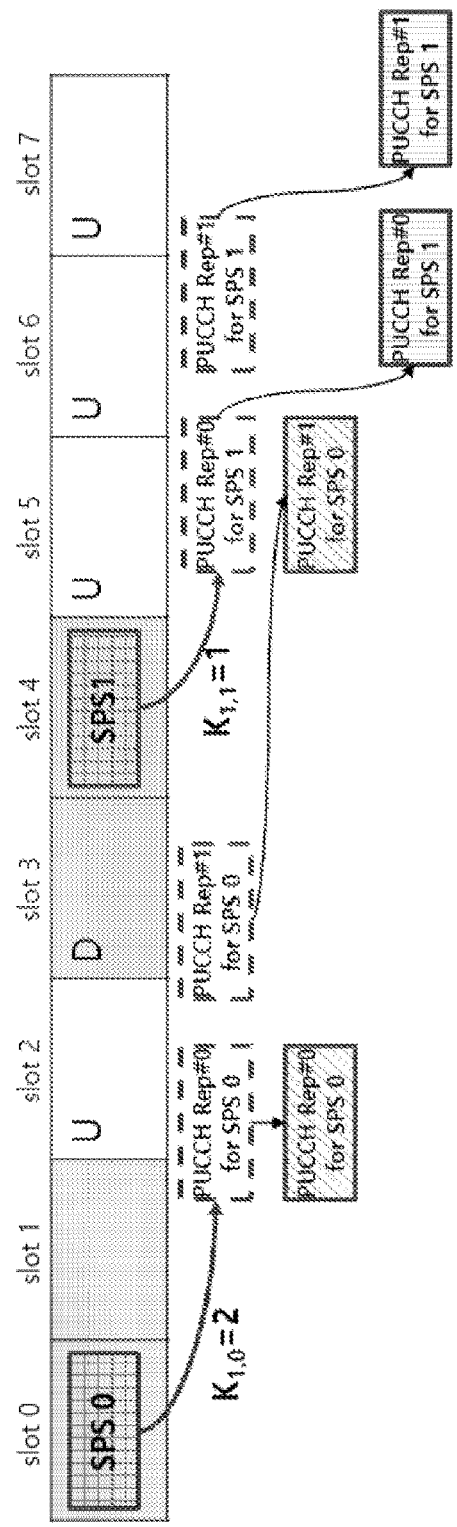
FIG. 57 illustrates a method for performing PUCCH repetition by a UE according to another example.

FIG. 57 illustrates a method for performing PUCCH repetition by a UE according to another example.

Referring to FIG. 57, when PUCCH Rep #1 for SPS0 and PUCCH Rep #0 for SPS1 collide in slot 5, the UE may transmit PUCCH Rep #1 for SPS0 that starts earlier in slot 5 of the two. Further, PUCCH Rep #0 for SPS1 not transmitted in slot 5 may be transmitted in a slot that is later than slot 5. Here, since transmission is possible in slot 6 and slot 7, PUCCH Rep #0 for SPS1 may be transmitted in slot 6 and PUCCH Rep #1 for SPS1 may be transmitted in slot 7.

In the fifth method, when a collision occurs, the UE delays repetition of the PUCCH that starts later to a later slot and performs transmission in the later slot, and thus, there is no case where PUCCH repetition transmission is not performed. Therefore, there is no performance degradation of the PUCCH. However, delay of the PUCCH may occur because repetition of the PUCCH that starts later is delayed to a later slot. A sixth method for solving the above is disclosed.

According to the sixth method for the present disclosure, the UE does not transmit repetitions of the earlier started PUCCH in an overlapping slot. Instead, the HARQ-ACK to be transmitted in the repetition of the earlier started PUCCH may be included and transmitted in the repetition of the PUCCH to start later. For example, when PUCCH Rep #1 for SPS0 and PUCCH Rep #0 for SPS1 overlap in slot 5 in FIG. 56, the UE does not transmit PUCCH Rep #1 for SPS0 that starts earlier. In addition, the HARQ-ACK of SPS0 transmitted in PUCCH Rep #1 for SPS0 may be included and transmitted in PUCCH Rep #0 for SPS1. That is, PUCCH Rep #0 for SPS1 may include HARQ-ACK information about SPS0 as well as HARQ-ACK information about SPS1.

The foregoing descriptions of the present disclosure are for illustration purposes, and those skilled in the art, to which the present disclosure belongs, will be able to understand that modification to other specific forms can be easily achieved without changing the technical spirit or essential features of the present disclosure. Therefore, it should be understood that the embodiments described above are illustrative and are not restrictive in all respects. For example, each element described as a single type may be implemented in a distributed manner, and similarly, elements described as being distributed may also be implemented in a combined form.

The scope of the present disclosure is indicated by claims to be described hereinafter rather than the detailed description, and all changes or modifications derived from the meaning and scope of the claims and their equivalent concepts should be interpreted as being included in the scope of the present disclosure.

What is claimed is:

1. A user equipment (UE) configured to operate in a wireless communication system, the UE comprising:
   a processor; and
   a communication module,
   wherein the processor is configured to:
   receive semi-persistent scheduling physical downlink shared channels (SPS PDSCHs) based on SPS configurations, each of the SPS configurations including a respective maximum deferral duration,
   determine a first physical uplink control channel (PUCCH) resource for transmitting a first PUCCH for first hybrid automatic repeat request acknowledgement (HARQ-ACK) information bits related to the SPS PDSCHs,
   based on that the first PUCCH resource overlaps with a symbol unavailable for PUCCH transmission, determine a second PUCCH for third HARQ-ACK information bits, the third HARQ-ACK information bits including second HARQ-ACK information bits from the first HARQ-ACK information bits, and
   transmit the second PUCCH including the third HARQ-ACK information bits,
   wherein the second HARQ-ACK information bits correspond to one or more SPS configurations, each of the one or more SPS configurations having a maximum deferral duration that is larger than or equal to a value related to a time difference between a slot of the second PUCCH and a slot of a corresponding SPS PDSCH reception,
   wherein the second PUCCH is allocated on either a primary cell or a secondary cell, based on a periodic cell switching pattern configured by a bit-map of a radio resource control (RRC) signal, and wherein each bit of the bit-map corresponds to a respective slot in reference to a numerology of the primary cell, and each bit value of the bit-map indicates either the primary cell or the secondary cell as a cell for PUCCH transmission in a corresponding slot.

2. The UE of claim 1, wherein the symbol unavailable for PUCCH transmission includes at least one of a semi-static downlink symbol, a symbol for synchronization signal/physical broadcast channel (SSB) or a symbol for control resource set #0 (CORESET #0).

3. The UE of claim 1, wherein the determining the second PUCCH includes:

if a first earliest PUCCH where the second HARQ-ACK information bits can be multiplexed, after the first PUCCH resource, is valid for transmission, determining the first earliest PUCCH as the second PUCCH, and if the first earliest PUCCH is not valid for transmission, determining a second earliest PUCCH where the second HARQ-ACK information bits can be multiplexed.

4. A method for use by a user equipment (UE) in a wireless communication system, the method comprising:

receiving semi-persistent scheduling physical downlink shared channels (SPS PDSCHs) based on SPS configurations, each of the SPS configurations including a respective maximum deferral duration;

determining a first physical uplink control channel (PUCCH) resource for transmitting a first PUCCH for first hybrid automatic repeat request acknowledgement (HARQ-ACK) information bits related to the SPS PDSCHs;

based on that the first PUCCH resource overlaps with a symbol unavailable for PUCCH transmission, determine a second PUCCH for third HARQ-ACK information bits, the third HARQ-ACK information bits including second HARQ-ACK information bits from the first HARQ-ACK information bits; and transmitting the second PUCCH including the third HARQ-ACK information bits, wherein the second HARQ-ACK information bits correspond to one or more SPS configurations, each of the one or more SPS configurations having a maximum deferral duration that is larger than or equal to a value related to a time difference between a slot of the second PUCCH and a slot of a corresponding SPS PDSCH reception, wherein the second PUCCH is allocated on either a primary cell or a secondary cell, based on a periodic cell switching pattern configured by a bit-map of a radio resource control (RRC) signal, and wherein each bit of the bit-map corresponds to a respective slot in reference to a numerology of the primary cell, and each bit value of the bit-map indicates either the primary cell or the secondary cell as a cell for PUCCH transmission in a corresponding slot.

5. The method of claim 4, wherein the symbol unavailable for PUCCH transmission includes at least one of a semi-static downlink symbol, a symbol for synchronization signal/physical broadcast channel (SSB) or a symbol for control resource set #0 (CORESET #0).

6. The method of claim 4, wherein the determining the second PUCCH includes:

if a first earliest PUCCH where the second HARQ-ACK information bits can be multiplexed, after the first PUCCH resource, is valid for transmission, determining the first earliest PUCCH as the second PUCCH, and if the first earliest PUCCH is not valid for transmission, determining a second earliest PUCCH where the second HARQ-ACK information bits can be multiplexed.

7. A base station (BS) configured to operate in a wireless communication system, the BS comprising:

a processor; and a communication module, wherein the processor is configured to:

transmit semi-persistent scheduling physical downlink shared channels (SPS PDSCHs) based on SPS configurations, each of the SPS configurations including a respective maximum deferral duration, determine a first physical uplink control channel (PUCCH) resource for receiving a first PUCCH for first hybrid automatic repeat request acknowledgement (HARQ-ACK) information bits related to the SPS PDSCHs, based on that the first PUCCH resource overlaps with a symbol unavailable for PUCCH reception, determine a second PUCCH for third HARQ-ACK information bits, the third HARQ-ACK information bits including second HARQ-ACK information bits from the first HARQ-ACK information bits, and receive the second PUCCH including the third HARQ-ACK information bits, wherein the second HARQ-ACK information bits correspond to one or more SPS configurations, each of the one or more SPS configurations having a maximum deferral duration that is larger than or equal to a value related to a time difference between a slot of the second PUCCH and a slot of a corresponding SPS PDSCH transmission, wherein the second PUCCH is allocated on either a primary cell or a secondary cell, based on a periodic cell switching pattern configured by a bit-map of a radio resource control (RRC) signal, and wherein each bit of the bit-map corresponds to a respective slot in reference to a numerology of the primary cell, and each bit value of the bit-map indicates either the primary cell or the secondary cell as a cell for PUCCH transmission in a corresponding slot.

8. The BS of claim 7, wherein the symbol unavailable for PUCCH reception includes at least one of a semi-static downlink symbol, a symbol for synchronization signal/physical broadcast channel (SSB) or a symbol for control resource set #0 (CORESET #0).

9. The BS of claim 7, wherein determining the second PUCCH includes:

if a first earliest PUCCH where the second HARQ-ACK information bits can be multiplexed, after the first PUCCH resource, is valid for reception, determining the first earliest PUCCH as the second PUCCH, and if the first earliest PUCCH is not valid for reception, determining a second earliest PUCCH where the second HARQ-ACK information bits can be multiplexed.

10. A method for use by a base station (BS) in a wireless communication system, the method comprising:

transmitting semi-persistent scheduling physical downlink shared channels (SPS PDSCHs) based on SPS configurations, each of the SPS configurations including a respective maximum deferral duration;

determining a first physical uplink control channel (PUCCH) resource for receiving a first PUCCH for first hybrid automatic repeat request acknowledgement (HARQ-ACK) information bits related to the SPS PDSCHs; and based on that the first PUCCH resource overlaps with a symbol unavailable for PUCCH reception, determining a second PUCCH for third HARQ-ACK information bits, the third HARQ-ACK information bits including second HARQ-ACK information bits from the first HARQ-ACK information bits; and receiving the second PUCCH including the third HARQ-ACK information bits, wherein the second HARQ-ACK information bits correspond to one or more SPS configurations, each of the one or more SPS configurations having a maximum deferral duration that is larger than or equal to a value related to a time difference between a slot of the second PUCCH and a slot of a corresponding SPS PDSCH transmission, wherein the second PUCCH is allocated on either a primary cell or a secondary cell, based on a periodic cell switching pattern configured by a bit-map of a radio resource control (RRC) signal, and wherein each bit of the bit-map corresponds to a respective slot in reference to a numerology of the primary cell, and each bit value of the bit-map indicates either the primary cell or the secondary cell as a cell for PUCCH transmission in a corresponding slot.

11. The method of claim 10, wherein the symbol unavailable for PUCCH reception includes at least one of a semi-static downlink symbol, a symbol for synchronization signal/physical broadcast channel (SSB) or a symbol for control resource set #0 (CORESET #0).

12. The method of claim 10, wherein the determining the second PUCCH includes:

if a first earliest PUCCH where the second HARQ-ACK information bits can be multiplexed, after the first PUCCH resource, is valid for reception, determining the first earliest PUCCH as the second PUCCH, and if the first earliest PUCCH is not valid for reception, determining a second earliest PUCCH where the second HARQ-ACK information bits can be multiplexed.

* * * * *